United States Patent
Kojima

(10) Patent No.: US 11,192,027 B2
(45) Date of Patent: Dec. 7, 2021

(54) TERRAIN RADAR AND GRADUAL BUILDING OF A ROUTE IN A VIRTUAL ENVIRONMENT OF A VIDEO GAME

(71) Applicant: Sony Interactive Entertainment LLC, San Mateo, CA (US)

(72) Inventor: Hideo Kojima, Tokyo (JP)

(73) Assignee: Sony Interactive Entertainment LLC, San Mateo, CA (US)

( * ) Notice: Subject to any disclaimer, the term of this patent is extended or adjusted under 35 U.S.C. 154(b) by 171 days.

(21) Appl. No.: 16/528,590

(22) Filed: Jul. 31, 2019

(65) Prior Publication Data

US 2020/0038753 A1    Feb. 6, 2020

Related U.S. Application Data

(60) Provisional application No. 62/713,254, filed on Aug. 1, 2018.

(51) Int. Cl.
*A63F 13/57*     (2014.01)
*A63F 13/56*     (2014.01)
(Continued)

(52) U.S. Cl.
CPC ............ *A63F 13/57* (2014.09); *A63F 13/211* (2014.09); *A63F 13/35* (2014.09); *A63F 13/493* (2014.09);
(Continued)

(58) Field of Classification Search
CPC ...... A63F 13/57; A63F 13/211; A63F 13/493; A63F 13/56; A63F 13/63; A63F 13/87; A63F 2300/105; A63F 2300/51; A63F 2300/5533; A63F 2300/6009; A63F 2300/64; G06F 9/54
See application file for complete search history.

(56) References Cited

U.S. PATENT DOCUMENTS 8,538,736 B1    9/2013 Paquet
10,322,350 B2 *  6/2019 Wakeford ............... A63F 13/69
(Continued)

OTHER PUBLICATIONS

Wii Play: Motion, Jun. 13, 2011, (Jun. 13, 2011), XP002795629, Retrieved from the Internet: URL:https://en.wikipedia.org/wiki/Wii_Play: Motion [retrieved on Nov. 13, 2019] section: cone zone, 4 pages.

(Continued)

*Primary Examiner* — Omkar A Deodhar
*Assistant Examiner* — Shauna-Kay Hall
(74) *Attorney, Agent, or Firm* — Penilla IP, APC

(57) ABSTRACT

A method for influencing a gaming world of a video game. The method including cross-pollinating a first path using an inter-game communication medium across a plurality of virtual environments of a plurality of asynchronous game plays of a plurality of players playing the video game. The method including determining that a first path has been traversed one or more times by one or more characters of the plurality of players in the plurality of asynchronous game plays. The method including improving the first path based on a number of times the first path has been traversed by the one or more characters. The method including cross-pollinating the first path that has been improved across the plurality of virtual environments.

20 Claims, 32 Drawing Sheets

(51) Int. Cl.
  *A63F 13/5378* (2014.01)
  *A63F 13/211* (2014.01)
  *A63F 13/35* (2014.01)
  *A63F 13/493* (2014.01)
  *A63F 13/63* (2014.01)
  *G06F 9/54* (2006.01)
  *A63F 13/87* (2014.01)

(52) U.S. Cl.
  CPC .......... *A63F 13/5378* (2014.09); *A63F 13/56* (2014.09); *A63F 13/63* (2014.09); *G06F 9/54* (2013.01); *A63F 13/87* (2014.09); *A63F 2300/105* (2013.01); *A63F 2300/51* (2013.01); *A63F 2300/5533* (2013.01); *A63F 2300/6009* (2013.01); *A63F 2300/64* (2013.01)

(56) References Cited

U.S. PATENT DOCUMENTS

| | | | | |
|---|---|---|---|---|
| 2007/0198178 | A1* | 8/2007 | Trimby | G06N 5/003 701/533 |
| 2009/0197686 | A1* | 8/2009 | Bergelt | A63F 13/10 463/43 |
| 2010/0306717 | A1* | 12/2010 | Yamada | A63F 13/56 715/863 |
| 2011/0039620 | A1* | 2/2011 | Hashimoto | A63F 13/577 463/36 |
| 2012/0252569 | A1* | 10/2012 | Harp | A63F 13/358 463/29 |
| 2016/0236087 | A1* | 8/2016 | McNeil | A63F 13/87 |

OTHER PUBLICATIONS

Martin Watts: "Wii Fit U Review", Nov. 9, 2013 (Nov. 9, 2013), XP002795630, Retrieved from the Internet: URL:http://www.nintendolife.com/reviews/wiiu/wii_fit_u [retrieved on Nov. 13, 2019] paragraph [0008], 5 pages.

"Balance Games", Mar. 3, 2012 (Mar. 3, 2012), XP002795631, Retrieved from the Internet: URL:https://www.ign.com/wikis/wii-fit/Balance Games [retrieved on Nov. 13, 2019] section Tightrope walk, 10 pages.

Intl Search Report and Written Opinion PCT/US2019/044566, dated Jan. 27, 2020, 19 pages.

* cited by examiner

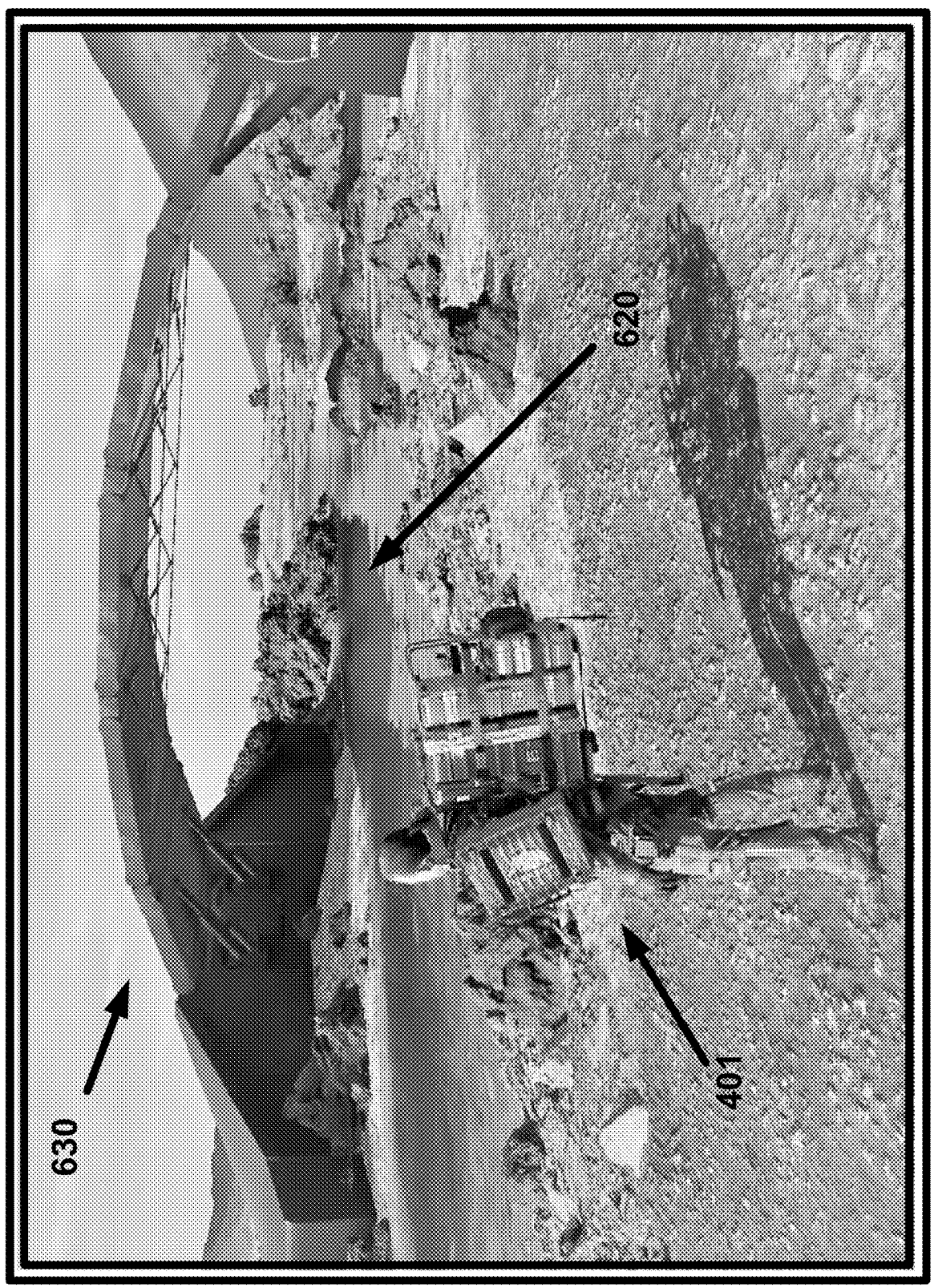

TERRAIN RADAR AND GRADUAL BUILDING OF A ROUTE IN A VIRTUAL ENVIRONMENT OF A VIDEO GAME

CLAIM OF PRIORITY

This application claims priority to and the benefit of U.S. Provisional App. Ser. No. 62/713,254 filed on Aug. 1, 2018, entitled "Player Induced Counter-Balancing Of Loads On A Character In A Virtual Environment," the disclosure of which is incorporated herein by reference in its entirety for all purposes.

RELATED APPLICATIONS

This application is related to U.S. application Ser. No. 16/528,570 concurrently filed on Jul. 31, 2018, entitled "Player Induced Counter-Balancing Of Loads On A Character In A Virtual Environment,", the disclosure of which is incorporated herein by reference. This application is related to U.S. application Ser. No. 16/528,578 concurrently filed on Jul. 31, 2018, entitled "Cross-Pollination of In-Game Events, Assets and Persistent Communications Using Signs and Likes Across Virtual Environments in Gaming Sessions of a Video Game,", the disclosure of which is incorporated herein by reference.

TECHNICAL FIELD

The present disclosure is related to gaming applications. Among other things, this disclosure describes methods and systems for providing realistic balancing of loads affecting a character being played by a user while playing an interactive gaming application.

BACKGROUND OF THE DISCLOSURE

With higher processing power video games are becoming more complex and expansive. Open world video games allow a player to move throughout a gaming environment without any predetermined pattern. That is, the player is able to freely explore the gaming environment without following any ordered approach. In addition, a multi-player video game allows one or more players to simultaneously play within a gaming environment. For example, a small group of friends (e.g., 4 to 6 friends) may join together to simultaneously play a video game. Further, a massively multi-player online game allows a large number of players to simultaneously play within a gaming environment.

In these various types of multi-player video games, players directly interact with each other. For example, one player may see another player in the gaming environment, and both players directly compete or cooperate with each other in the gaming environment. in addition, in a single-player game where one player independently progresses through the game, there is virtually no interaction with other players. As such, in single-player or multi-player gaming, there may be a disconnect between players that are not on the same gaming session. The disconnect occurs when players play the same video game at different times (e.g., different days). For example, while players may directly communicate with each other while they are simultaneously playing, no communication between players is possible through the game play in one disconnect. In another disconnect, there is an absence of changes to the gaming environment effected through one player's actions in another player's gaming environment.

It is in this context that embodiments of the disclosure arise.

SUMMARY

Embodiments of the present disclosure relate to providing a connection between a player and the player's character through application of counter balancing forces by the player to compensate for changes to a center of balance due to one or more factors, such as improper weight distribution of carried objects, tiredness, etc. Other embodiments provide for the promotion of communication and relationships between multiple players playing the interactive gaming application and to provide cross-pollination of actions and assets between players playing asynchronous game plays of the interactive gaming application. Still other embodiments provide for scanning of terrain surrounding a character and determining difficulty in navigating through one or more areas of the surrounding terrain, such that a terrain map includes outlines of prominent features that are identified with corresponding degrees of navigation difficulty. Several inventive embodiments of the present disclosure are described below.

In one embodiment, a method for influencing a gaming world of a video game is disclosed. The method including cross-pollinating a first path using an inter-game communication medium across a plurality of virtual environments of a plurality of asynchronous game plays of a plurality of players playing the video game. The method including determining that a first path has been traversed one or more times by one or more characters of the plurality of players in the plurality of asynchronous game plays. The method including improving the first path based on a number of times the first path has been traversed by the one or more characters. The method including cross-pollinating the first path that has been improved across the plurality of virtual environments.

In another embodiment, a non-transitory computer-readable medium storing a computer program for influencing a gaming world of a video game is disclosed. The computer-readable medium including program instructions for cross-pollinating a first path using an inter-game communication medium across a plurality of virtual environments of a plurality of asynchronous game plays of a plurality of players playing the video game. The computer-readable medium including program instructions for determining that a first path has been traversed one or more times by one or more characters of the plurality of players in the plurality of asynchronous game plays. The computer-readable medium including program instructions for improving the first path based on a number of times the first path has been traversed by the one or more characters. The computer-readable medium including program instructions for cross-pollinating the first path that has been improved across the plurality of virtual environments.

In still another embodiment, a computer system is disclosed. The computer system including a processor, and memory coupled to the processor and having stored therein instructions that, if executed by the computer system, cause the computer system to execute a method for influencing a gaming world of a video game is disclosed. The method including cross-pollinating a first path using an inter-game communication medium across a plurality of virtual environments of a plurality of asynchronous game plays of a plurality of players playing the video game. The method including determining that a first path has been traversed one or more times by one or more characters of the plurality of players in the plurality of asynchronous game plays. The method including improving the first path based on a number of times the first path has been traversed by the one or more characters. The method including cross-pollinating the first path that has been improved across the plurality of virtual environments.

In one embodiment, a method for influencing a gaming world of a video game is disclosed. The method including determining that a first character traverses a first path from a first point to a second point in a first virtual environment of the video game, wherein the first character is controlled by a first player playing the video game in a first game play. The method including improving the first path in the first virtual environment based on a number of times the first character has traversed the first path, wherein the first path is incrementally improved with each traversal of the first path. The method including cross-pollinating the first path that has been improved using an inter-game communication medium across a plurality of virtual environments of a plurality of asynchronous game plays of a plurality of players, wherein the inter-game communication medium provides for cross-pollination of data across a plurality of virtual environments of the plurality of asynchronous game plays.

In another embodiment, a non-transitory computer-readable medium storing a computer program for influencing a gaming world of a video game is disclosed. The computer-readable medium including program instructions for determining that a first character traverses a first path from a first point to a second point in a first virtual environment of the video game, wherein the first character is controlled by a first player playing the video game in a first game play. The computer-readable medium including program instructions for improving the first path in the first virtual environment based on a number of times the first character has traversed the first path, wherein the first path is incrementally improved with each traversal of the first path. The computer-readable medium including program instructions for cross-pollinating the first path that has been improved using an inter-game communication medium across a plurality of virtual environments of a plurality of asynchronous game plays of a plurality of players, wherein the inter-game communication medium provides for cross-pollination of data across a plurality of virtual environments of the plurality of asynchronous game plays.

In still another embodiment, a computer system is disclosed. The computer system including a processor, and memory coupled to the processor and having stored therein instructions that, if executed by the computer system, cause the computer system to execute a method for influencing a gaming world of a video game is disclosed. The method including determining that a first character traverses a first path from a first point to a second point in a first virtual environment of the video game, wherein the first character is controlled by a first player playing the video game in a first game play. The method including improving the first path in the first virtual environment based on a number of times the first character has traversed the first path, wherein the first path is incrementally improved with each traversal of the first path. The method including cross-pollinating the first path that has been improved using an inter-game communication medium across a plurality of virtual environments of a plurality of asynchronous game plays of a plurality of players, wherein the inter-game communication medium provides for cross-pollination of data across a plurality of virtual environments of the plurality of asynchronous game plays.

In one embodiment, a method for controlling a character in a virtual environment of an interactive gaming application. The method including receiving characteristics of a virtual environment. The method including receiving a weight distribution profile for virtual objects carried by the character, the weight distribution profile causing an offset in a center of gravity of the character. The method including receiving input to move the character about the virtual environment, the input including a first component for moving the character along a path in the virtual environment, and a second component for providing a counter-force to reduce the offset to the center of gravity. The second component is applied when the character graphically appears to be out-of-balance while moving along the path in the virtual environment responsive to the first component.

In one embodiment, a method for gaming is disclosed. The method includes executing at a processor an interactive gaming application for a first game play of a first player. The method includes determining at the processor an action by a character controlled by the first player involving an antagonist of the interactive gaming application satisfies a condition in the first game play. The method includes generating at the processor a cataclysmic event in a first virtual environment of the interactive gaming application, wherein the cataclysmic event causes an effect on the first virtual environment. The method includes cross-pollinating at the processor the effect to a second virtual environment of a second game play of a second player.

In another embodiment, a method for gaming is disclosed. The method includes executing at a processor an interactive gaming application for a first game play of a first player. A virtual environment of the interactive gaming application includes a plurality of regions, each of the regions having a corresponding regional communication network. An objective of a character controlled by the first player is to join each of the corresponding regional communication networks to form a universal communication network. The method includes determining that a character controlled by the first player has accomplished a mission in the first region. The method includes in response to successfully completing the mission, joining a first regional communication network of the first region to the universal communication network. The method includes providing to the character of the first player access to information and assets of one or more other players across one or more regions that are connected through the universal communication network.

In another embodiment, a method for gaming is disclosed. The method includes executing at a processor an interactive gaming application for a first game play of a first player. The method includes determining that the first player has acquired an asset. The method includes determining that the first player has placed the asset into a first virtual environment of the interactive gaming application. The method includes cross-pollinating the asset to a second virtual environment of a second game play of a second player.

In still another embodiment, another method for gaming is disclosed. The method includes executing at a processor an interactive gaming application for a first game play of a first player. The method includes determining that a first character controlled by the first player has placed a first sign into a first virtual environment of the interactive gaming application, the first sign providing visual information or instructions. The method includes cross-pollinating the first sign to a second virtual environment of a second game play of a second player.

In another embodiment, another method for gaming is disclosed. The method includes executing at a processor an interactive gaming application for a first game play of a first player. The method includes determining that the first player through the first game play has initiated a like to a via an object, wherein the object is generated by a second player in a second game play and cross-pollinated to a first virtual environment of the first game play. The method includes communicating the like to the second player through the second game play.

In another embodiment, still another method for gaming is disclosed. The method includes executing at a processor an interactive gaming application for a first game play of a first player. The method includes determining that a character controlled by the first player is traversing a path from a first point to a second point in a first virtual environment of the first game play. The method includes making the path more defined each time the first player traverses the path. The method includes cross-pollinating the path that is more defined to a second virtual environment of a second game play of a second player.

In another embodiment, still another method for gaming is disclosed. The method includes executing at a processor an interactive gaming application for a first game play of a first player. The method includes receiving a request for terrain scanning and scanning terrain surrounding a character in the first game play. The method includes mapping the terrain by determining outlines of prominent features in the surrounding terrain. The method includes determining difficulty in navigating through one or more areas of the surrounding terrain. The method includes displaying a terrain map including the outlines of prominent features that are identified with corresponding degrees of navigation difficulty.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 6B is a screen shot illustrating the character, introduced in FIG. 4B of the representative interactive gaming application introduced in FIG. 3A, viewing a bridge built over a natural obstacle, wherein the bridge was built in a location of the representative virtual environment by another player and corresponding character, in accordance with one embodiment of the present disclosure.

DETAILED DESCRIPTION

Figure 1:
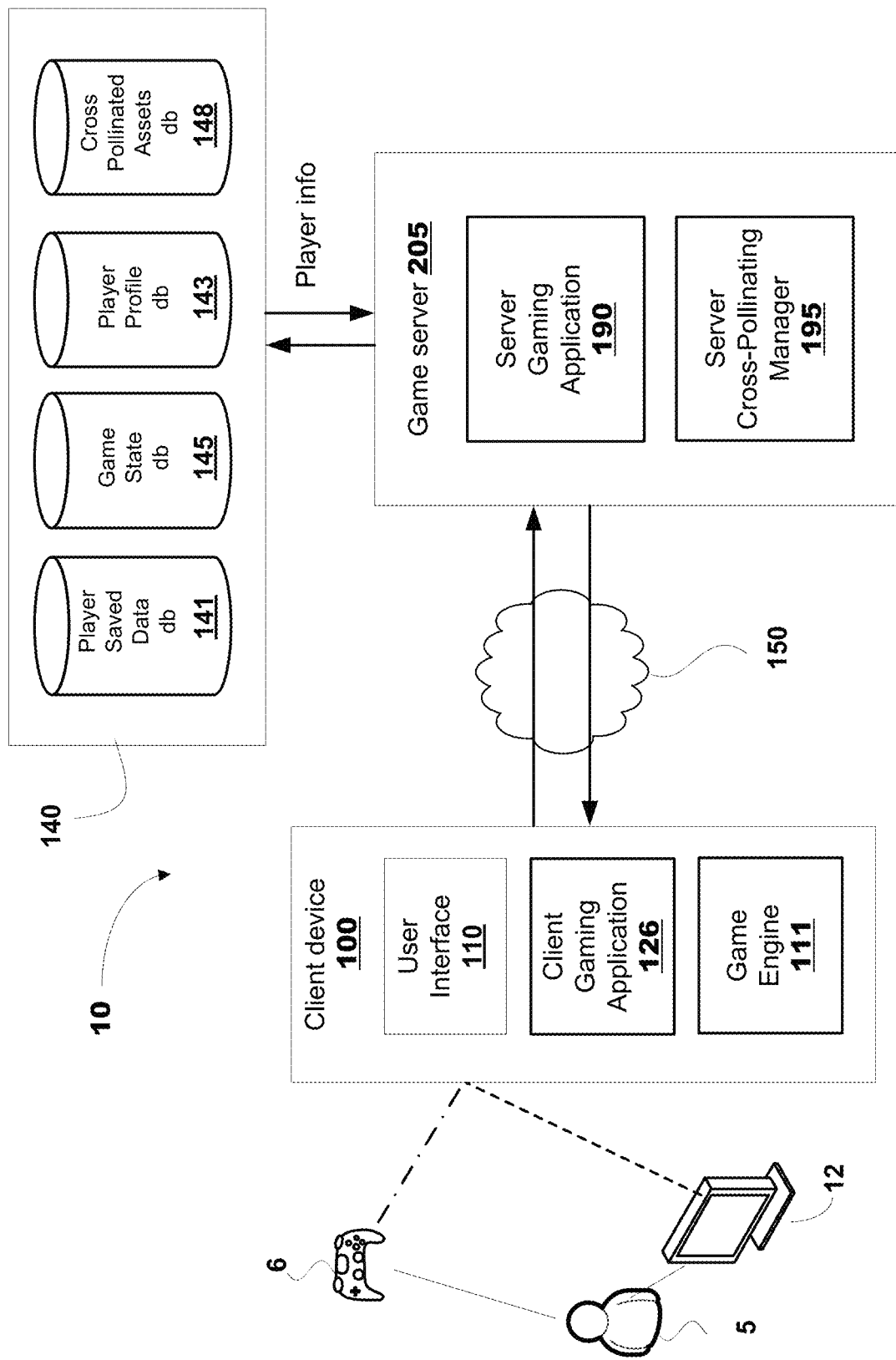
FIG. 1 illustrates a system used for game play of an interactive gaming application that promotes communication and relationships between multiple players playing the interactive gaming application, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing various improvements and advantages in video gaming In one embodiment, a close connection between a character in an interactive gaming application and a player is established by having the character be affected by forces present (e.g., gravity forces affecting a tenuous center of gravity) in the virtual environment, and having the player control counter-balancing movement of the character. Previously, characters in an interactive gaming application would be artificially supported in an upright position no matter the forces present in the virtual environment, such that even if a character would be moving too fast when rounding a corner, the character would not topple over when making the turn. On the other hand, in the present embodiments poorly distributed loads on a character would adversely shift the center of gravity and force the character to fall over unless counter forces are continually applied by the player as long as the problem of poor distribution persists. This brings a close connection between the player and the character that never existed before in the world of video gaming In another embodiment, in-game communication between players playing an interactive gaming application in either single-player or multi-player modes are established through "likes" and "signs" that persist over time and between gaming sessions. Previously, communication only occurred between players during a common gaming session for multi-player gaming, and would never occur in single-player gaming In the present embodiment, characters and their player counterparts that may never formally interact with each other are able to establish communications with each other in a form that persists across multiple gaming sessions. Specifically, characters are able to communicate with other characters through communication strands, such as through "likes," "signs," etc. For example, a character in one gaming session is able to communicate with another character that is being played in another and later gaming session. Through interactions between players and their characters, relationships can be built up that may prove beneficial in each other's game play. For instance, the stronger a player-to-player relationship becomes (e.g., through multiple communications), the more assets and information can be transferred from one player to the other player. That is, both players are able to better help each other during respective game plays. In still other embodiments, one player's actions (e.g., through a corresponding character) may have an effect on another player's virtual environment. Previously, actions by a player that had an effect on a virtual environment would not be ported to another virtual environment of another player. In the present embodiment, changes to a virtual environment resulting from one player's actions are cross-pollinated to other virtual environments of other players in the same gaming session or in other gaming sessions. That is, those changes persist throughout one or more virtual environments of one or more gaming sessions and/or game plays (synchronous or asynchronous). As another example, each time any player traverses a path in the gaming world, that path becomes more defined and more uniform. For example, the path may become smoother making it easier to traverse. The more any player takes that path, the easier and easier it becomes to traverse that path. Soon, it may become a wide and gravely path suitable for motor vehicle transportation. Further, there may be cross-pollination of assets and/or objects between virtual environments of different players and their characters. For example, an asset/object generated by one player may be left in that player's virtual environment and presented and/or offered to another player through their corresponding virtual environment. In addition, assets/objects may be carried through a virtual environment.

With the above general understanding of the various embodiments, example details of the embodiments will now be described with reference to the various drawings.

Throughout the specification, the reference to "gaming application" or "interactive gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

Embodiments of the present disclosure can be applied when executing any interactive gaming application, in any gaming system configuration (e.g., local processing, remote processing, cloud gaming, or any combination thereof). For purposes of illustration, a representative interactive gaming application may be set in a world suffering from some type of worldwide destruction. Pockets of survivors still exist across the barren landscape of a vast country. An antagonist (e.g., monster) seeks out survivors to inflict harm and possibly death. A protagonist may be a courier traveling from one region to the next accomplishing missions, trying to connect the pockets of survivors, and establishing a Cryonet network of communication throughout the country. The courier carries the future in his hands, and tries to reunite the shattered world. The character can exist between life and death, and as such is connected to both the living world and the death world. The character could possibly die as he seeks to create the Cryonet, and after each death rebirths in or returns to a world or virtual environment adversely affected by the character's death, such as the creation of a void out in the topography. Other players are also trying to complete the Cryonet, possibly through other protagonists, though the characters of all these different players may never virtually meet in any virtual environment. In one embodiment, the representative interactive gaming application goes beyond a single-player game by allowing for indirect interactions between players of different and asynchronous game plays. For example, players can communicate with each other through various strands or ropes of communication in their game plays, such as using "likes," "three dimensional signs," etc., and not necessarily through any formal mode of communication (e.g., communication channel, etc.). These communications between players may be helpful, harmful, or neutral in nature. These communications may also be purely informational. To be successful, players must build strands between each other to connect the world of players in order to establish the Cryonet network. Furthermore, one player's actions may possibly affect the virtual environment of another player. For example, a player may build a bridge in their corresponding virtual environment, and that bridge may be cross-pollinated into another player's virtual environment. Also, when a player dies through an interaction with a monster, a void out occurs that violently mixes the living world with the world of the dead (e.g., collision between matter and anti-matter) that can cause a cataclysmic event, such as an explosion creating a huge crater. In a sense, all the players share the same virtual environment, though they may never see each other's characters. In that manner, when one player affects the universal virtual environment, the resulting effect is also experienced by another player, such as multiple players using the same bridge.

For purposes of illustration only, embodiments of the present invention are described within the context of the representative interactive gaming application introduced above, although embodiments can be implemented within any interactive gaming application. In particular, screen shots described within the figures and the specification of the present application are illustrative of various features that can be implemented across one or more interactive gaming applications, such as promoting communications and relationships between players during game plays of an interactive gaming application.

FIG. 1 illustrates a system 10 used for game play by a player 5 of an interactive gaming application that promotes communication and relationships between multiple players playing the interactive gaming application, in accordance with one embodiment of the present disclosure. As shown, the interactive gaming application may be executing on a local client device 100, in single-player mode, or multi-player mode. The back-end game server 205 is configured to provide cross-pollination of actions and assets between players of the interactive gaming application. That is, the game server 2015 may be configured to support client devices supporting multiple players, wherein each local client device may be executing an instance of the interactive gaming application, such as in single player or multi-player mode. For example, in single-player mode, corresponding interactive gaming applications may be executing locally for each player in support of game plays that are asynchronous. That is, although there is cross-pollination of actions and/or assets throughout the virtual environments of corresponding game plays, the individual game plays are performed independently of each other. In another example, in the multi-player mode, while the interactive gaming application is executing locally, the game server concurrently receives information (e.g., game state data stored in database 145) from each local client device and distributes that information accordingly throughout one or more of the local computing devices so that each player is able to interact with other payers (e.g., through corresponding characters in the video game) in the virtual environment of the multi-player interactive gaming application. In that manner, the game server 205 coordinates and combines the game plays for each of the players within the multi-player virtual environment to promote communication and relationships between the player, and for cross-pollinating actions and assets between players. In other embodiments, the game server 205 may be configured to perform back-end server execution of the interactive gaming application in single-player or multi-player modes and stream the media content to the local client device 100 for display and interaction.

Client device 100 includes a client interactive gaming application 126 that is executing locally on a processor (not shown). During execution, the logic of the interactive gaming application 126 may make calls to the game engine 111 to perform one or more tasks for efficiency and speed. For example, game engine 111 may perform in whole or in part one or more of the following, 2D or 3D graphics, physics simulation, collision detection, etc. In the case of physics simulation, the game engine 11 may emulate realistic or developer defined laws of physics to simulate forces acting on objects within the interactive gaming application. As another example, the game engine 111 may be tasked to generate the background environment of a scene, such as generating trees, etc.

The client device 100 may receive input from various types of input devices, such as game controllers 6, keyboards (not shown), and gestures, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices. Client device 100 is configured for receiving rendered images, and for displaying the rendered images on display 12. For example, the rendered images may be generated by the client interactive gaming application 126 as executed by the client device 100 in response to input commands that are used to drive game play of player 5.

The client interactive gaming application 126 may be configured to provide in-game communication between players playing an interactive gaming application, such as through "likes" and "signs,"; to provide player controlled counter-balancing movement/motion of a character; to allow changes effected in one player's virtual environment to be cross-pollinated to another player's virtual environment; to allow one player's actions in a corresponding virtual environment to influence another player's virtual environment; and to allow cross-pollination of one player's assets/objects between virtual environments of multiple players.

Cross-pollination of assets and/or actions between game plays of multiple players may be facilitated through the back-end game server 205 as accessed through network 150, as further described below and with reference to FIG. 3. In particular, game server 205 may be configured to receive and store game contexts (e.g., in database 140) of the game play of player 5, wherein each game context includes information (e.g., game state, user information, etc.). The game context is generated through execution of the interactive gaming application 126 at the client device 100, and delivered to the game server 205 over network 150. For illustration, game contexts may help determine where the player (e.g., character of the player) has been within the interactive gaming application, where the player is in the interactive gaming application, what the player has done, what assets and skills the player or the character has accumulated, what quests or tasks are presented to the player, and where the player will be going within the interactive gaming application. In addition, game context may include game state data that defines the state of the game at that point. For example, game state data may include game characters, game objects, game object attributes, game attributes, game object state, graphic overlays, location of a character within a gaming world of the game play of the player 5, the scene or virtual environment of the game play, the level of the interactive gaming application, the assets of the character (e.g., weapons, tools, bombs, etc.), the type or race of the character (e.g., wizard, soldier, etc.), the current quest and/or task presented to the player, loadout, skills set of the character, etc. In that manner, game state data allows for the generation of the virtual environment that existed at the corresponding point in the video game.

Also, game context may include user and/or player information related to the player. Generally, user/player saved data includes information that personalizes the video game for the corresponding player, and may be stored in database 141. This includes information associated with the player's character, so that the video game is rendered with a character that may be unique to that player (e.g., shape, race, look, clothing, weaponry, etc.). In addition, user/player saved data may include the skill or ability of the player, recency of playing the interactive gaming application by the player, game difficulty selected by the player 5 when playing the game, game level, character attributes, character location, number of lives left, the total possible number of lives available, armor, trophy, time counter values, and other asset information, etc. User/player saved data may also include user profile data that identifies player 5, for example. User/player saved data is stored in database 143.

In addition, the cross-pollinating manager 195 is configured to manage the cross-pollination of assets and/or actions generated by client device 100 for purposes of populating those assets and/or actions within the virtual environments of other players. For example, manager 195 receives the assets and/or actions of player 5 within his or her game play (e.g., through the transfer of game context described above), and manages the incorporation or pollination of those assets and/or actions into other virtual environments of players playing the same interactive gaming application. The cross-pollinated assets and/or actions may be stored in database 148.

Figure 2:
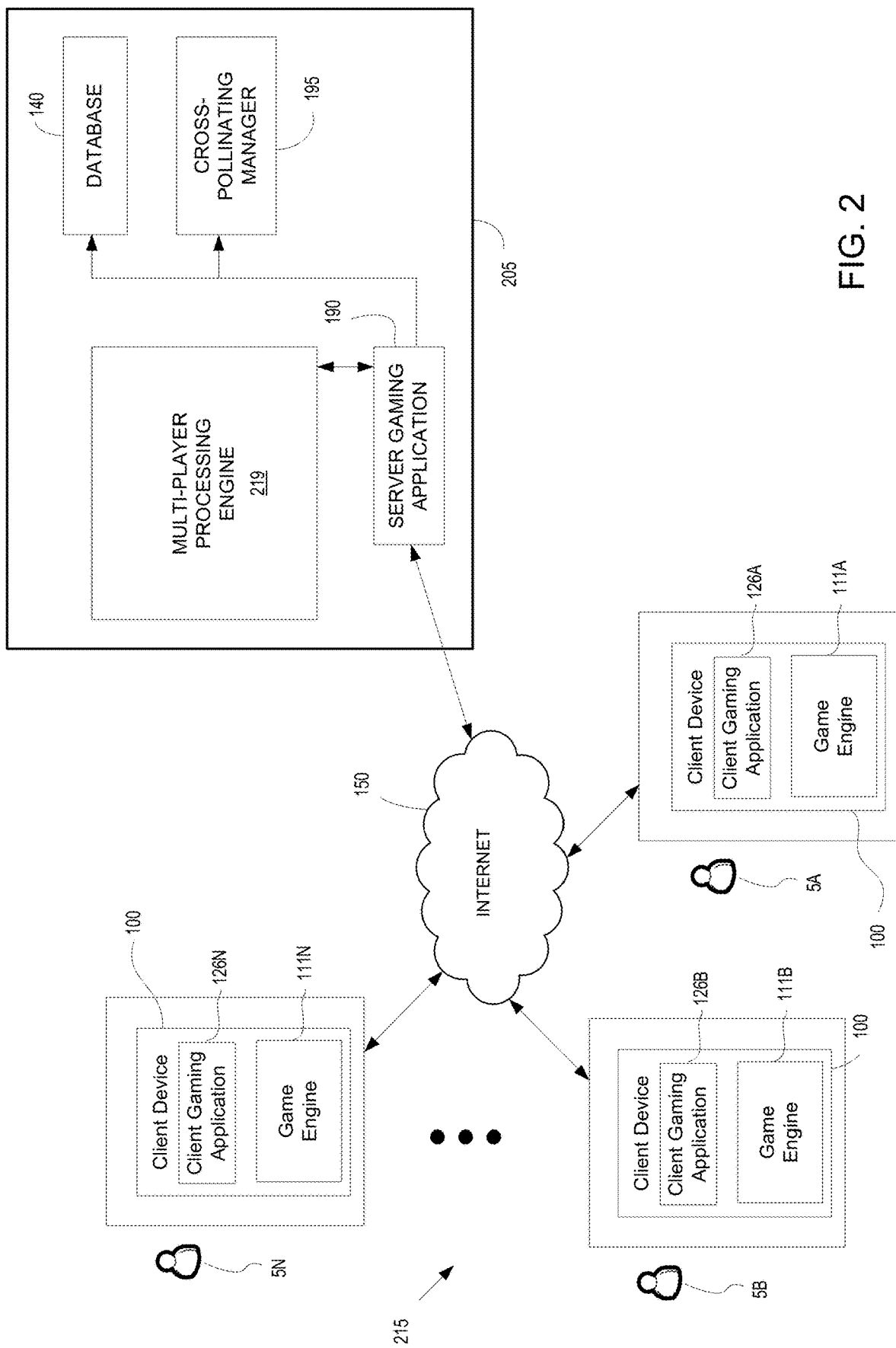
FIG. 2 illustrates a system diagram for supporting a multi-player gaming application that promotes communication and relationships between multiple players and the cross-pollination of actions and assets across one or more virtual environments of one or more game plays, wherein the interactive gaming application can be executing on a local computing device or over a cloud game network, in accordance with one embodiment of the present disclosure.

FIG. 2 illustrates a system 200 for supporting a multi-player interactive gaming application that promotes communication and relationships between multiple players and the cross-pollination of actions and assets across one or more virtual environments of one or more game plays, wherein the interactive gaming application can be executing on a local computing device or over a cloud game network, in accordance with one embodiment of the present disclosure. A plurality of players 215 (e.g., player 5A, player 5B . . . player 5N) is playing an interactive gaming application 126, wherein each of the interactive gaming applications is executed locally on a corresponding client device 100 (e.g., game console) of a corresponding user. Also, the players may be playing different interactive gaming applications. Each of the client devices 100 may be configured similarly in that local execution of a corresponding interactive gaming application is performed. For example, player 5A may be playing a first instance of interactive gaming application 126A executing on a corresponding client device 100 with cooperation of game engine 111A, as previously described. In addition, player 5B is playing a second instance of interactive gaming application 126B executing locally on a corresponding client device 100 in cooperation with game engine 111B. Further, player 115N is playing an Nth instance of the interactive gaming application 126N executing on a corresponding client device 100 in cooperation with game engine 111N.

In one embodiment, a corresponding client device 100 is operating in a single-player mode for a corresponding player that is playing an interactive gaming application. Back-end server support via the game server 205 may provide cross-pollination of data (e.g., information, assets, objects, communication, etc. that etc.) across one or more virtual environments of one or more asynchronous game plays of one or more players, in accordance with one embodiment of the present disclosure. As previously introduced, the cross-pollinating manager 195 is configured to provide cross-pollination of data across one or more virtual environments. For example, the manager 195 is configured to facilitate communication, such that players through corresponding characters may indirectly communicate with each other through respective game plays, such as through "likes" or "3D signs," as previously introduced. In addition, assets may be cross-pollinated across one or more virtual environments, as facilitated by the manager 195. For example, the cross-pollinated data may occur over one or more gaming sessions, such that the information may be generated at one time during a first game play, and be cross-pollinated to another virtual environment at a different time during a second game play.

In another embodiment, multiple client devices 100 are operating in a multi-player mode for corresponding players that are each playing a specific interactive gaming application. In that case, back-end server support via the game server 205 may provide multi-player functionality, such as through the multi-player processing engine 219. In particular, multi-player processing engine 219 is configured for controlling a multi-player gaming session for a particular interactive gaming application. For example, multi-player processing engine 219 may be configured to establish and maintain communication sessions with each of the users and/or players participating in the multi-player gaming session. Further, multi-player processing engine 219 may be configured to enable interaction between users within corresponding virtual environments of each user (e.g., interactions and cross-pollination of characters, objects, player actions, character actions, etc.). For example, multi-player processing engine 119 may be configured to overlay/insert objects and characters into each of the virtual environments of the players participating in the multi-player gaming session. This allows for interaction between players in the multi-player gaming session via each of their respective virtual environments (e.g., as displayed on a screen).

Figure 3:
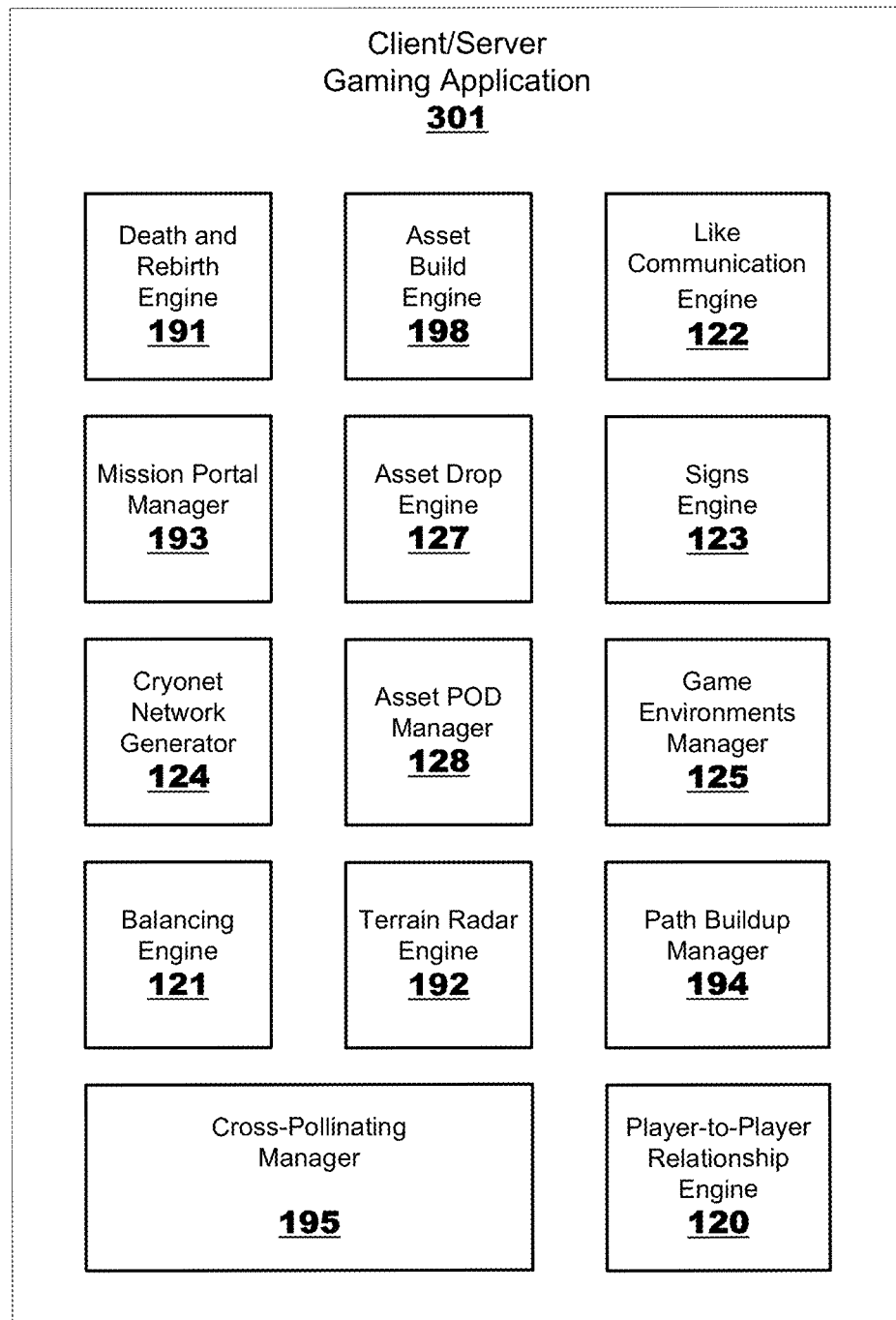
FIG. 3 illustrates an interactive gaming application located on a client device or back-end-game server configured for the cross-pollination of actions and assets across one or more virtual environments of one or more game plays, in accordance with one embodiment of the present disclosure.

FIG. 3 illustrates a client/server interactive gaming application 301 located on a client device 100 and/or back-end game server 205 configured for the cross-pollination of actions and assets across one or more virtual environments of one or more game plays, in accordance with one embodiment of the present disclosure. Although described within the context of execution by a client/server side interactive gaming application 301, the enablement of the cross-pollination of actions and assets across one or more virtual environments is accomplished through the cooperation of one or more of the client side interactive gaming application 126, server side game application 190, and/or the cross-pollinating manager 195 located on the back-end game server 205. That is, the functions and features described for the client/server interactive gaming application 301 may be performed by the client side interactive gaming application 126, server side game application 190, and/or the cross-pollinating manager 195, taken alone or in combination.

In particular, the client/server interactive gaming application 301 may be configured to provide in-game communication between players playing an interactive gaming application, such as through "likes" and "3D signs," or other suitable communication strands that persist over time and between gaming sessions in one or more virtual environments; that are configured to provide player controlled counter-balancing movement/motion of a character that creates a close connection between player and character; that are configured to create and develop player-to-player relationships through respective characters that also persist over time and between gaming sessions in one or more virtual environments; that are configured to allow changes effected in one player's virtual environment to be cross-pollinated to another player's virtual environment, where those changes persist over time and between gaming sessions in one or more virtual environments; that are configured to allow one player's actions in a corresponding virtual environment to influence another player's virtual environment, wherein those conditions persist over time and between gaming sessions in one or more virtual environments; and that are configured to allow cross-pollination of one player's assets/objects between virtual environments of multiple players, wherein the cross-pollination of those assets/objects persist over time and between gaming sessions in one or more virtual environments. Further, the interactive gaming application may be executing in a single-player mode, or multi-player mode, wherein embodiments of the present disclosure provide for multi-player enhancements (e.g., assistance, communication, etc.) to both modes of operation. The client/server interactive gaming application 301 is configured to access and/or store information to various databases in data store 140, such as with player saved data database 141, game state database 145, and cross-pollinated assets database 148.

Client/server interactive gaming application 301 includes a balancing engine 121 that is configured to determine what forces are acting on a character in an interactive gaming application, and to determine a center of gravity for that character based on the forces. For example, gravitational forces may be applied for each object that a character is carrying. Based on how the object is carried and the location of the object on the body of the character, a corresponding force is applied. The forces combined will affect the position of the character's center of gravity. Additional forces may be considered, such as forces from other phenomena, including wind, a friction factor of a surface, etc. Also, counter-balancing forces may be considered when determining where the center of gravity is located. The counter-balancing forces may be applied by a player (e.g., through a controller) to adjust for a center of gravity that is misaligned. Without the counter-balancing forces, the character may actually fall over within the game play. The counter-balancing forces need to be continually applied and adjusted to compensate for a dynamically moving center-of-gravity.

Client/server interactive gaming application 301 includes a death and rebirth engine 191 configured to manage the death and rebirth of a character after encountering a monster or creature connected to a cataclysmic event. In particular, during the encounter a void out occurs generating a violent explosion that carves out a huge crater in the virtual environment at the location of the encounter. Death and rebirth engine 191 coordinates the generation of the void out in the virtual environment, and possibly the cross-pollination of that void out in one or more virtual environments of one or more other players. Engine 191 also coordinates the rebirthing of the character, to include reacquiring assets that were owned before the encounter.

Client/server interactive gaming application 301 includes a mission portal manager 193 configured to generate a mission portal that is presented after a death of a character. The mission portal may include representations of the character (e.g., in ghostlike appearance) that are floating in the medium between life and death, wherein each of these representations is a portal. Selection of one of these representative characters reloads the interactive gaming application at a previous point in the game play of the player. In one embodiment, selection of a representative character brings that game play to a beginning of a mission, such as initial entry into a geographical region that has not been connected to the Cryonet network.

Client/server interactive gaming application 301 includes a terrain radar engine 192 that when employed is configured to scan a surrounding geography and give an assessment as to its environmental conditions (e.g., rocky, smooth, wet, slippery, etc.), and to rate the difficulty (easy, medium, hard, etc.) in traversing through a region.

Game processor 201 includes a cross-pollinating manager 195 configured to manage data (e.g., information, assets, objects, communication, etc. that etc.) that is cross-pollinated across one or more virtual environments of one or more game plays of one or more players. For example, cross-pollinating manager 195 coordinates communication strands between one or more virtual environments, coordinates the cross-pollination of assets between one or more virtual environments, coordinates the configurations of Cryonet networks between one or more virtual environments, coordinates the buildup of paths in one or more virtual environments, etc. Cross-pollinating manager 195 may perform one or more functions of the client/server interactive gaming application 301, and may be configured to access and/or store information to various databases in data store 140, such as with player saved data database 141, game state database 145, and cross-pollinated assets database 148.

Client/server interactive gaming application 301 includes a player-to-player relationship engine 120 that is configured to track and build relationships between players and their corresponding characters based on communication strands between those characters in their game plays. For example, relationships are built through indirect communications between players and their corresponding characters. For example, communication strands are established between players/characters and may include "likes" transferred between the players/characters, or "signs" that are exchanged and/or interacted with between the players/characters. Other form of communication strands may include the transfer of money or currency between the players/characters.

Client/server interactive gaming application 301 includes a "like" communication engine 122 configured to facilitate the generation of likes and the transfer of those "likes" between one or more game plays of one or more players. In particular, a "like" may be generated in association with a corresponding object that is present within a player's virtual environment. For example, the object may have been placed there into a virtual environment by a first player, and the object may have been cross-pollinated into the same or another virtual environment that is being played by a second player. In one case, a bridge may have been built by the first player over a river or a crater generated in association with a void out. The second player comes upon the bridge, and recognizes its usefulness. In appreciation, the second player may generate a "like" in association with the bridge. "Like" communication engine 122 facilitates the generation of the "like" and also facilitates the transfer of the "like" for access by the first player.

Client/server interactive gaming application 301 includes a three-dimensional (3D) "signs" engine 123 configured to facilitate the generation of "signs" and the transfer of those "signs" between one or more game plays of one or more players. In particular, a "sign" may be generated by any player and located anywhere in the corresponding virtual environment. A "sign" may provide information, wherein the information may be helpful to other players (e.g., informing other players that the river is very deep at this location, but may be forded downstream around the bend). A "sign" may be harmful to other players (e.g., informing other players that the river can be forded at this location, when in fact the river has a steep drop-off two steps into the river, made even more deadly with high current flow). In addition, a "sign" may be neutral and just provides generic information (e.g., providing background information about the river mentioned above).

Client/server interactive gaming application 301 includes a Cryonet network generator 124 configured to generate the Cryonet in one player's game play as that network is being connected. For example, a region in a virtual environment may be associated with a local network that is established and managed by a localized group of individuals living in a corresponding fallout shelter. The local network may be joined to the Cryonet, such that that the Cryonet continuously expands with each addition of a local network.

Client/server interactive gaming application 301 includes a game environments manager 125 configured to generate and manage one or more virtual environments for game plays of corresponding players. Because each virtual environment is dynamic (e.g., affected by a player's actions), those changes to the corresponding virtual environment are updated by the game environment manager 125.

Client/server interactive gaming application 301 includes a path buildup manager 194 configured to track usage of one or more paths in one or more virtual environments. As previously described, as a corresponding path is continually traversed, that path becomes more built up with usage. In addition, paths may be built up from traverses of one or more players and their corresponding characters. Further, paths may be cross-pollinated between one or more virtual environments of one or more game plays.

Client/server interactive gaming application 301 includes an asset build engine 198, asset drop engine 127, and an asset POD engine 128, each of which may manage and store cross-pollinated assets in database 148. In particular, assets and/or objects can be generated by a player and corresponding character in a corresponding virtual environment. Asset build engine 198 is configured to build assets once the required building materials are collected by the player. Asset build engine 126 may also be configured outside of the cross-pollinating manager 195 as assets are built within a particular virtual environment. Cross-pollination of those assets to other virtual environments may be coordinated through asset drop engine 127, asset POD manager 128, and/or game environments manager 125. For example, a player may invoke the use of build engine 198 in order to build a bridge or zip line across a crater or river. Smaller objects may also be built, such as a rope, or net, or axe, etc. These smaller assets are carried by the character in the virtual environment, if that player wants access to those assets at a later date. However, carrying assets takes time and energy. That is, how the asset is carried, its weight, and other factors will determine how much energy is expended by the character during the game play. Ideally, the carrying of assets mimics reality, such that heavy objects or unwieldy are difficult to carry. At some point the player may decide that a particular asset is no longer worth the effort to carry around, and invokes the asset drop engine 127 to drop that asset at a particular location within the virtual environment. Dropped assets may become available to other players in their corresponding virtual environments. In addition, the player may carry one or more assets to PODs (e.g., public boxes) that are located in the virtual environment, wherein a POD is a receptacle built for storing assets. A player may drop assets at the POD, and may also pick up assets that are stored in the POD. The asset POD engine 128 manages what is stored in one or more PODs, and the interactions between players and their characters and the assets within those PODs (e.g., dropping off, or picking up, etc.).

Death and Crater Rebirth

Figure 4A:
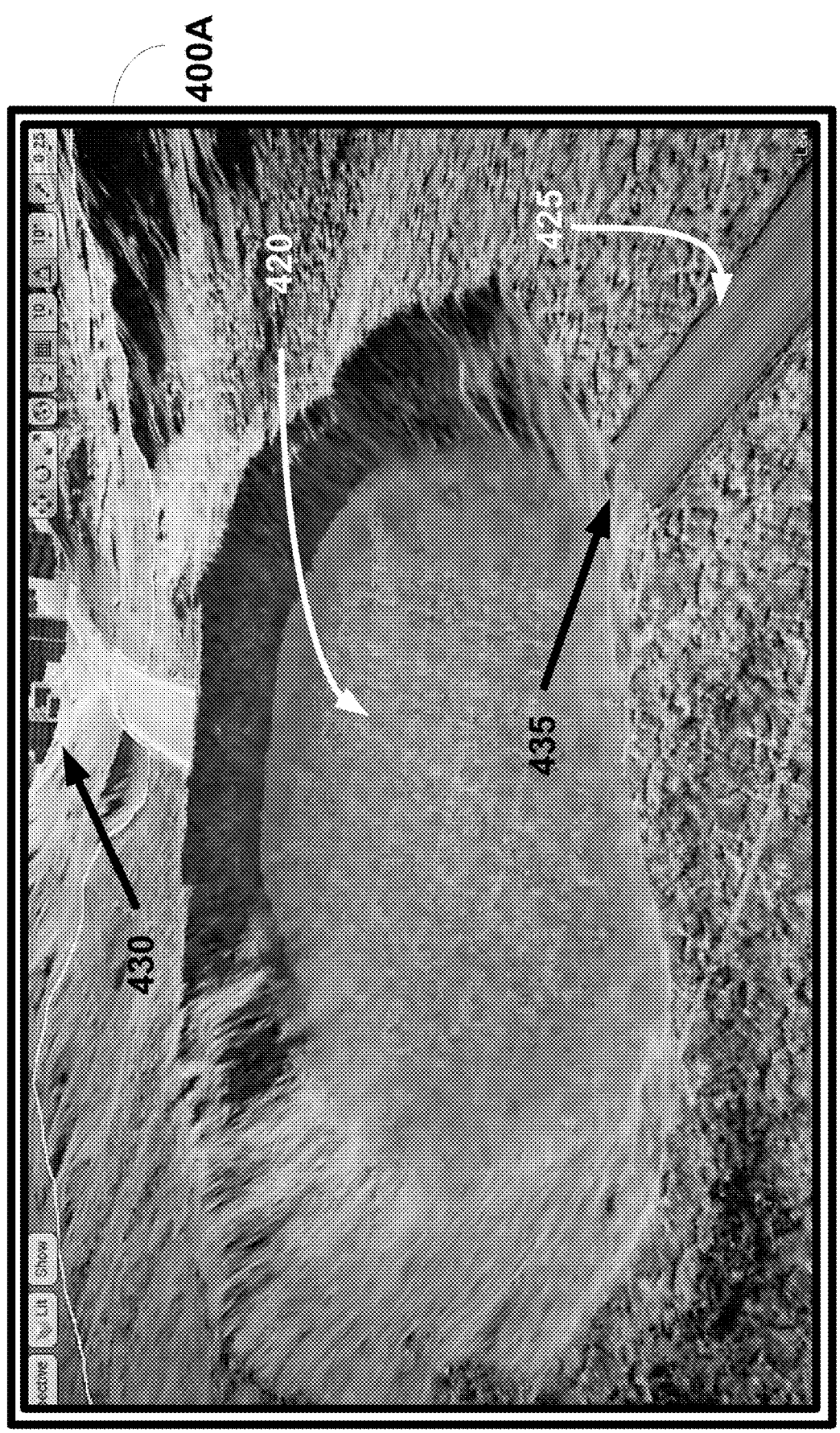
FIG. 4A is a screen shot of the influence an action of a player can have on a representative virtual environment of a representative interactive gaming application, in accordance with one embodiment of the present disclosure.
Figure 4B:
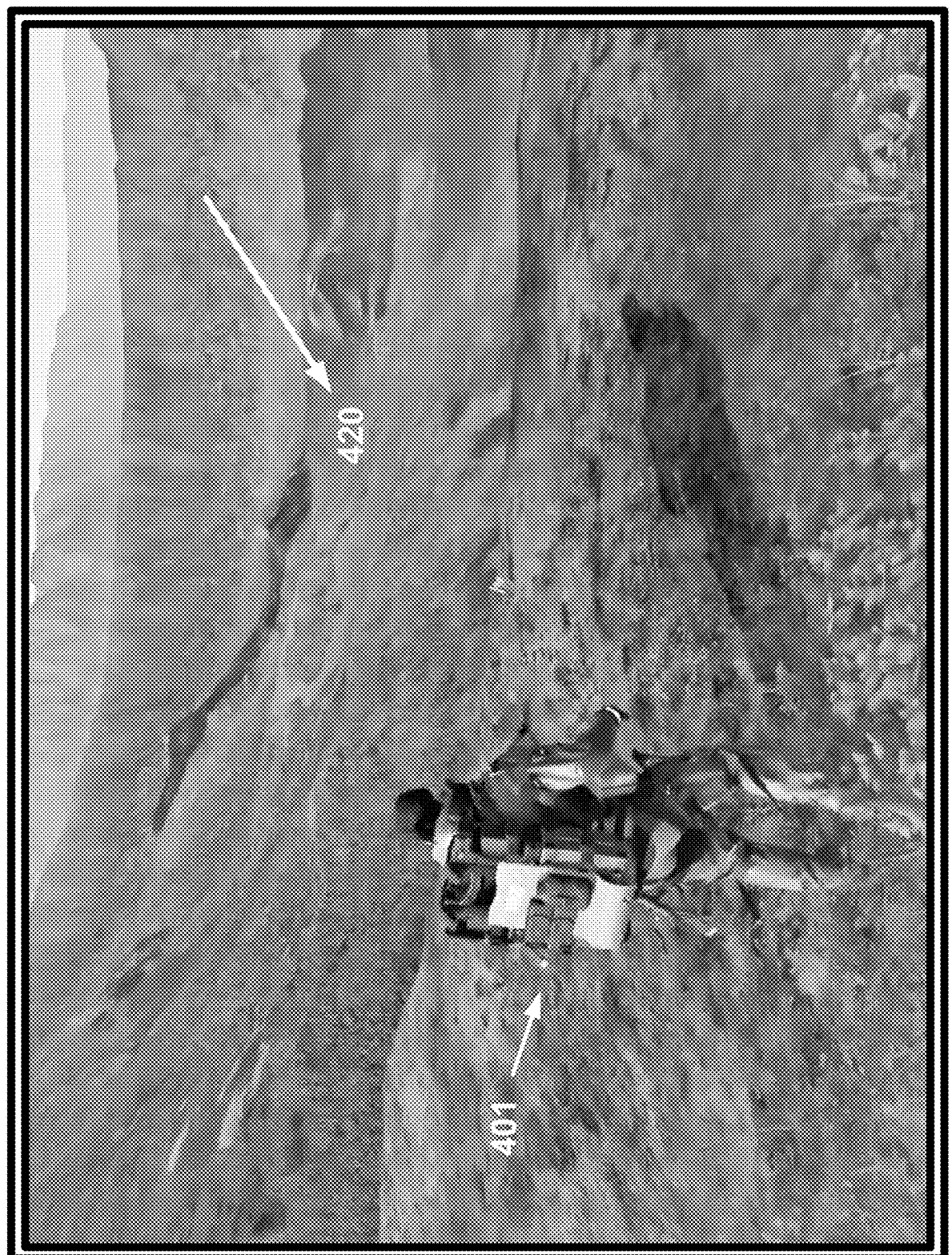
FIG. 4B is a screen shot of a character of a corresponding player that has reentered the virtual environment introduced in FIG. 3A on the edge of a void out or crater that was generated after the character was discovered by a party of the antagonist, in accordance with one embodiment of the present disclosure.
Figure 4C:
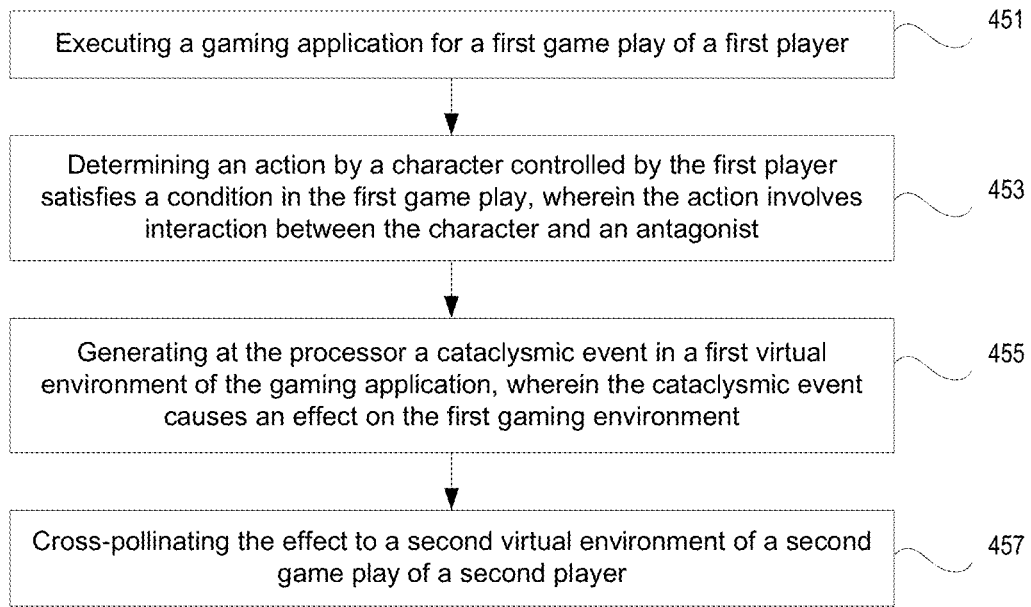
FIG. 4C is a flow diagram 400C illustrating steps in a method for connecting game plays between different players playing an interactive gaming application, in accordance with one embodiment of the present disclosure.

FIGS. 4A-4C illustrate how the game play of one player may influence the game play of one or more players even though the players may not be directly playing together in a gaming session supporting multiple players, in accordance with embodiments of the present disclosure. That is, players may be playing asynchronous game plays each in single-player mode, or the players may be playing simultaneously in multi-player mode. The concepts illustrated in FIGS. 4A-4C are described within the context of the representative interactive gaming application previously introduced, but are equally implementable within any interactive gaming application.

In particular, FIG. 4A is a screen shot 400A of the influence an action of a player can have on a representative virtual environment of a representative interactive gaming application, in accordance with one embodiment of the present disclosure. As previously described, the character of the interactive gaming application is trying to avoid discovery by monsters or creatures associated with the cataclysmic event, and upon a discovery causes a void out to occur. In one implementation, a sensor of the character is able to detect the presence and direction of the deadly monsters or creatures that may be invisible. Silence helps to avoid detection. The void out is accompanied by a violent and/or major explosion, which represents a collision between life and death or the after-life. In one implementation, the void out is manifested in the form of a crater 420. As shown, the crater 420 is formed in the middle of a road 425, and as such makes traversing across the terrain serviced by the road much more difficult. For example, the character may be on a mission to contact survivors holding out in the remnants of the city 430. The character was traveling along road 425, but met an untimely death at location 435 on the road.

The collision is analogous to when matter and anti-matter collide. The character goes into a state of purgatory between life and after-life during the collision. From this state of purgatory, the character can choose to return back to the interactive gaming application beginning at a point right after the last death or stranding occurring at the last void out. For example, FIG. 4B is a screen shot 400B of a character 401 of a corresponding player that has reentered the virtual environment introduced in FIG. 4A on the edge of a void out or crater 420 that was generated after the character 401 was discovered by a party of the antagonist, in accordance with one embodiment of the present disclosure. As shown, the character 401 is peering over the edge of the crater 420. The mission may involve reaching a point located beyond the far rim of the crater (e.g., the city 430), and as such, the character 401 has to navigate around the rim of crater 420, or go through the bottom of the crater 420, whereas previously road 425 provided traversal across the area occupied now by crater 425. As shown, the void out causes a major crater 420 (e.g., deformation in the world map of the virtual environment) (e.g., 0.5 to 3 miles in diameter), wherein navigation around or through the crater can be difficult for the character. Over time, any crater, such as the crater 420, may grow smaller in diameter and/or gets filled in (e.g., reduced depth). For example, as the character 401 completes a mission, the crater 420 is reduced in size. For example, after completing six missions, a crater may be completely filled in.

Further, the character 401 is allowed to regain assets previously owned at the time of death. In addition, the character 401 regains the baby for caretaking.

In one embodiment, a corresponding crater is generated by designating negative heights for a geographic point, and disabling the random generation of objects on the surface of the crater. Craters can be generated throughout the virtual environment, but some regions may be restricted from crater generation (e.g., a location having an important story point).

Further, from the state of purgatory the character can also return to a previous save point in the game play of the player. In particular, in the state of purgatory, there are one or more floating bodies, each representing a state of the game play of the player. The floating bodies may be representations of the character 401. These floating bodies may be representations of character strandings between life and after-life at each of those states along the progression of the game play. For example, a floating body may bring the character back to a previous game state occurring right after a previous void out, in one implementation. Basically, the previous save point is reloaded into the current game play. In another implementation, a floating body may bring the character back to the start of a previous mission (e.g., a mission involving traversing between points A and B). In that manner, the player can avoid the latest void out by re-initiating the game play at a previous point.

In one embodiment, crater generation is cross-pollinated between virtual environments of one or more game plays associated with one or more players, though in other embodiments crater generation is tied to only one player's game play. In particular, the crater from a first player is populated into the virtual environment of a second player. The cross pollination may occur even if the two players are not participating in a multi-player gaming session. That is, each of the players may be playing in single-player mode via asynchronous game plays; however, actions by one of the players may affect the game play of the other player. In a sense, the players are playing in an enhanced single-player mode, wherein characters may never actually meet in respective game plays. For example, a crater generated in one player's virtual environment is cross-pollinated into the other player's virtual environment. As such, this promotes a connection between the game plays of the two players.

With the detailed description of the various modules of the gaming server and client device communicating over a network, a method for gaming is now described in relation to flow diagram 400C of FIG. 4C, in accordance with one embodiment of the present disclosure. Flow diagram 400C illustrates the process and data flow of operations involved for purposes of connecting game plays between different players playing an interactive gaming application, in accordance with one embodiment of the present disclosure. Flow diagram 400C can be implemented within the client device 100 and/or game server 205, such as through one or more of client interactive gaming application 126, server side interactive gaming application 190 and/or the cross-pollinating manager 195 to facilitate the cross-pollination of data across one or more virtual environments of one or more game plays of one or more players, wherein players may be playing asynchronous game plays each in single-player mode, or the players may be playing simultaneously in multi-player mode. For example, the death and rebirth engine 191 may be configured to manage the death and rebirth of a character, and cross-pollinate its effects to other game plays.

At 451, the method includes executing an interactive gaming application for a first game play of a first player. For example, the interactive gaming application is executed by a local client device, with information about the game play delivered to the back-end game server 205 for connecting one or more game plays through the cross-pollination of data.

At 453, the method includes determining an action by a character controlled by the first player involving an antagonist of the interactive gaming application satisfies a condition in the first game play. For example, the action may involve the character meeting the antagonist, trying to evade the antagonist, and the antagonist discovering the character at some location in the virtual environment.

At 455, the method includes generating a cataclysmic event (e.g., a void out) in a first virtual environment of the interactive gaming application, wherein the cataclysmic event causes an effect on the first virtual environment. For example, the cataclysmic event may be the formation of a crater in the virtual environment. That is, the effect is the crater. The crater makes traversal through the corresponding region more difficult, as the character now has to either go down through the crater, or go around the rim of the crater to reach the other side of the crater. In other embodiments, some type of event is generated in response to the action.

Upon generation of the cataclysmic event, the method includes causing the character to fall into a state between life and death. Further, the character is suspended in a fluid while in the state. The fluid is configured for rebirth of the character. For example, the character may be placed into what may be amniotic fluid while the player is determining how to proceed with the game play. In the state between life and death, one or more character forms are suspended in the fluid, wherein the character forms representing previous and current game states in the game play. In one implementation, the character forms take on the shape of the character. The player is able to select one of the character forms to restart the game play. In particular, the method includes receiving selection of a selected character form. The method includes initiating game play of the character using the game state corresponding to the selected character form.

In one embodiment, when initiating the game play of the character, the method includes loading a previous game state corresponding to the selected character form. That is, the player is returned to a previous point in his or her game play corresponding to the game state of the selected character form. As such, the player can avoid having the crater in the virtual environment by returning to the previous point. For example, the previous game state corresponds to a beginning point of a mission in the interactive gaming application, such as when the character first enters into a region with the intent to meet the survivors of that region and convincing them to join the Cryonet network. In another example, the previous game state corresponds to any save point in the game play of the player.

In one embodiment, when initiating the game play of the character, the method includes loading a current game state corresponding to the selected character form. That is, the player is returned to a current point in his or her game play. In particular, the character is returned to the location in the virtual environment just after the occurrence of the cataclysmic event. For instance, the character is placed on the rim of the crater that was generated. The location of the character in the virtual environment may be close to where the character met the antagonist triggering the formation of the crater. In another implementation, the character is placed at the edge of the crater at a point that is furthest away from an intended destination (e.g., a city on the other side of the crater).

At 457, the method includes cross-pollinating the effect (e.g., crater) to a second virtual environment of a second game play of a second player. For example, the game environments manager 125 is configured to make adjustments to corresponding virtual environments. As such, the crater is placed into the virtual environment of the first player, and a similar crater (e.g., at the same location) is placed into the virtual environment of the second player. In that manner, events that occur in a first game play of a first player may also occur in a second game play of a second player. For example, the crater generated in the first game play of the first player is also generated in the second game play of the second player.

In one embodiment, the first game play is part of a first single-player gaming session, and the second game play is part of a second single-player gaming session. Each of the single-player gaming sessions is independent of each other. In a further embodiment, the first single-player gaming session and the second single-player gaming session are not occurring simultaneously. However, the event and/or the effect of the event (e.g., the crater) is still cross-pollinated to the second game play, even though the second game play may occur at a different (e.g., later) time than the first game play.

In another embodiment, the first game play and the second game play are part of a multi-player gaming session. That is, both game plays share the same virtual environment. As such, the event and/or the effect of the event (e.g., the crater) is placed into the virtual environment, and immediately influences both game plays.

In still another embodiment, the first game play is part of a first multi-player gaming session and the second game play is part of a second multi-player gaming session. Each of the multi-player gaming sessions is independent of each other. In a further embodiment, the first multi-player gaming session and the second multi-player gaming session are not occurring simultaneously. However, the event and/or the effect of the event (e.g., the crater) is still cross-pollinated to the second game play, even though the second game play may occur at a different (e.g., later) time than the first game play.

In another embodiment, the first game play is part of a single-player gaming session and the second game play is part of a multi-player gaming session, or vice versa. Each of the single-player and the multi-player gaming sessions is independent of each other. In a further embodiment, the single-player gaming session and the multi-player gaming session are not occurring simultaneously. However, the event and/or the effect of the event (e.g., the crater) is still cross-pollinated to the second game play, even though the second game play may occur at a different (e.g., later) time than the first game play.

As will be further described below, other embodiments promote additional communication and relationships between players during game plays of an interactive gaming application. For example, one player may help other players navigate through or around the crater by placing signs having useful information, or one player may build a bridge across the crater, or one player may build a zip line across the crater. As such, actions by one player in their virtual environment may affect the game plays of other players.

Network Building

As previously described, the character in the interactive gaming application introduced in FIG. 4A is navigating through a world after a world destructive event. The previous communication network has been destroyed. The internet may be such a communication network. As a result, individuals and regions throughout the world have become disconnected from each other. However, after the destruction, regions have built up local patchwork networks. In every region, the character is trying to convince the survivors (e.g., those located in a fallout shelter) who have established their corresponding local network to connect with others in other regions of the world by joining the overall Cryonet network. As more and more local or regional networks join, the Cryonet network becomes larger, and the goal is to complete the network to include the local networks from all the regions. The character may travel from region to region as a courier, delivering communications and/or items from one region to another. For instance, the character may be delivering medicine from one region to another, or may be delivering a message.

Once successfully joining the Cryonet, the information (e.g., signs, likes, advisory information, etc.) provided through the local network is now made available to the character, and possibly to other players. The information may be provided through a map of the Cryonet. Information may also include where other players have traveled through the corresponding region, such as in the map. Also, assets are made available through the network, such as assets made by a player (e.g., zip line, bridge, etc.). Asset locations may be provided in the map. In particular, groups or blocks of players are able to access the information and/or assets generated by any of the players, or that are made accessible to any of the players. For example, a group may be defined as friends in a social network, such as a PlayStation network (PSN). Another group may include friends of the social network, and friends of those friends to create an expanded group. Still another group may include players that are part of one or more social networks, but have some common relationship. Another group may be defined by those players supported by a particular server. In that case, the players/users of that server may or may not be friends. In one embodiment, a player may move between groups to continue his or her game play. In another embodiment, a player remains within a group throughout his or her game play.

The information and/or assets available to each of a group of players, wherein players may or may not be directly playing together in a gaming session supporting multiple players, help to connect the players together. For example, communication strands help to connect one player to other players, wherein the communication strands may include information that are cross-pollinated into the virtual environments of the group of players. Asset strands also help connect one player to other players, wherein the assets form strands that are cross-pollinated across virtual environments of one or more players of one or more gaming sessions. Because the assets are available to players in the group, a sense of community is formed as players are able to create objects that are then made available to other players. For example, a multi-use bridge is made by one player and is used by other players to help them through their respective games. Other objects may be generated for purposes of one-time use, but can be generated by one player and used by another player. As the assets and information can be used to help the group as a whole, the game plays of players in the group also benefit. In that manner, in one measure the progression through each of the game plays may be faster in terms of reaching and/or completing their ultimate objectives as helpful information is provided to all the game plays, and other assets useful in completing missions and/or traversing across terrain is made available to a player, who otherwise would have had to discover and/or build those assets.

Figure 5:
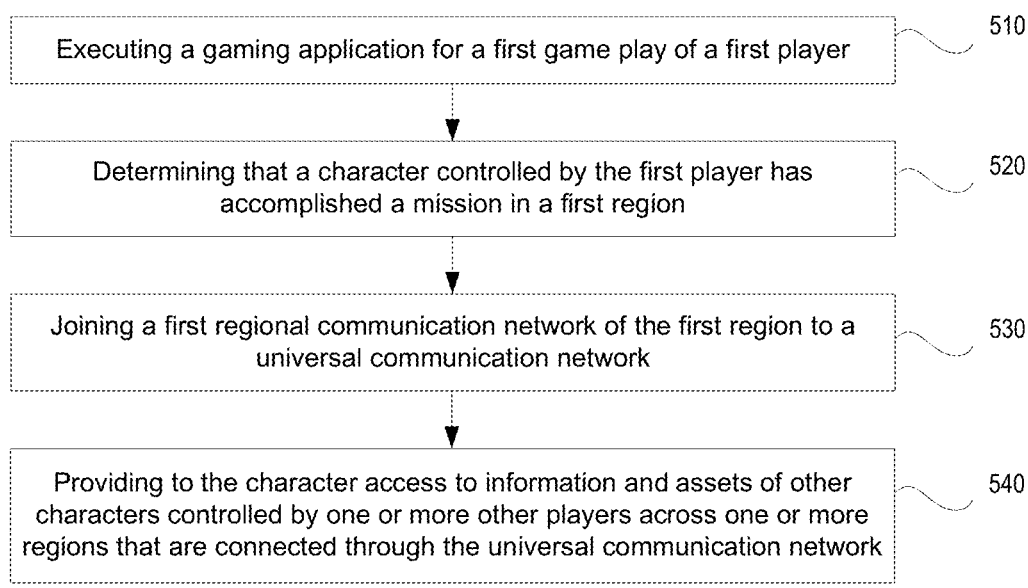
FIG. 5 is a flow diagram 500 illustrating steps in a method for connecting a local regional communication network to a universal communication network for purposes of accessing information and assets of one or more game plays, in accordance with one embodiment of the present disclosure.

With the detailed description of the various modules of the gaming server and client device communicating over a network, a method for gaming is now described in relation to flow diagram 500 of FIG. 5, in accordance with one embodiment of the present disclosure. Flow diagram 500 illustrates the process and data flow of operations involved for purposes of connecting a local regional communication network to a universal communication network for purposes of accessing information and assets of one or more game plays, in accordance with one embodiment of the present disclosure. Flow diagram 500 can be implemented within the client device 100 and/or game server 205, such as through one or more of client interactive gaming application 126, server side interactive gaming application 190 and/or the cross-pollinating manager 195 to facilitate the cross-pollination of data across one or more virtual environments of one or more game plays of one or more players, wherein players may be playing asynchronous game plays each in single-player mode, or the players may be playing simultaneously in multi-player mode. For example, the Cryonet network generator 124 is configured to connect the regional network to the universal network, in one embodiment.

At 510, the method includes executing an interactive gaming application for a first game play of a first player. For example, the interactive gaming application is executed by a local client device, with information about the game play delivered to the back-end game server 205 for connecting one or more game plays through the cross-pollination of data.

Moreover, a virtual environment of the interactive gaming application includes a plurality of regions. For example, the virtual environment can correspond to a nation, wherein the nation is divided up into one or more regions. In addition, each of the regions has a corresponding regional communication network that is configured to provide communication between the surviving persons within that region. In one embodiment, an objective of a character controlled by the first player is to join each of the corresponding regional communication networks to form a universal communication network. As such, the character travels from region to region trying to join each local regional communication network to the universal communication network.

At 520, the method includes determining that a character controlled by the first player has accomplished a mission. The mission may be previously defined at the start of the game, or when deciding to traverse to the current region from a previous region. For example, the mission may be connected to the two regions, such as delivering a message from the previous region to the current region, or delivering an object (e.g., medicine, message, etc.) from the previous region to the current region. The mission may also involve performing activities within the region, such as beating a boss of the current region, or any other defined activity. For example, the mission may involve convincing survivors within the first region to join the universal communication network, wherein the survivors within the first region control the first regional communication network.

At 530, the method includes joining a first regional communication network of the first region to the universal communication network in response to the successful completion of the mission at 520. As the character joins more and more local regional communication networks, the universal communication network expands. In one implementation, the universal communication network is the Cryonet network.

At 540, the method includes providing to the character of the first player access to information and assets of one or more other players across one or more regions that are connected through the universal communication network. For example, once the regional communication network is joined to the universal communication network, information and assets of other players who have also successfully accomplished the mission to join their respective regional communication networks to their respective universal communication network are made available to the character of the first player. In a sense, all the regional communication networks (i.e., the same regional network) for all the game plays are joined so that the information and assets provided through respective regional communication networks is cross-pollinated for access by the first player. Also, the locations of other players within the corresponding region of the local communication network, or of all connected regions corresponding to connected local communication networks, may be provided within the information. In one embodiment, a map of the Cryonet network is generated, and includes information illustrating the joined local regional communication networks, as well as other information, such as assets, asset locations, other player locations (e.g., through a corresponding character), visited regions through the player or other players, etc.

The information and assets of other players may be limited to those players who belong to a group or block of players, as previously described. For example, the players may be part of a social network, such as friends of a social gaming network. As previously described, the players in the group may each be playing a single-player gaming session, each of which is independent of the others. And the gaming sessions may not be occurring simultaneously, though the assets and information is still cross-pollinated. In another embodiment, the players in the group may be playing in a single multi-player gaming session. In still another embodiment, the players in the group may be part of one or more multi-player gaming sessions. The different multi-player gaming sessions may not be occurring simultaneously. In still another embodiment, the first game play of the first player is part of a single-player gaming session, while at least one other game play of the other players in the group may be part of a multi-player gaming session. The single-player and the multi-player gaming sessions need not be occurring simultaneously.

In another embodiment, the character of the first player is provided access to information and assets of other players who have successfully connected to at least one other regional communication network. That is, although the first player has joined the first regional communication network to the universal network and as such has gained information and assets corresponding to that first regional communication network, the first player may also gain access to information and assets corresponding to a second regional communication network. For example, the first player may have not joined the second regional communication network in his or her game play. However, another player (e.g., second player) that is in the same group or block as the first player (e.g., friends of a social network, such as a gaming social network) may have already joined the second regional communication network in his or her game play. As such, the first player may gain access to the information and/or assets available to the second player through the second regional communication network.

Asset, including asset building, asset drop, asset carry, and PODs

Embodiments of the present disclosure provide for the generation and/or building of assets by players in their game plays through their respective characters. In particular, asset build engine 198 may be configured to build assets once the required building materials are collected by the player. The building of an asset may follow traditional processes. For example, each asset may require the collection of one or more resources, materials, and/or building blocks (e.g., wood, metal, resin, etc.) throughout the virtual environment for building and/or the accomplishment of one or more tasks. The resource may be discovered through wanderings in the virtual environment. In addition, the collection of a resource may require the accomplishment of a task. Once the required resources are collected, the corresponding asset may be built. For example, the resources may be inserted into an asset building system, wherein individual systems may be distributed throughout the virtual environment, and located through a map.

Further, without the collection of resources, an asset may be acquired through the accomplishment of a task. Depending on the complexity and importance of the asset, one or more tasks may be required for completion before the asset is acquired. In addition, an asset may be found within the virtual environment, such as through discovery while wandering.

Once the asset is acquired, the character may carry the asset while wandering through the virtual environment, especially for purposes of accessing that object at a later time for various purposes (e.g., direct use, indirect use as a bargaining chip, for favor, for use in building relationships, etc.). The asset may be any tangible or intangible object, as is commonly used throughout the game development world. Purely for illusion, tangible objects may include coins, currency, animals, tools, ropes, expandable ladder, zip line, power suit (e.g., self-contained environmental suit), catapult, watchtower with periscope, net, axe, large objects, bridges, roads, etc. Also, purely for illusion, intangible objects may include skills, knowledge, etc. The asset may be used by the character at an opportune time. Further, the asset may be discarded at any time. For example, a character may carry an asset for a period of time, and then drop the asset at any point in the virtual environment. Also, the character may store the asset in a predefined location.

Embodiments of the present disclosure provide for cross-pollination of assets/objects between virtual environments of multiple players, wherein the cross-pollination of those assets/objects persist over time and between gaming sessions in one or more virtual environments. For example, the asset drop engine 127 may be configured to cross-pollinate an asset to one or more virtual environments. In that manner, an asset may provide a connection between players in their respective game plays over one or more gaming sessions, as previously introduced. In particular, cross-pollinating manager 195 is configured to manage data that is cross-pollinated across one or more virtual environments, including coordinating communication strands, cross-pollination of assets, configuration of the Cryonet network, etc. As such, the cross-pollination of an asset may create a communication strand or connection between two or more players. For example, an asset may be placed by a first player into a first virtual environment during a first game play. Through cross-pollination, that asset is placed into a second virtual environment. For example, that asset may be a rope or bridge that spans an obstacle. The asset in the second virtual environment is used by the second player in a second game play, such as when crossing the obstacle. In one embodiment, there is a limitation placed on the number of identical objects that can be placed into a virtual environment. For example, there may be a limit of two ropes that can be placed into a particular location of one or more corresponding virtual environments, of one or more game plays.

The asset may further facilitate communication between two or more players, such as the first and second players. For example, the first player may place a sign at or near the asset, wherein the sign informs others in one or more virtual environments that the asset is placed for purposes of navigating past the obstacle. Further, the sign may be accessed in the game plays of other players, even though their character may not be close to the asset. For instance, the second player may have a character that is not located near the asset (e.g., game play is less advanced) but is aware of the asset and its location for use at a later time. The second player may adjust his or her game play to employ the use of the asset. The second player may provide for further connection between the players by placing a "like" after using the asset. The "like" is accessible by the first player to complete the connection between the first and second players.

Figure 6A:
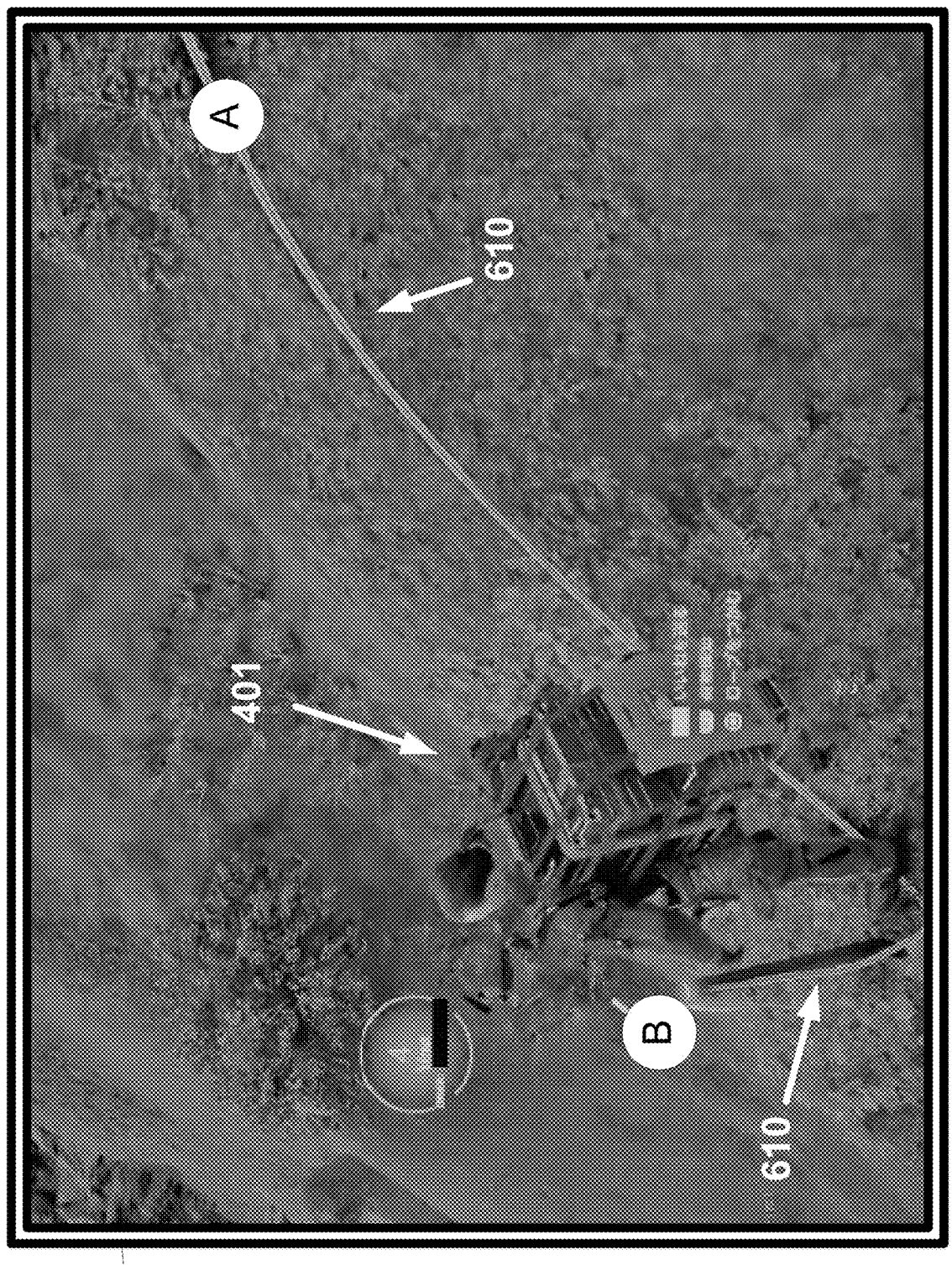
FIG. 6A is a screen shot illustrating the character, introduced in FIG. 4B of the representative interactive gaming application introduced in FIG. 3A, encountering a rope arranged in a manner to aid in traversing across varied terrain, wherein the rope was placed in a location of a virtual environment by another player and corresponding character, in accordance with one embodiment of the present disclosure.

FIG. 6A is a screen shot 600A illustrating the character 401 encountering a rope 610 arranged in a manner to aid in traversing across varied terrain, in accordance with one embodiment of the present disclosure. The character 401 was previously introduced in FIG. 4B for game play of the representative interactive gaming application introduced in FIG. 4A. As shown, rope 610 is placed at least between points A and B to help the character 401 travel downwards through the ravine or chasm to point B and beyond. Without the rope, the character would surely slip and fall down the steep hillside, potentially resulting in harm to the character 401.

The rope 610 may be placed by another player (e.g., second player) and their corresponding character, and used by one or more players in their respective game plays. For example, a first player who did not place rope 610 may be controlling character 401, and may use rope 610 to travel downwards to point B. As previously described, rope 610 may provide a communication strand between the two players—the first and second players. In particular, the first player controlling character 401 may know of the placement of the rope 610 by accessing a sign, or other means for messaging, placed by the second player at the location of the asset. The first player may access the sign, even though character 401 is not near the location of the rope 610. The first player may also just discover the sign during his or her game play, such as when approaching the ravine shown in FIG. 6A. After using the rope in his or her game play, the first player may send a "like" to the player (e.g., second player) who placed rope 610 at that location. In that manner, there is a communication strand established between the first and second players.

FIG. 6B is a screen shot 600B illustrating the character 401 viewing a bridge 630 built over a natural obstacle 620 (e.g., a river). The character 401 may have just crossed the bridge 630, or may be approaching the bridge to cross the river 620. Without the bridge, the character 401 may not have been able to cross to the other side of the river 620, as the river may be too deep for wading, and too swift to swim. The addition of multiple objects and/or assets being carried by character 401 exacerbates the problem of how to cross the river 620.

The bridge 630 may be built in a location of a corresponding virtual environment by another player (e.g., second player) and their corresponding character. Further, that bridge may be used by one or more other players in their respective game plays. For example, the first player controlling the character 401 as shown in FIG. 6B may use bridge 630 to traverse over river 620. Just as in the case of the rope 610 of FIG. 6A, bridge 630 may provide a communication strand between the two players—the first and second players. For illustration, the first player may know of the bridge by a sign, or other means for messaging, that is placed by the second player (e.g., builder). The first player may access the sign when character 401 is near or remote from the bridge 630. After using the bridge 630 in his or her game play, the first player may send a "like" to the player (e.g., second player) who placed bridge 630 at that location. In that manner, there is a communication strand established between the first and second players.

Figure 7A:
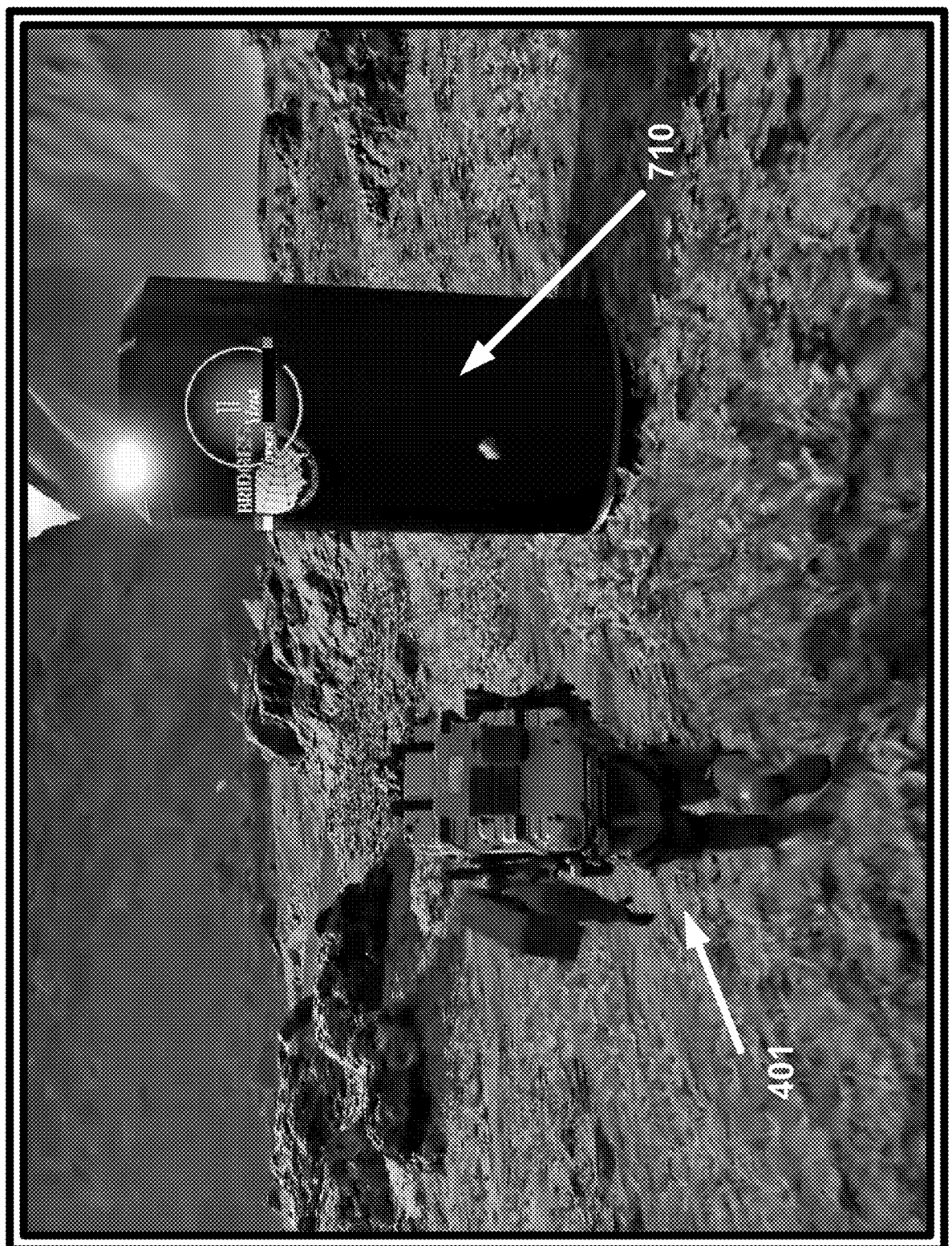
FIG. 7A is a screen shot illustrating character, introduced in FIG. 4B of the representative interactive gaming application introduced in FIG. 3A, traveling through a virtual environment and encountering a POD configured for storing assets that may be available to one or more players of an interactive gaming application, in accordance with one embodiment of the present disclosure.

FIG. 7A is a screen shot 700A illustrating the distribution of assets through one or more virtual environments, in accordance with one embodiment of the present disclosure. In particular, the character 401 is traveling through a virtual environment. The character 401 was previously introduced in FIG. 4B for game play of the representative interactive gaming application introduced in FIG. 4A. As shown, the virtual environment may be a gradually sloping, rocky terrain that leads up to a pass between two thrusting mountains in the background.

In addition, the character 401 is approaching a public box or POD 710 that is configured for storing assets that may be available to the public, such as one or more players of an interactive gaming application. That is, POD 710 may be a repository capable of storing assets (e.g., tangible, intangible, etc.) that are available to anyone entering the POD 710. The assets contained within POD 710 may have been placed by one or more other players in their respective game plays. In addition, assets in POD 710 have been previously placed by character 401, and the character 401 is returning to retrieve the same asset.

The POD 710 provides for the cross-pollination of assets/objects between virtual environments of multiple players, wherein the cross-pollination of those assets/objects persist over time and between gaming sessions in one or more virtual environments. For example, the asset POD manager 128 or game environments manager 125 may be configured to cross-pollinate the assets stored therein to one or more virtual environments. That is, once an asset is placed into POD 710, that asset is available to one or more players through their respective PODs that are each placed into the approximately the same location in respective virtual environments. Further, once an asset is taken from any of the PODs, that asset is removed from all the PODs in all the virtual environments, such as by the asset POD engine 128. In that manner, the POD 710 that is distributed across one or more virtual environments, along with the assets contained therein, is able to create a connection between two or more players across one or more virtual environments.

For example, one player is able to place into POD 710 an asset. Another player is able to access that object in a respective POD in his or her respective virtual environment. As such, the cross-pollination of an asset through PODs may create a communication strand or connection between two or more players. In addition, communication strands between players may help to notify players of the placement of an asset into a POD. For example, a sign may be placed by character 401 near pod 710 in association with a placed object. That sign may be accessed by other players (e.g., players of a group or block—such as friends of a social network) in their respective virtual environments, such that those players now know of the placement of the asset into the POD. Another player may go to a corresponding POD, and retrieve the asset. Afterwards, the retrieving player may deliver a "like" in association with the retrieved asset, such that the depositing player may receive that "like". As such, the deposited and retrieved asset may create a communication strand between the depositing player and the retrieving player.

Figure 7B:
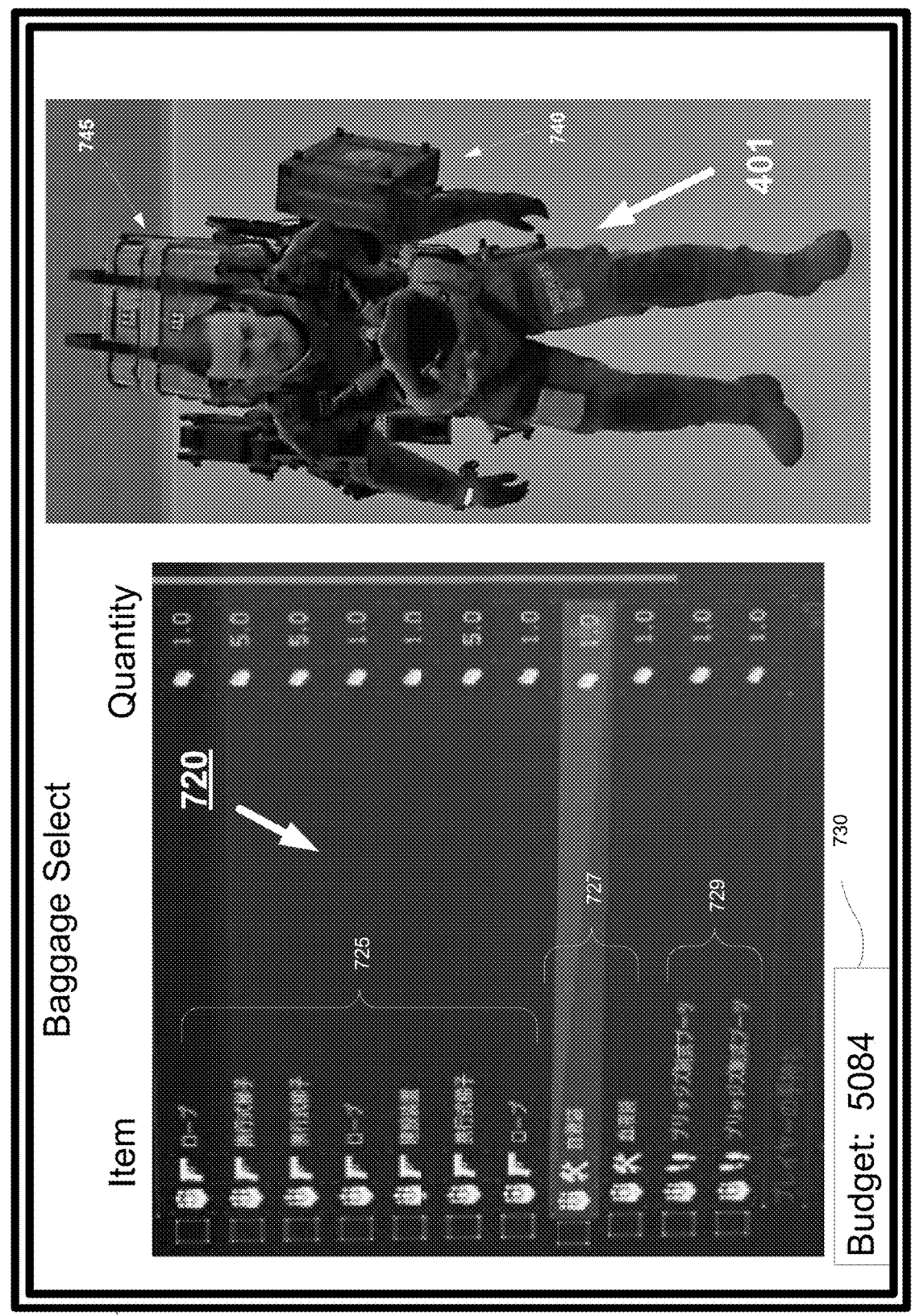
FIG. 7B is a screen shot illustrating the character, introduced in FIG. 4B of the representative interactive gaming application introduced in FIG. 3A, selecting assets from a menu of items available for taking within the POD, and the selectable distribution of the assets, in accordance with one embodiment of the present disclosure.

FIG. 7B is a screen shot 700B illustrating the character 401 selecting assets from a menu of items 720 available for taking within the POD 710, in accordance with one embodiment of the present disclosure. In particular, the character 401 has entered into or has opened up the POD 710 to gain access to the interior. As such, character 401 is able to deposit an asset, or acquire an asset that is stored in POD 710. As previously described, the assets in POD 710 may have been deposited by one or more players in one or more virtual environments. The virtual environments are associated with one or more game plays of one or more gaming sessions.

As shown, menu 720 includes multiple items and the quantity of each of the items. Items that are stored may include weapons (e.g., guns, etc.) 725, tools (e.g., pickaxe, etc.) 727, and footwear (e.g., boots, etc.) 729. Character 401 has a budget 730 from which currency may be taken for purposes of purchasing an asset. After selection of an asset from menu 720, the corresponding amount of currency for purchasing the asset is deducted from the total in the budget 730.

After selection of an item, placement of that item is performed by character 401. That is, the player is able to selectably distribute carried items on the body of character 401. For example, the selected item may be placed into one of multiple carrying cases distributed across the body of character 401. For example, the selected item may be placed into the carrying case 740 that is located on the left arm of the character 401. In addition, the selected item may be placed into the carrying case 745 that is located on the back of the character 401. The weight and location of the carried asset on the body (e.g., via carrying cases) may affect the balance of character 401, as will be described more fully below.

Figure 8:
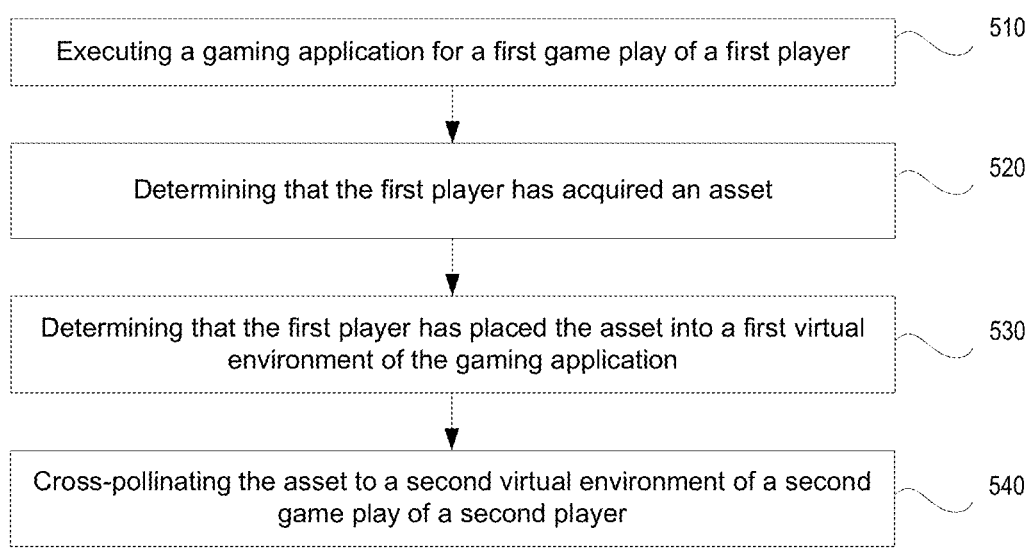
FIG. 8 is a flow diagram 800 illustrating steps in a method for acquiring an asset in a virtual environment, and cross-pollinating that asset across one or more virtual environments of one or more game plays, in accordance with one embodiment of the present disclosure.

With the detailed description of the various modules of the gaming server and client device communicating over a network, a method for gaming is now described in relation to flow diagram 800 of FIG. 8, in accordance with one embodiment of the present disclosure. Flow diagram 800 illustrates the process and data flow of operations for purposes of acquiring an asset in a virtual environment, and cross-pollinating that asset across one or more virtual environments of one or more game plays, in accordance with one embodiment of the present disclosure. Flow diagram 800 can be implemented within the client device 100 and/or game server 205, such as through one or more of client interactive gaming application 126, server side interactive gaming application 190 and/or the cross-pollinating manager 195 to facilitate the cross-pollination of data across one or more virtual environments of one or more game plays of one or more players, wherein players may be playing asynchronous game plays each in single-player mode, or the players may be playing simultaneously in multi-player mode. For example, the asset build engine 126, asset POD manager 128, and/or the asset drop manager 127 are configured such that a character in a virtual environment can build and/or acquire an asset, and further to cross-pollinate that asset to one or more virtual environments.

At 810, the method includes executing an interactive gaming application for a first game play of a first player. For example, the interactive gaming application is executed by a local client device, with information about the game play delivered to the back-end game server 205 for connecting one or more game plays through the cross-pollination of data.

At 820, the method includes determining that the first player has acquired an asset. For example, the first player through a correspondingly controlled character may have built the asset using one or more resources acquired by the character during the first game play. For example, a boring matching as the asset may require multiple resources including metal, bits, wheels, etc. Each of those resources need to be collected before the boring machine can be built. In addition, the character may take the resources to a location (e.g., build shop) to create the asset. Other methods may be employed for acquiring the asset. For example, the first player may discover the asset in the virtual environment. That asset may have been placed into the virtual environment for discovery by the game developer. In another embodiment, the asset may have been placed into another virtual environment by a second player in his or her game play. That asset may have been cross pollinated to the virtual environment of the first player for purposes of discovery and usage. In another example, the first player may have accomplished a first task after which the asset is assigned to the first player. In still other embodiments, a combination of the above may be implemented for acquiring assets.

At 830, the method includes determining that the first player has placed the asset into a first virtual environment of the interactive gaming application. After acquiring the asset, the character controlled by the first player may carry the asset around during his or her game play. After a period of time, the first player may determine that it is more beneficial to give up the asset. It may be that the character can no longer carry the asset due to poor health, or that the character has made a deal with another player to leave the asset at a specific location in respective virtual environments. As previously described, once control of an asset is given up, another player is able to acquire that asset within their respective virtual environment.

In one embodiment, the method includes determining that the first player has dropped the asset into the virtual environment at a particular location. That is, in the middle of wandering through the virtual environment, the character leaves the asset at that location. The location may be at random, or may be predefined, such that that player can return and reacquire that asset, or that another player may acquire that asset from a similar location in his or her virtual environment.

In another embodiment, the method includes determining that the first player has placed the asset into a first repository of the first virtual environment. For example, the repository may be a POD, as introduced in FIGS. 7A-7B. The repository allows the asset to be cross-pollinated into other repositories of other virtual environments, as previously described. In particular, that same asset can be stored and accessed in multiple repositories. As such, once that asset is picked up or selected for acquisition, that asset is then removed from all corresponding repositories. For example, the asset that is placed into repositories of one or more virtual environments may be selected for removal by any player. Once selected, then that asset is removed from all the corresponding repositories. In another example, the repository in the first virtual environment may have included a second asset. The first player removes that asset from his or her repository. Thereafter, the second asset is removed from the repository. In addition, the second asset is removed or deleted from any other repository that has stored that asset, such as removing the second asset from a second repository of a second virtual environment, of a second game play of a second player.

The asset that is cross-pollinated across one or more virtual environments may be limited to those players who belong to a group or block of players, as previously described. For example, the players may be part of a social network, such as friends of a social gaming network. As previously described, the players in the group may each be playing a single-player gaming session, each of which is independent of the others. And the gaming sessions may not be occurring simultaneously, though the assets and information is still cross-pollinated. In another embodiment, the players in the group may be playing in a single multi-player gaming session. In still another embodiment, the players in the group may be part of one or more multi-player gaming sessions. The different multi-player gaming sessions may not be occurring simultaneously. In still another embodiment, the first game play of the first player is part of a single-player gaming session, while at least one other game play of the other players in the group may be part of a multi-player gaming session. The single-player and the multi-player gaming sessions need not be occurring simultaneously.

Communication Via Signs

FIGS. 9A-9D illustrate how in-game communication between players is implemented, wherein the players are playing in single-player, multi-player, or a mesh between single and multi-player modes over one or more communication sessions. In particular, the connection between the players is implemented through signs that are placed within one or more virtual environments. The signs may be in 3D. For example, a sign may be generated by a player and placed at a location within a corresponding virtual environment. In addition, that sign is cross-pollinated into another player's virtual environment at approximately the same location. The cross-pollination occurs when the players are playing in the same virtual environment (e.g., supporting a multi-player gaming session), or if the players are separately playing (e.g., in single-player mode) their game plays in respective virtual environments. That is, in either mode, or in a mesh between the two modes, signs placed by one player are made available to other players in their respective virtual environments.

Signs may be generated for different reasons and for different accomplishments. In one case, a sign may provide information. For example, a sign may provide information about the surrounding terrain, such as informing other players that the terrain is extremely difficult to traverse and that it would be beneficial to take an alternate path; that there are deadly monsters or creatures in the vicinity; that there is a safe house up ahead, etc. The sign may provide true information intending to provide assistance to other players, in one implementation. For example, the terrain may be truthfully harsh and it would be easier to traverse that area by taking the alternate path. On the other hand, the sign may provide false information intending to impede the progress of other players (e.g., by fooling or tricking or misleading the other players), in another implementation. For example, the terrain may actually be very tame easy to traverse, whereas the alternate path would be very difficult to traverse. In that case, if the player reading the sign believes the sign is truthful and takes the alternate path, then the game play of that player has been adversely affected (leading the character into harm) with regards to accomplishing a mission that requires traversal through the terrain (e.g., either directly or indirectly via the alternate path).

Figure 9A:
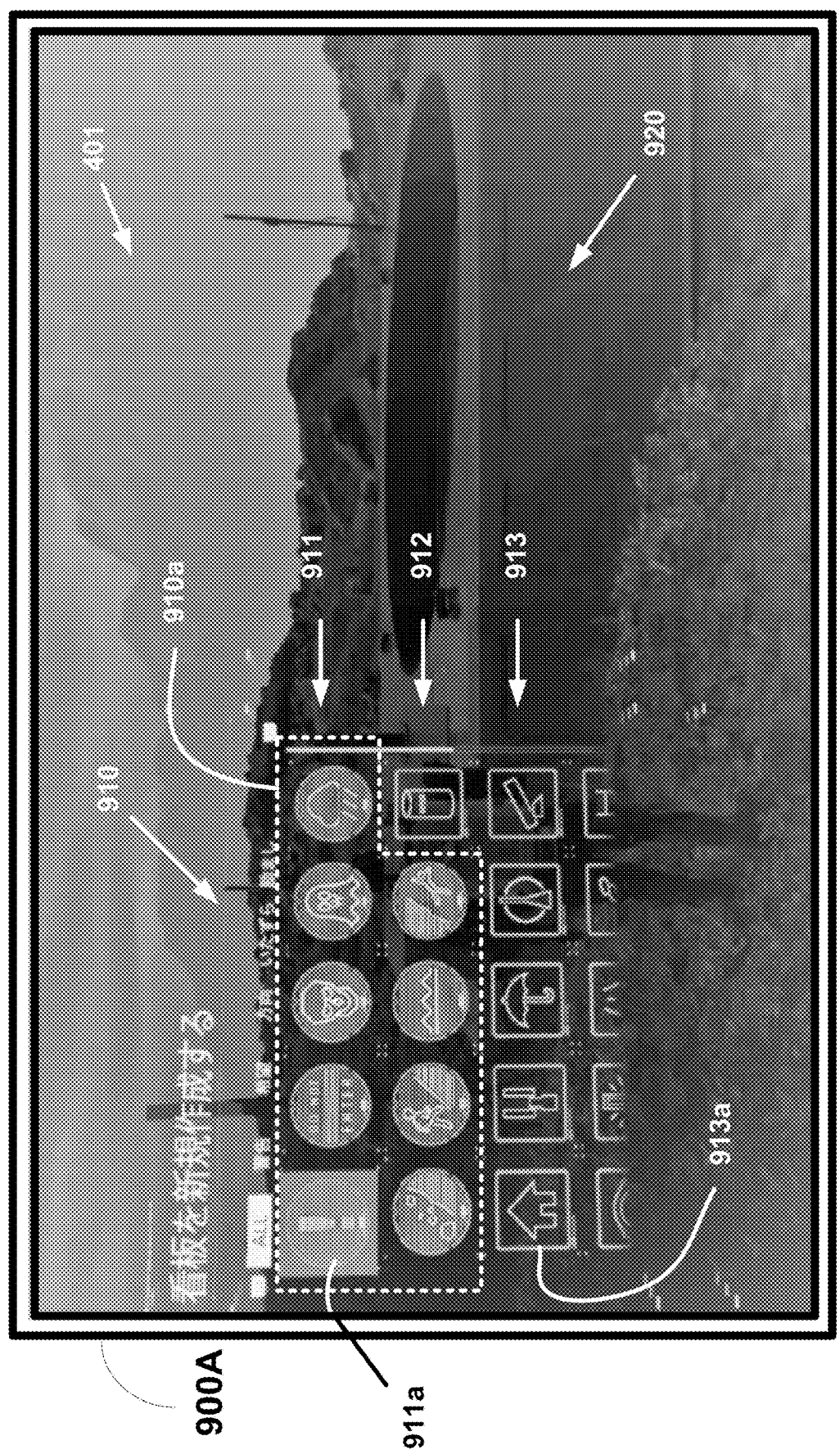
FIG. 9A is a screen shot of the character introduced in FIG. 4B at a location in the representative virtual environment of the representative interactive gaming application introduced in FIG. 4A along with a menu of signs that have been used and that are available for use by the character as generated by one or more players of an interactive gaming application, wherein the signs are used for communication between one or more players, in accordance with one embodiment of the present disclosure.

FIG. 9A is a screen shot 900A of the character 401 introduced in FIG. 4B at a location in the representative virtual environment of the representative interactive gaming application introduced in FIG. 4A along with a menu of signs 910 that have been used and that are available for use by the character 401 as generated by one or more players of an interactive gaming application, wherein the signs are used for communication between one or more players, in accordance with one embodiment of the present disclosure.

The character 401 is able to place signs into the virtual environment within a region after connecting the local/regional network to the Cryonet network. Once the connection is made, the character is able to place signs by accessing the menu of signs 910, and selecting a particular sign within the menu for placement. Also, once the connection is made, the character 401 is able to access signs made by characters of other players. Menu 910 includes multiple rows of signs, including rows 911, 912, 913, etc. Purely for illustration, row 911 may include a generic warning sign 911a (e.g., large exclamation point), a "DO NOT ENTER" warning sign, a joker sign indicating mischievous trouble ahead, a friendly monster sign indicating that unlikely fun times may be ahead, and a "likely to rain" warning sign. Also purely for illustration, row 912 may include a rock fall warning sign, a steep grade informational sign, a mountains ahead informational sign, a dangerous cliff area warning sign, and a beverages ahead informational sign. Also purely for illustration, row 913 may include a safe house location sign 913a, a bottle filler informational sign, an umbrella may be necessary warning sign, a chemical warning sign, and a cannon/heavy weapon area warning sign. Additional signs may be provided in menu 910.

Menu 910 is a global list of all signs available to the player for access, to include placement of a sign, and accessing a sign on the menu, in one embodiment. In another embodiment, the menu is a restricted list of signs available to the player for access, to include placement of a sign, and accessing a sign on the menu. For example, menu 910 may be restricted to signs that are made available within a region (e.g., those signs placed by players of the group or block of players into the region, and signs available to the player for placement within the region). Another restriction may include restricting the availability of signs to those players that are part of the player's network (e.g., signs placed by players in the same group or block of players, etc.). As such, one player's signs for a region are made available for access to other players in the group or block of players, and vice versa. Specifically, signs of players in the group are cross-pollinated across one or more virtual environments of respective one or more game plays of an interactive gaming application.

Menu 910 includes a subset 910a of signs, wherein signs in the subset have been placed into the virtual environment of the corresponding player and respective character, and are accessible to the player. In one embodiment, the signs within subset 910a are placed somewhere within the virtual environment without any geographical restriction. In another embodiment, the signs within subset 910a are placed somewhere within a corresponding region of the virtual environment, such that signs placed outside of that region but in the virtual environment are not accessible to the player.

In one embodiment, selection of a sign in subset 910a brings up the sign at the current location of the character of the corresponding player (e.g., as is shown in FIG. 9A). In particular, information associated with the sign may be placed into a window (not shown) of the current scene displayed to the player. Additional contextual information may also be provided. For example, when the player selects the generic warning sign 911a, a list of generic warning signs 911a that are accessible to the player may be further listed for selection, wherein those signs 911a may be placed at multiple locations within the virtual environment of the player, as previously described. After final selection of a particular generic warning sign 911a, contextual information related to that warning sign 911a is provided to the player. For example, the warning sign may be placed in a location characterized by difficult terrain (e.g., very slippery). The contextual information may include the location within the virtual environment or world that the sign is placed, and additional information about the sign (e.g., slippery surface ahead). In one embodiment, signs within subset 910a are also selectable for placement in the current location of the virtual environment (e.g., shown in screen shot of FIG. 9A).

Figure 9B:
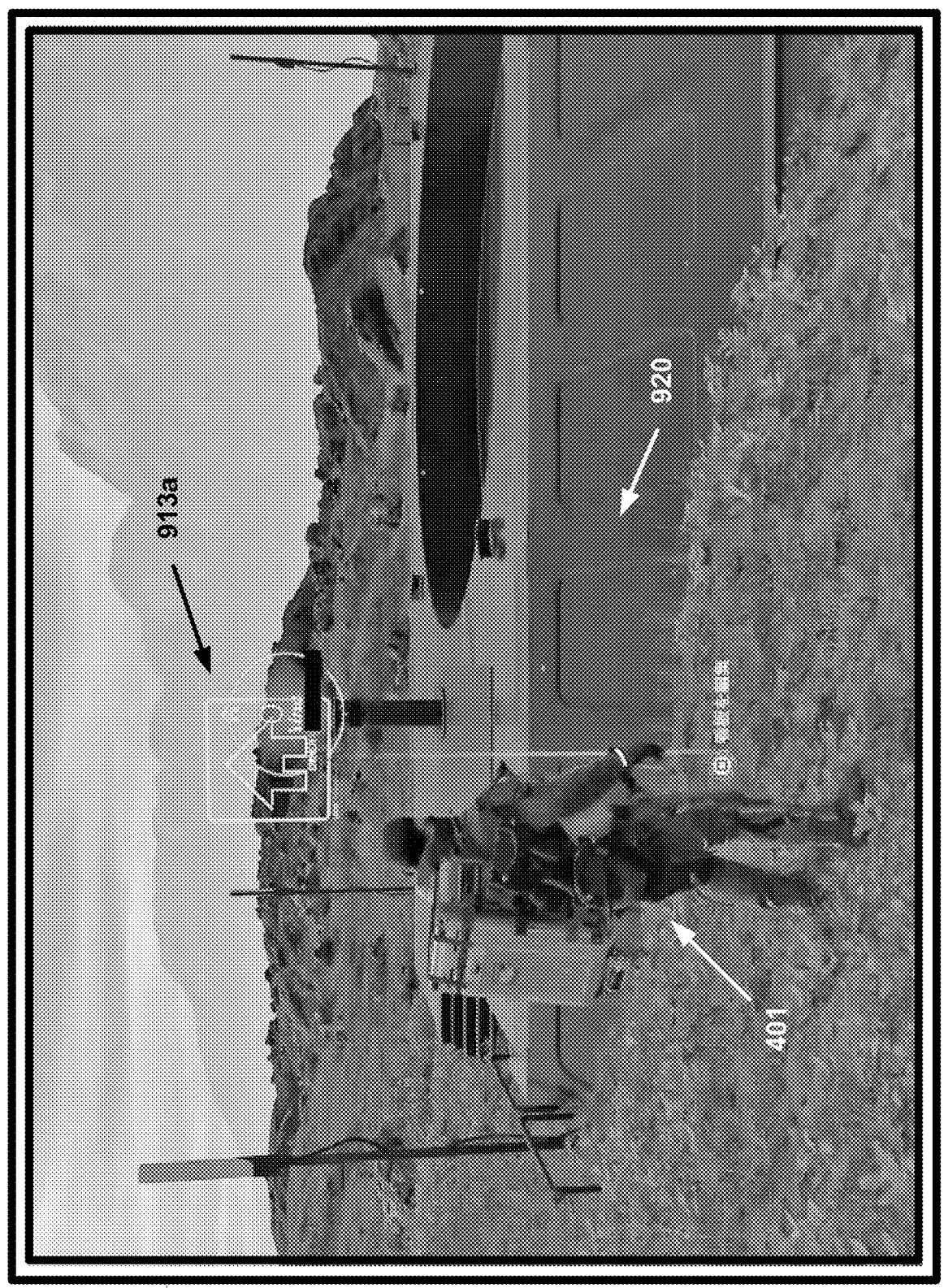
FIG. 9B is a screen shot of a sign that provides relevant information for a particular location of the representative virtual environment introduced in FIG. 4A, in accordance with one embodiment of the present disclosure.

FIG. 9B is a screen shot of a sign that provides contextual and/or relevant information for a particular location of the representative virtual environment introduced in FIG. 4A, in accordance with one embodiment of the present disclosure. In particular, sign 913a is placed into the current location of the virtual environment as represented by screen shot 900A. In one example, the player has selected sign 913a from menu 910 of FIG. 9A for purposes of placement into the virtual environment. Screen shot 900B shows the placement of sign 913a into the local virtual environment as shown in FIG. 9B.

More particularly, sign 913a represents a safe house. Placement of the sign in the current location indicates that the structure 920 shown in FIG. 9B is a safe house. For example, a character 401 that enters the safe house is safe from harm (e.g., cannot be tracked by the monsters or creatures associated with the cataclysmic event—e.g., a void out event), and may rest for any period of time. In addition, the character may replenish his or her health.

Figure 9C:
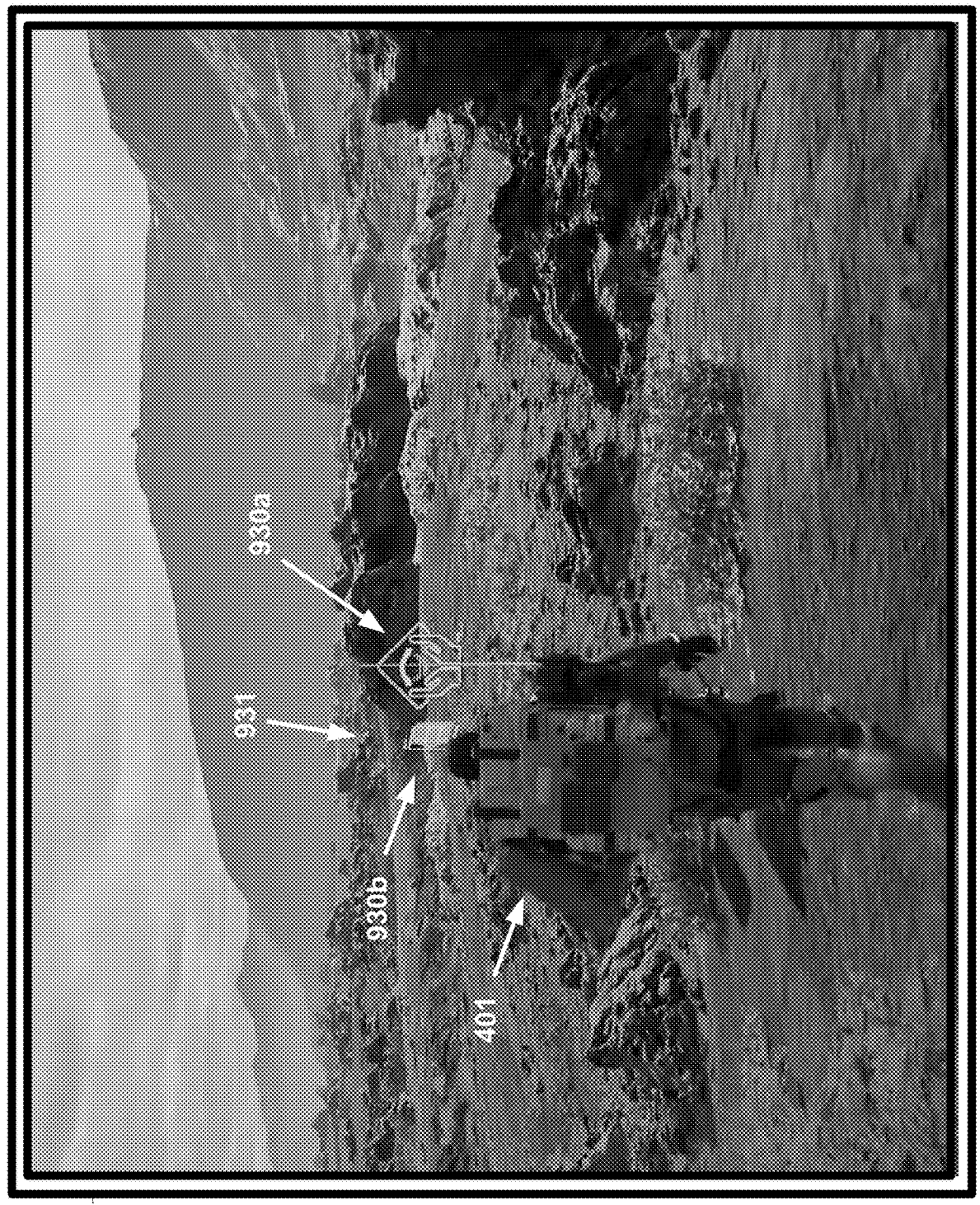
FIGS. 9C-9D are screen shots of a sign requesting assistance from any player playing an interactive gaming application, in accordance with one embodiment of the present disclosure.
Figure 9D:

FIGS. 9C-9D are screen shots of a sign 930 requesting assistance from any player playing an interactive gaming application, in accordance with one embodiment of the present disclosure. In particular, FIG. 9C is a screen shot 900C showing the character 401 approaching varied terrain ahead. Sign 930a has been placed into the current location of the virtual environment, wherein sign 930a conveys a request to build a bridge. For example, the two hands having palms touching but that are spread out may indicate a span over which a bridge can be built. In addition, sign 930a is associated with a companion sign 930b, which is an arrow indicating the direction towards which the bridge could be built. The direction arrow 930b points out over which terrain should the bridge be built (e.g., over a huge rock, over a chasm, over a ravine, over a canyon, over a hazard, etc.). Direction arrow 930b is controllable by the player generating the arrow, such that the player is able to rotate and/or set the arrow to a desired direction within the virtual environment. That is, direction arrow 930b may be a 3D arrow providing direction. For example, direction arrow 930b is pointing to a location 931 in a 3D virtual environment in which it is favorable to build a bridge of a chasm.

FIG. 9D is a screen shot 900D showing the character 401 approaching the area over which the bridge is requested to be built. In particular, when selecting the sign 930a in the screen shot 900D, additional information may be provided, such as in window 930c. For example, the additional information in window 930c provides context to sign 930a, such as textualizing the visual request of sign 930a into words: "Please make a BRIDGE here," i.e., at the current location. The character the character 401 may choose to build or not to build a bridge in the current location.

In one embodiment, a sign in one location can be accessed by a character and its corresponding player from any location within the virtual environment. In that manner, the player accessing the sign can learn about the sign without traveling to the location in which the sign is placed. For example, a player accessing sign 930a can learn that a request has been made for a bridge to be built at a corresponding location within the interactive gaming application. Additional information may also be provided, such as how much interest there is by players to build a bridge (e.g., how many players have attempted to build a bridge), or the status of a bridge being built by another player. Other information may include what kind of benefit is received from building the bridge.

In addition, a form of communication may be generated through signs. For example, a means for direct communication or indirect communication may be generated, such as in the form of communication strand, between players accessing a corresponding sign. In one embodiment, there may be a message board available for players to leave private messages (e.g., between two or more specified players), or public messages (e.g., open to all). In this example, the message board may provide means for direct communication.

Indirect communication may also be provided. For example, when sign 930a is generated for requesting a bridge to be built, players accessing the sign may monitor the progress of one or more bridges being built by one or more players, either individually or in cooperation. For example, sign 930a may be modified or deleted once a bridge has been built. The modification to sign 930a may indicate that a bridge has been built. Also, if sign 930a is removed from the virtual environment, and a corresponding sign may be linked to that indicates a bridge in that location, then players accessing sign 930a (e.g., requesting a bridge) may learn that a bridge has now been completed. As such, the accessing player may now wish to enter that region since traversal has been made easier with the bridge.

Figure 10:
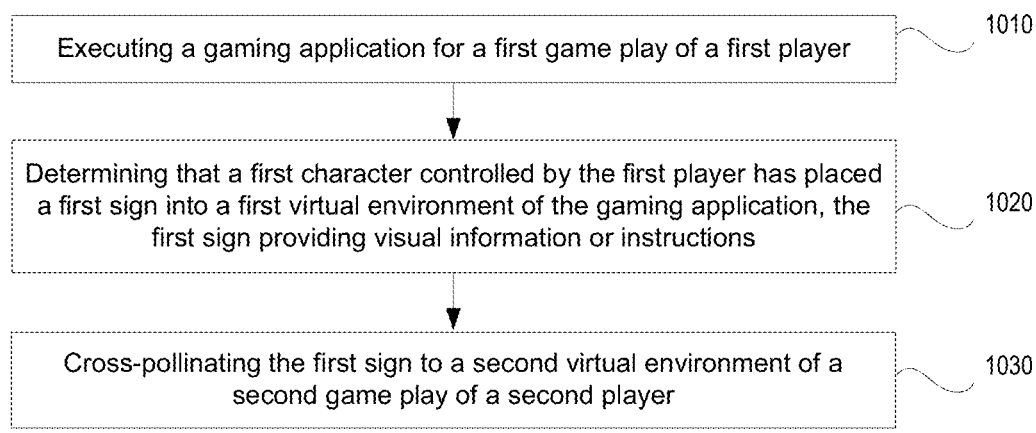
FIG. 10 is a flow diagram illustrating steps in a method for providing communication strands between players of one or more game pays over one or more gaming sessions, in accordance with one embodiment of the present disclosure.

With the detailed description of the various modules of the gaming server and client device communicating over a network, a method for gaming is now described in relation to flow diagram 1000 of FIG. 10, in accordance with one embodiment of the present disclosure. Flow diagram 1000 illustrates the process and data flow of operations for purposes of providing communication strands between players of one or more game pays over one or more gaming sessions, in accordance with one embodiment of the present disclosure. Flow diagram 800 can be implemented within the client device 100 and/or game server 205, such as through one or more of client interactive gaming application 126, server side interactive gaming application 190 and/or the cross-pollinating manager 195 to facilitate the cross-pollination of data across one or more virtual environments of one or more game plays of one or more players, wherein players may be playing asynchronous game plays each in single-player mode, or the players may be playing simultaneously in multi-player mode. In particular, flow diagram 1000 can be implemented within the signs engine 123 that is configured for facilitating the cross-pollination of signs across one or more virtual environments of one or more game plays of one or more players.

At 1010, the method includes executing an interactive gaming application for a first game play of a first player. For example, the interactive gaming application is executed by a local client device, with information about the game play delivered to the back-end game server 205 for connecting one or more game plays through the cross-pollination of data.

At 1020, the method includes determining that a first character controlled by the first player has placed a first sign into a first virtual environment of the interactive gaming application. The first sign may be formatted to visually provide information or instructions. For example, the first sign is not unlike traditional driving signs on the roads that provide visual information or instructions.

In one embodiment, the sign is placed by the first player after selection from a menu of signs, wherein the menu includes one or more signs available for placement into a virtual environment. The method includes receiving a request for a menu of signs, wherein the request originates from the first player. After reviewing the menu, the first player selects a sign. For example, the method includes receiving selection of the first sign from the first player. In the instruction, the first player may also direct the placement of the first sign. For example, the method may include placing the sign into a specified current location of the virtual environment.

In a further embodiment, the first sign may have a companion sign, such as a directional arrow that points to the location that is associated with the first sign. The method includes generating a companion sign to the first sign, wherein the companion sign comprises a 3D directional arrow. For example, if the sign requests that a bridge be built, then the directional arrow (e.g., the companion sign) would point to the area in which the bridge should be built. The method includes receiving an instruction giving a direction to the companion sign, and orientating the directional arrow in the direction within the virtual environment.

At 1030, the method includes cross-pollinating the first sign to a second virtual environment of a second game play of a second player. The first sign that is cross-pollinated across one or more virtual environments may be limited to those players who belong to a group or block of players, as previously described. For example, the players may be part of a social network, such as friends of a social gaming network. As previously described, the players in the group may each be playing a single-player gaming session, each of which is independent of the others. And the gaming sessions may not be occurring simultaneously, though the signs, assets and information is still cross-pollinated. In another embodiment, the players in the group may be playing in a single multi-player gaming session. In still another embodiment, the players in the group may be part of one or more multi-player gaming sessions. The different multi-player gaming sessions may not be occurring simultaneously. In still another embodiment, the first game play of the first player is part of a single-player gaming session, while at least one other game play of the other players in the group may be part of a multi-player gaming session. The single-player and the multi-player gaming sessions need not be occurring simultaneously In another embodiment, a sign in the menu is placed by a second player in their respective virtual environments, wherein the menu includes one or more signs that have been placed into one or more virtual environments of one or more game plays of one or more players. The method includes receiving a request for a menu of signs, wherein the request originates from the first player. After reviewing the menu, the first player selects a sign (e.g., a second sign). The second sign has been placed into a third virtual environment by a third player (e.g., in his or her game play). Further, the second sign has been cross-pollinated into the first virtual environment, and as such, the first player can access the second sign for information related to his or her game play. In particular, the method includes providing contextual information for the second sign. For example, the contextual information may be provided in text format, such as in a window.

As will be further described below, a sign along with a "like" functionality may facilitate communication between players. For example, "likes" may be communicated in relation to a sign (or any object and/or asset), and passed back to the sign originator.

Communication Via "Likes"

In general, players can communicate with each other through strands of communication using a "like" functionality or feature. In that manner, formal modes of communication (e.g., communication channel, etc.) are not required for communication between players of one or more game plays over one or more gaming sessions. In that manner, players may communicate with each other even though their game plays are independent of each other, and may not be occurring simultaneously. For example, two players may communicate via the "like" functionality even though their respective gaming sessions supporting the game plays are not concurrent.

A "like" in conjunction with a sign may provide additional communication strands between players. In particular, one or more "likes" may be communicated in relation to a sign, and passed back to the originator of that sign. For example, a "like" may be delivered/communicated from a first player in relation to a sign that is generated by a second player. That is, the first player has accessed the sign, and reviewed contextual information relating to that sign. The first player is pleased with the contextual information and communicates a "like" (e.g., clicking an attached "like" button, generating a "like", etc.) indicating how pleased he or she is with the sign. The "like" interaction is passed on to the second player who originated the sign.

Similarly, a sign originated by the first player may be reviewed by the second player, who is pleased with the contextual information related to the sign. The second player may correspondingly communicate a "like" that is relayed back to the first player. Additional communications may be enabled through a "like," such as sending that "like" to members of the social network group or block (e.g., friends of a social gaming network), as previously described. In that manner, the first and second players (and possibly other connected players) have a communication strand that may bring them closer together through their respective game plays.

Figure 11:
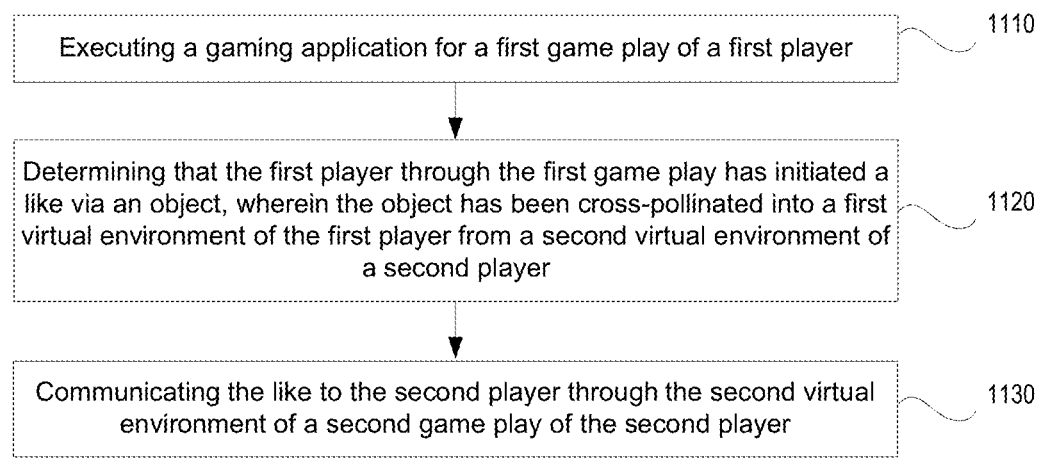
FIG. 11 is a flow diagram illustrating steps in a method for providing communication strands between players of one or more game pays over one or more gaming sessions, in accordance with one embodiment of the present disclosure.

With the detailed description of the various modules of the gaming server and client device communicating over a network, a method for gaming is now described in relation to flow diagram 1100 of FIG. 11, in accordance with one embodiment of the present disclosure. Flow diagram 1100 illustrates the process and data flow of operations for purposes of providing communication strands between players of one or more game pays over one or more gaming sessions, in accordance with one embodiment of the present disclosure. Flow diagram 1100 can be implemented within the client device 100 and/or game server 205, such as through one or more of client interactive gaming application 126, server side interactive gaming application 190 and/or the cross-pollinating manager 195 to facilitate the cross-pollination of data across one or more virtual environments of one or more game plays of one or more players, wherein players may be playing asynchronous game plays each in single-player mode, or the players may be playing simultaneously in multi-player mode. In particular, flow diagram 1100 can be implemented within the like communication engine 122 that is configured for communicating "likes" across one or more virtual environments of one or more game plays of one or more players.

At 1110, the method includes executing an interactive gaming application for a first game play of a first player. For example, the interactive gaming application is executed by a local client device, with information about the game play delivered to the back-end game server 205 for connecting one or more game plays through the cross-pollination of data.

At 1120, the method includes determining that the first player through the first game play has initiated a like via an object. In particular, the object is generated by a second player in a second game play and cross-pollinated to a first virtual environment of the first game play. For example, the object may be a bridge (e.g., bridge 630 of FIG. 6B) that is built by the second player. Further, the second player may also generate a like feature (e.g., like button, etc.) in association with the object.

The first player may interact with the object in the first virtual environment of the first game play. For instance, a character controlled by the first player may cross the bridge, or may view the bridge upon an initial encounter. The first player may greatly appreciate the object (e.g., appreciates the fact that crossing the river is much easier with the bridge 630), and would like to send that appreciation back to the creator of the bridge. The "like" function provides a means for communicating the appreciation, such as the "like" may be a form of gratitude. For example, the object may be associated with a like button configured for communicating likes. To communicate the like, the first player may have activated the "like" function (e.g., like button).

At 1130, the method includes communicating the "like" to the second player through the second game play. That is, rather than going through formal communication channels to communicate his or her appreciation of the object, that appreciation can be communicated through the "like" function. As such, the "like" may be a communication strand between the two players. The communication strand exists even though the game plays of the first and second players may be independent of each other, may be played in one or more gaming sessions, and may be occurring at different times.

In one embodiment, the communication strand is extended to other players. For example, the "like" is also communicated to a group of players that is at least associated with the first player. For example, the group of players may be a social network of friends. In another implementation, the group of players may be at least associated with the first and second players. In other embodiments, the group may be defined by other limitations, such as one group of players may be supported by a gaming server, the group may include friends of a social network, the group may include friends of a social network and friends of the friends, the group may be defined by individuals and may span across multiple server supporting their respective game plays, etc.

In one embodiment, a relationship between two or more players may be established and cultivated through "likes". For example, as more and more "likes" are communicated between two players the relationship between those two players matures and/or grows stronger, even though the two players may be playing in different virtual environments of different game plays at different times. The stronger the relationship between the two players, the higher the likelihood that they will be enabled to help each other through their respective game plays. For example, for two players with a highly developed relationship, priority may be given for cross-pollinating assets between the two players, such as through their respective virtual environments. That is, even if a limit on a number of a particular asset available for cross-pollination has been reached, the same asset from one of the players may be cross-pollinated to the virtual environment of the other player. Also, when selecting a particular asset amongst of group of the same asset, the selected asset may be encouraged to be the one originating from the player that has a closest relationship to the selecting player.

In addition, like association may provide an avenue for compensation. For example, the more a player gets associated with likes, the more popular that player becomes. Compensation may be given for reaching a popularity status, such as that based on the number of likes generated with respect to a particular object and/or corresponding player. In still another embodiment, likes may be used for transferring funds and/or assets between players.

As previously described, the like that is communicated across one or more virtual environments may be limited to those players who belong to a group or block of players. For example, the players may be part of a social network, such as friends of a social gaming network. As previously described, the players in the group may each be playing a single-player gaming session, each of which is independent of the others. And the gaming sessions may not be occurring simultaneously, though the signs, assets and information is still cross-pollinated. In another embodiment, the players in the group may be playing in a single multi-player gaming session. In still another embodiment, the players in the group may be part of one or more multi-player gaming sessions. The different multi-player gaming sessions may not be occurring simultaneously. In still another embodiment, the first game play of the first player is part of a single-player gaming session, while at least one other game play of the other players in the group may be part of a multi-player gaming session. The single-player and the multi-player gaming sessions need not be occurring simultaneously.

Balancing

Player immersion into a character in an interactive gaming application is provided through player movement in response to off-balanced positioning of the character in game play of the interactive gaming application, in embodiments of the present disclosure. In that manner, a closer connection between the player and the character can be achieved by applying player controlled counter-balancing movement to the character. In traditional video gaming, artificial supports are provided to characters no matter what forces are present in the virtual environment. As such, the character would never fall down or stumble throughout the game play, even though realistically to the player the character should fall. Embodiments of the present disclosure provide for realistic forces being applied to the character, and the further application of counter-balancing forces through input control provided by the player. This brings a closes connection between the player and the character in the world of video gaming.

Figure 12A:
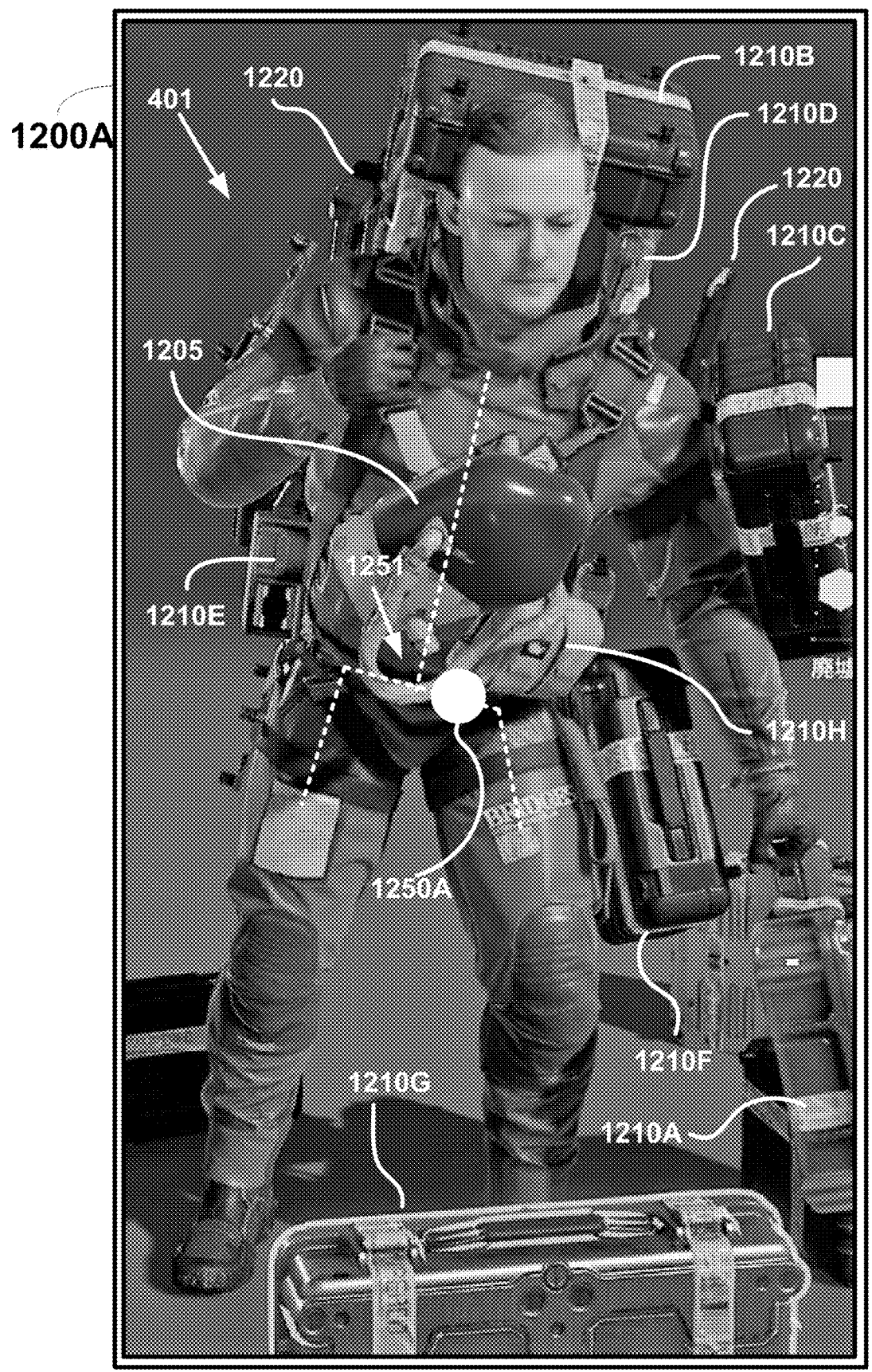
FIG. 12A is a screen shot illustrating the character introduced in FIG. 4B of the representative gaming application introduced in FIG. 4A and the distribution of objects on the body of the character, wherein the distribution and the objects affect the balance of the character during game play, in accordance with one embodiment of the present disclosure.

FIG. 12A is a screen shot 1200A illustrating the character 401 introduced in FIG. 4B of the representative interactive gaming application introduced in FIG. 4A and the distribution of objects on the body of the character, wherein the distribution and the objects affect the balance of the character during game play, in accordance with one embodiment of the present disclosure. The player controlling character 401 can select which carrying cases and/or modules to carry on his body. Further, the player can select how the carrying cases are distributed throughout the body. The distribution of carrying cases and other objects around the body affects where the center of gravity 1250A of character 401 is located.

As shown, the character 401 is wearing a gear pack 1220 that is supported on the back with shoulder harnesses and a hip belt. The gear pack 1220 is configured to hold one or more carrying cases/modules in various configurations. For example, at least carrying cases 1210B, 1210D, and 1210E are attached to gear pack 1220. Carrying case 1210H is attached to the hip of character 401 using gear pack 1220 or a separate hip belt. In addition, character 401 is able to attach cases to both arms, and legs. For example, carrying case 1210C is attached to the left arm of the character 401 using one or more straps. Also, carrying case 1210F is attached to the upper portion of the left leg of character 401. The character 401 is also able to handle cases by grabbing them with either hand. For example, character 401 is shown just lifting up carrying case 1210A with the left hand. Case 1210G is on the floor ready to be picked up and attached to the body of character 401. Further, the character is caretaker for a baby 1205, and is carrying the baby in front about the chest.

The distribution of the carrying cases and other objects about the body will influence the center of gravity 1250A of character 401 based on the mass, location, and possibly size (e.g., to determine the center of mass of the object or carrying case) of the objects or carrying cases. In particular, external forces are applied to the body, the objects on the body, and the carrying cases on the body. Environmental forces include gravity, wind, surface friction, other environmental forces, etc.

A poor distribution of the load on the character 401 will adversely shift the center of gravity 1250A such that the character 401 would be off-balanced. A proper distribution of the load would place the center of gravity such that the character would be fully balanced. As shown in FIG. 12A, the character 401 is a slightly off-balanced to the left side, wherein the center of balance 1250A is to the left (taken from the point-of-view "POV" of the character 401) of an optimal and neutral position 1251 (showing proper balance). The out-of-balanced position of character 401 may be due to an overload of objects on the character's left side, to include the carrying case 1210C on the left arm, case 1210F on the left leg, and the case 1210A being handled by the left hand. Depending on the mass of these objects, the character 401 may be able to assert counter-balancing forces (e.g., from muscle movement) to bring the center of balance 1250A back to the optimal, neutral position so that character 401 would be balanced. Without any counter-balancing forces, forces applied to the character 401 would possibly force the character to fall over to the left.

Figure 12B:
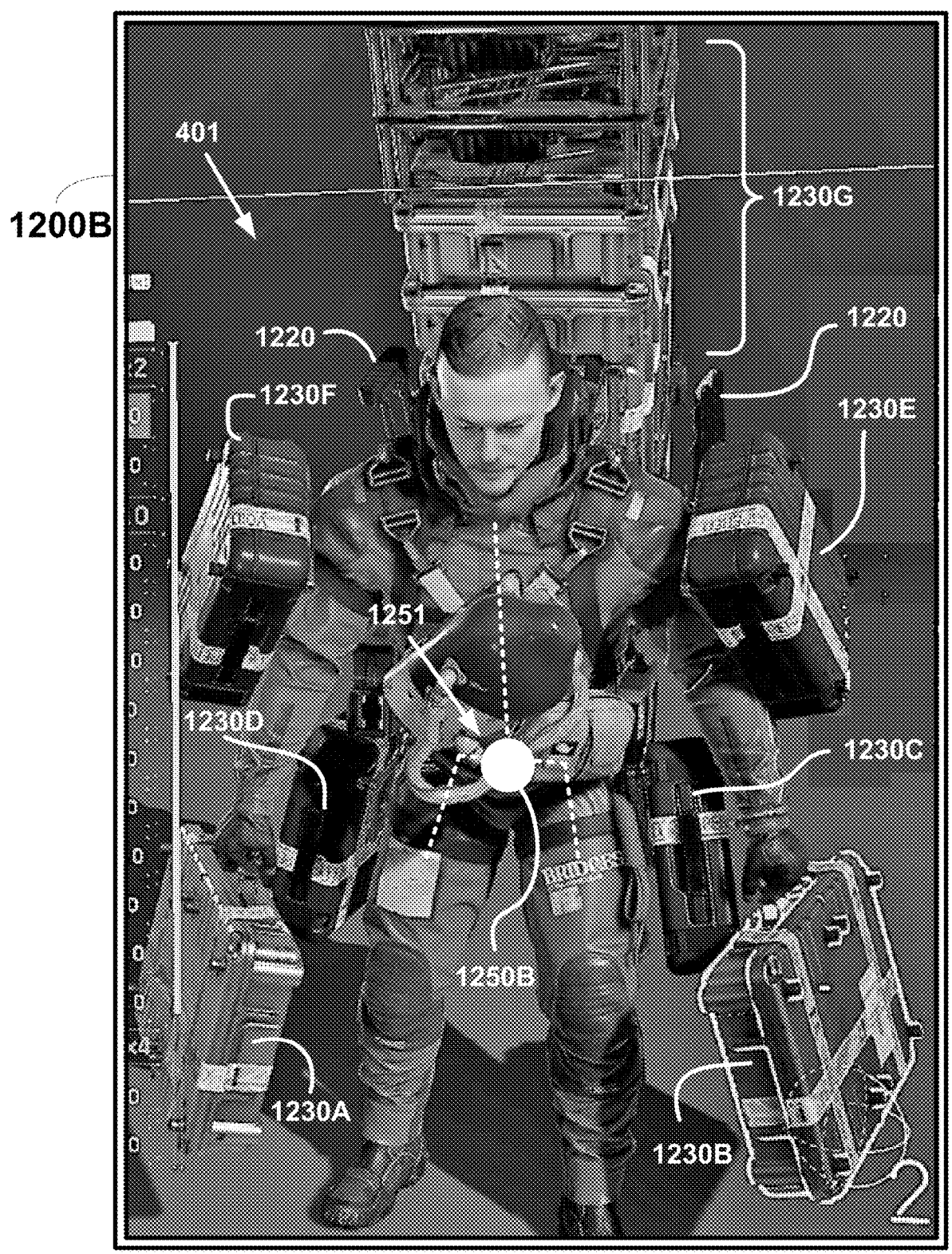
FIG. 12B is a screen shot illustrating the character introduced in FIG. 4B and the distribution of objects that are uniformly balanced, in accordance with one embodiment of the present disclosure.

FIG. 12B is a screen shot 1200B illustrating the character 401 introduced in FIG. 4B and the distribution of objects that are uniformly balanced, in accordance with one embodiment of the present disclosure. As shown, the character 401 is wearing a gear pack 1220 that is supported on the back with shoulder harnesses and a hip belt, as previously introduced. Various carrying cases are attached to gear pack 1220, including the group of cases 1230G, and possibly a case on the hip attached to the hip belt of gear pack 1220. In addition, case 1230E is attached to the left arm, and case 1230F is attached to the right arm. Also, case 1230C is attached to the upper portion of the left leg, and case 1230D is attached to the upper portion of the right leg. Character 401 is handling case 1230B with the left hand, and handling case 1230A with the right hand. Baby 1205 is attached to the chest.

The carrying cases and objects affixed about the body of character 401 is optimally distributed. As such, the center of gravity 1250B is in the optimal, neutral position 1251. That is, the external forces applied to the body, carrying cases, and objects on the body bring the center of gravity to the optimal, neutral position 1251, such that the character is balanced without any further counter-balancing forces.

Figure 13:
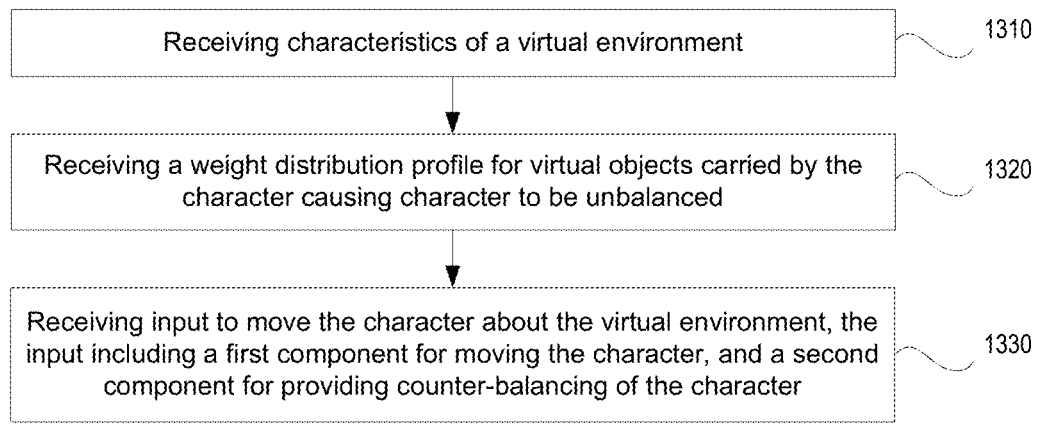
FIG. 13 is a flow diagram illustrating steps in a method for applying counter balancing forces to a character that is off-balanced, in accordance with one embodiment of the present disclosure.

With the detailed description of the various modules of the gaming server and client device communicating over a network, a method for controlling a character in a virtual environment of an interactive gaming application is now described in relation to flow diagram 1300 of FIG. 13, in accordance with one embodiment of the present disclosure. Flow diagram 1300 illustrates the process and data flow of operations for purposes of providing counter-balancing forces from a player that are applied to a character that is off-balanced during game play of an interactive gaming application, in accordance with one embodiment of the present disclosure. Flow diagram 1300 can be implemented within the client device 100 and/or game server 205, such as through one or more of client interactive gaming application 126, server side interactive gaming application 190 and/or the cross-pollinating manager 195 to facilitate the cross-pollination of data across one or more virtual environments of one or more game plays of one or more players, wherein players may be playing asynchronous game plays each in single-player mode, or the players may be playing simultaneously in multi-player mode. In particular, flow diagram 1300 can be implemented within the like balancing engine 121 that is configured for providing counter balancing input control of a player through body orientation, controller input, or a combination thereof, wherein the counter-balancing input is applied as counter forces to the body of the character in the game play of the player.

At 1310, the method includes receiving characteristics of a virtual environment of an interactive gaming application that is executed for a first game play of a first player. The interactive gaming application is executed by a local client device, with information about the game play delivered to the back-end game server 205 for connecting one or more game plays through the cross-pollination of data.

At 1320, the method includes receiving a weight distribution profile for virtual objects carried by the character. The weight distribution profile may cause an offset in a center of gravity of the character. For example, execution of the interactive gaming application may include applying a simulation of natural or defined laws of physics to the character and one or more objects carried by the character within a virtual environment of the interactive gaming application. The carried objects define the weight distribution profile.

For example, the simulation may be performed using a physics simulation model that is configured for applying a simulation of natural or defined laws of physics (e.g., natural or game specific laws, rules, scripts, etc.) against the objects. Scripts may be used in the interactive gaming application to apply laws of physics, applying gaming laws of physics for a particular fictionalized world, etc. The physics simulation model may be applied using a graphics processor and a corresponding pipeline. In particular, the simulation includes applying external forces to the body and the objects, wherein external forces include gravitational forces, and other environmental forces (e.g., wind, surface friction, terrain contour, etc.). FIGS. 12A-12B illustrate external forces that are limited to gravity, such that environmental forces are removed. FIGS. 14A-14D show the effect of external forces that include gravity and environmental forces on a character, and the application of counter balancing forces, as will be described more fully below.

The character is controlled by the first player. More particularly, at 1330, the method includes receiving input to move the character about the virtual environment. The input including a first component and a second component. The first component is configured for moving the character along a path in the virtual environment. The second component is configured for providing a counter-force to reduce the offset to the center of gravity.

Input control from a controller may be received for the first component. As an illustration, the input control may include application of one or more buttons or joysticks of the controller to provide movement of the character along the path. For example, pushing a forward button or pushing the joystick forward may translate into a forward movement of the character along the path in the virtual environment. In addition, input control from the controller may be received for the second component, and may be applied via one or more buttons and/or joysticks. The input control for the second component may be independent of the input control for the first component (e.g., different combinations of buttons and/or joysticks).

A center of gravity for the character may be based on a distribution of the objects carried about a body of the character, i.e., the weight distribution profile. Each of the objects has a corresponding size and mass. The size of the object and/or carrying case will determine where the center of gravity would be for the corresponding object, which affects the center of gravity of the character. In another embodiment, body orientation and its mass may have an effect on the center of gravity, because as a limb is extended out, the center of gravity will follow that extension unless an opposing limb is also extended in similar fashion.

In particular, the center of gravity may cause the character to be off-balanced. For example, the external forces combined that are applied to weight distribution profile may cause the character to be off-balanced. For example, the load on the body may be poorly distributed, such that just with the force of gravity, the center of gravity may be off center. In addition, environmental forces may push the center more off center. For example, wind may push the center of gravity to one side, surface terrain may affect the center of gravity, as well as other factors.

In still another embodiment, variation in the path may further cause the character to become unbalanced. For example, the path may traverse over varied or non-planar terrain that dynamically changes the offset in the center of gravity as the character is caused to move along the path (e.g., through the first component). That is, crossing over rough terrain that is varied or non-planar may force the character to tip over towards one side—in an unbalanced position. Further, changes in the offset in the center of gravity requires adjustment in the second component so that the counter-force is varied to dynamically counteract the dynamic changes in the offset in the center of gravity as the character moves along the path. In particular, for an unbalanced center of gravity, the second component is applied when the character graphically appears to be out-of-balance while moving along the path in the virtual environment responsive to the first component. Without any counter-balancing forces applied through the second component, the character would fall over. The second component may be continuously or intermittently applied as long as the weight distribution profile is unchanged in order for the character to maintain balance. Further, the offset in the center gravity remains as long as the weight distribution profile is unchanged.

More particularly, the second component provides a directional movement that is substantially opposite a direction of an apparent force received by the character due to the offset in the center of gravity. For example, in FIG. 14C, an apparent force is causing the character 401 to be unbalanced towards the right side. That is, the character 401 is falling in a direction 1450A. A counteracting force is applied by the player 5 (e.g., through controller 6) to provide a directional movement in direction 1450B that is substantially opposite the direction 1450A of the apparent force received by the character due to the offset in the center of gravity. For example, the second component may be applied via button or joystick interaction. The interaction may include pulling a joystick or activating a button in a particular direction in association with the counteracting and/or counter balancing force. As an illustration, if the center of gravity is pulling the character to the right (see FIG. 14C), the joystick may be pushed to the left to provide a counter balancing force, and bring the character back to a balanced position.

In one embodiment, the input control may be provided through orientation of the controller as handled by the first player. For example, the second component may include inertial sensor input provided by tracking movement and/or orientation of the controller. The inertial sensor input has a directional magnitude that is substantially opposite a direction of an apparent force received by the character due to the offset in the center of gravity, as previously introduced. Based on the controller movement and/or orientation, counter balancing forces can be determined. The tracking can be done using cameras, sensors, infrared sensors, magnetic sensors, inertial sensors, etc., as previously described. As such, the second component may include one or more of an interaction with a controller button, an interaction with a controller joystick, and/or controller movement or change in orientation as detected through inertial sensor or other tracking means.

In one embodiment, the input control is provided through orientation of the body or body part of the first player. In particular, the method includes tracking the orientation or body orientation of at least one part of the body (e.g., entire outline, an arm, the hip, the head, etc.). In addition, based on the body orientation, counter balancing forces can be determined. The tracking can be done using cameras, sensors, infrared sensors, magnetic sensors, etc., as previously described.

Figure 14A:
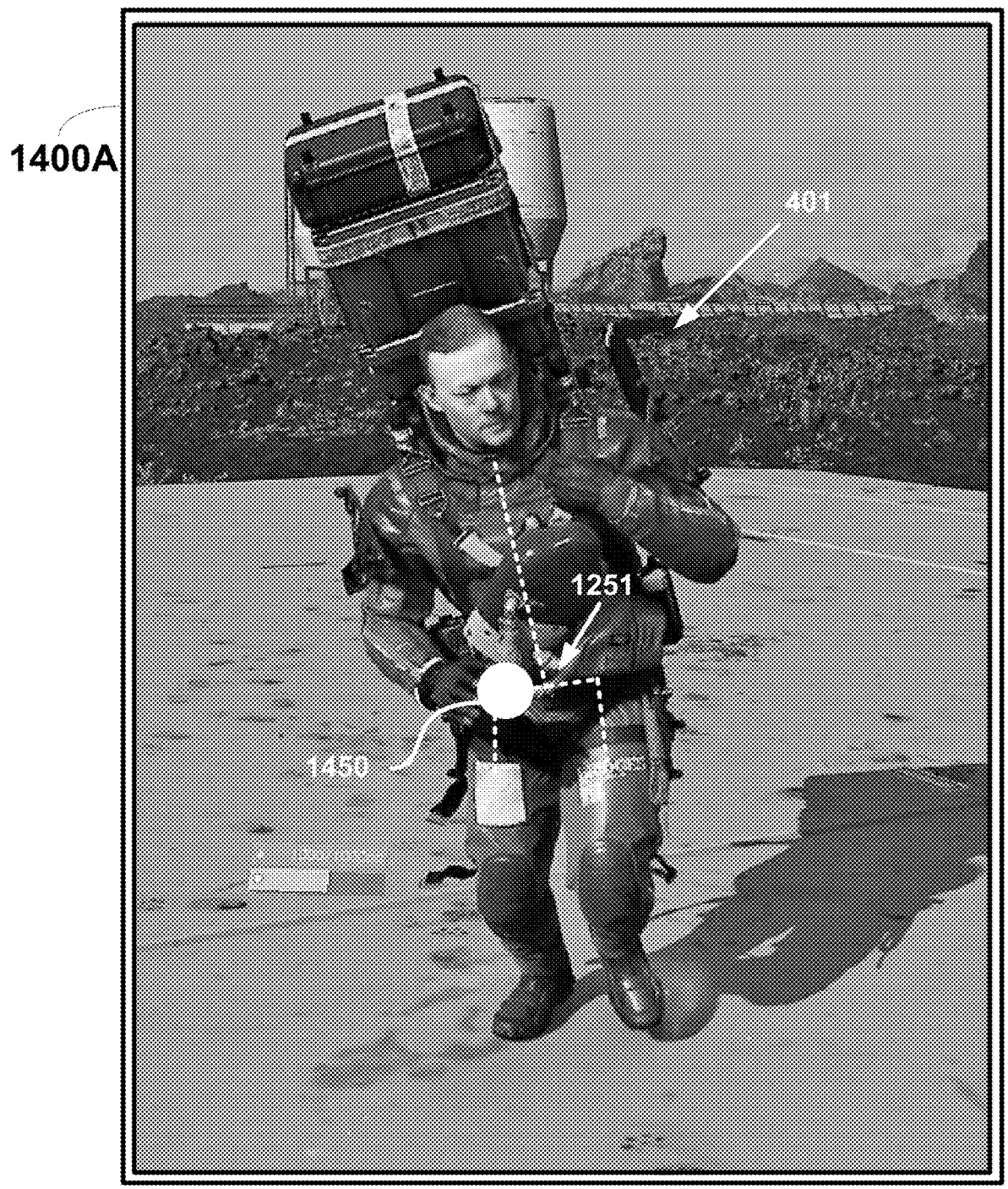
FIGS. 14A-14B are screen shots illustrating the character introduced in FIG. 4B, and a distribution of objects having a center of balance that is higher and rearward from an ideal position that may contribute to the character stumbling forward, in accordance with one embodiment of the present disclosure.
Figure 14B:
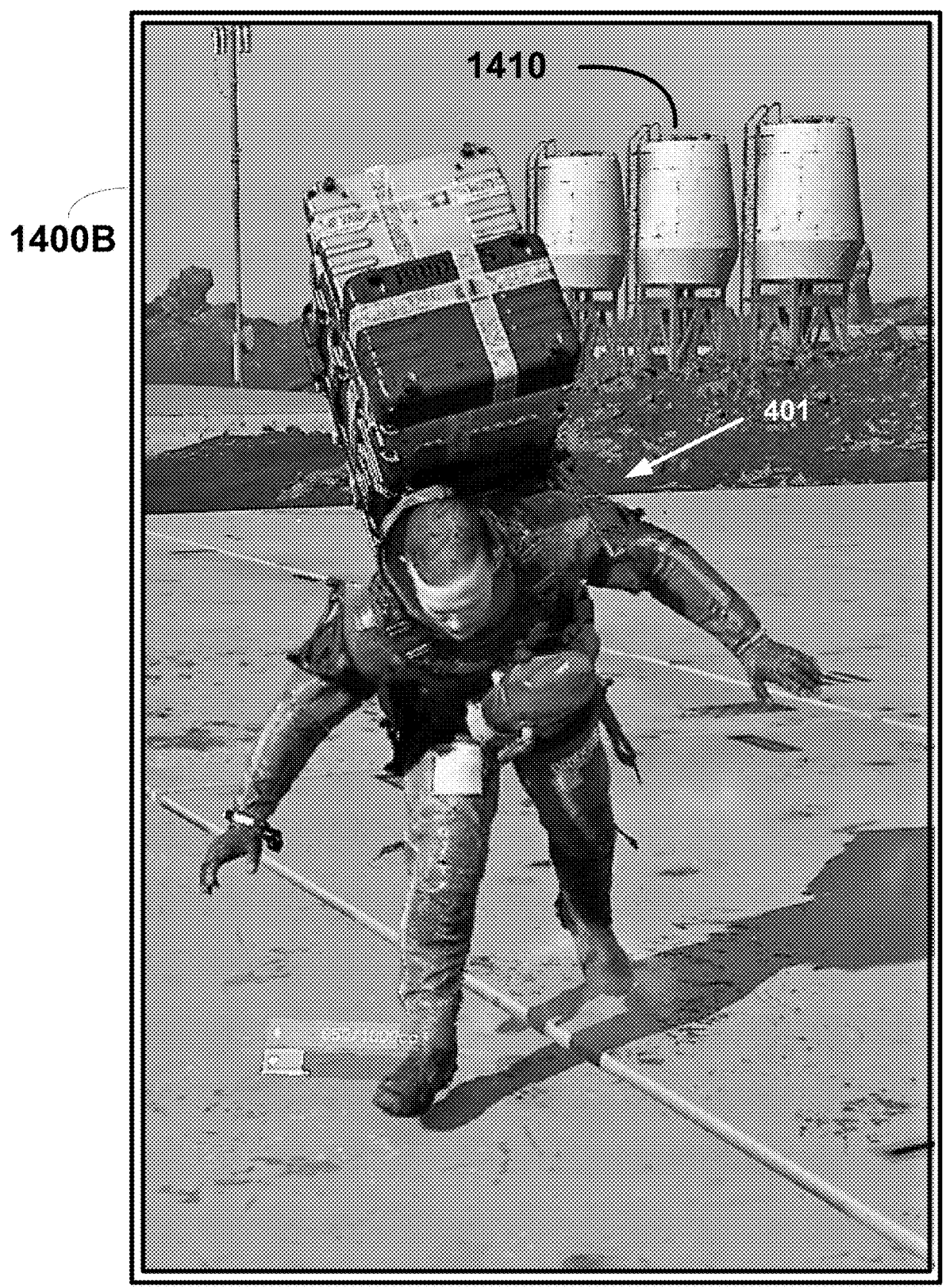

FIGS. 14A-14B are screen shots illustrating the character 401 introduced in FIG. 4B, and a distribution of objects that push the character to an off-balanced position, in accordance with one embodiment of the present disclosure. As shown in the screen shot 1400A of FIG. 14A, the external forces (e.g., gravity and environmental forces) applied to the character 401 (e.g., the weight distribution profile) cause the character to have a center of balance 1450 that is higher and frontward from an ideal position 1251 (e.g., optimal and neutral position). For example, although the distribution of the load on the character is visibly centered in the lateral directions (e.g., distributed evenly from left to right), the distribution may be more weighted to the right side of the character. In addition, the load may be heavily weighted towards the rear of character 401. This would push the center of gravity 1450 to the right and rear of the optimal, neutral position (e.g., balanced), and would cause the character to be off-balanced. Further, the height of the load on the gear pack, and its mass, will affect the center of balance. Because the load is stacked high above the head of the character and may be heavy, this would raise the center of gravity upwards towards the chest. Wind (e.g., environmental forces) coming from the back of the character 401 (e.g., from the granaries 1410) may push the character forward, effectively moving the center of gravity forward. In addition, the body position of the character would have an effect on the center of gravity. For example, if the body position is already leaning forward, then the center of gravity would be pushed forward, thereby further pushing the character forward into an off-balanced position. The misaligned center of gravity or balance 1450 (e.g., to the right and forward) may contribute to the character 401 stumbling forward, as is shown in screen shot 1400B of FIG. 14B, in accordance with one embodiment of the present disclosure.

Figure 14C:
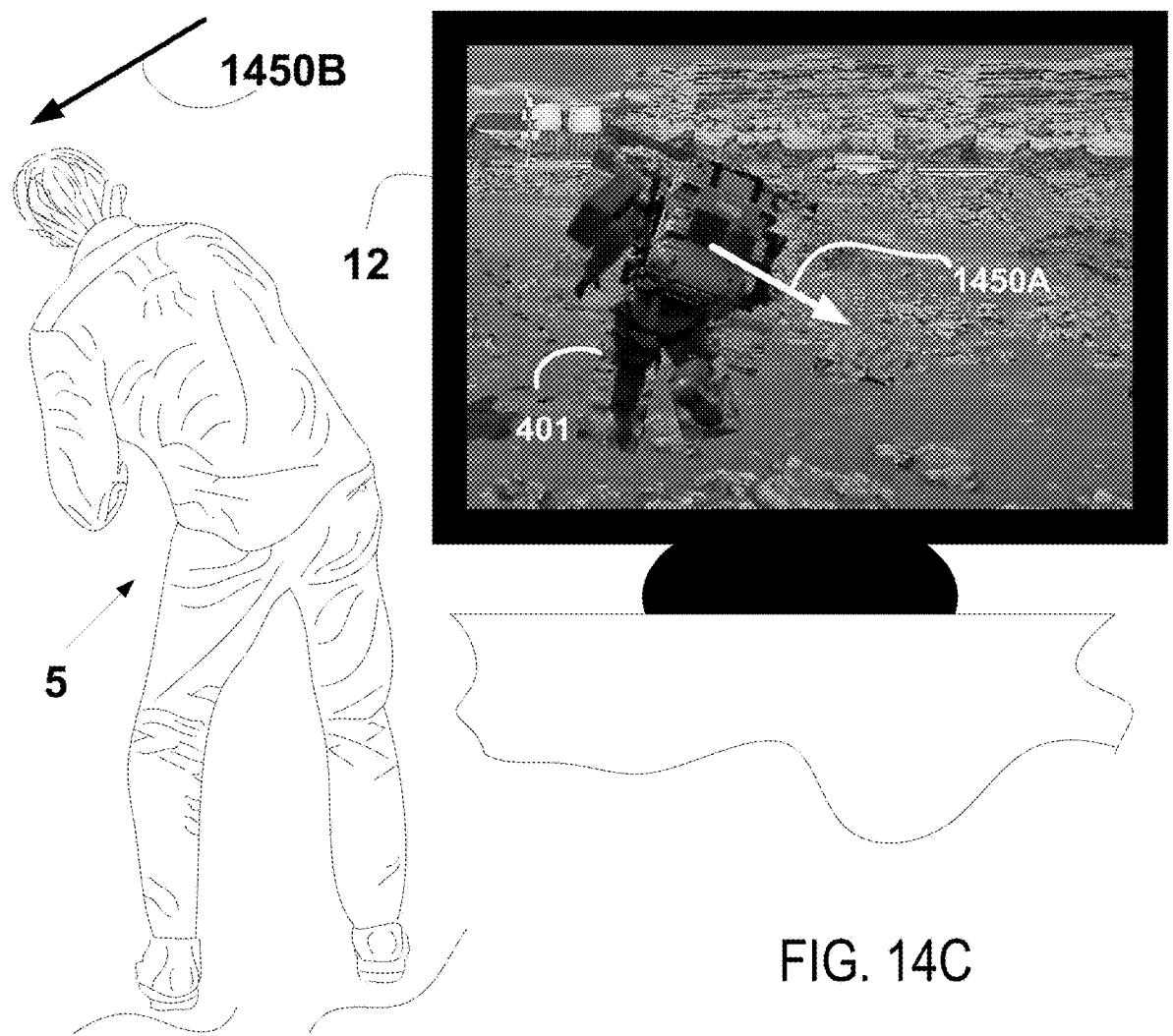
FIGS. 14C-14D illustrate the application of counter-balancing forces based on body orientation of a player or through controller input, or through a combination of body orientation and controller input to character who is off-balanced, in accordance with one embodiment of the present disclosure.
Figure 14D:
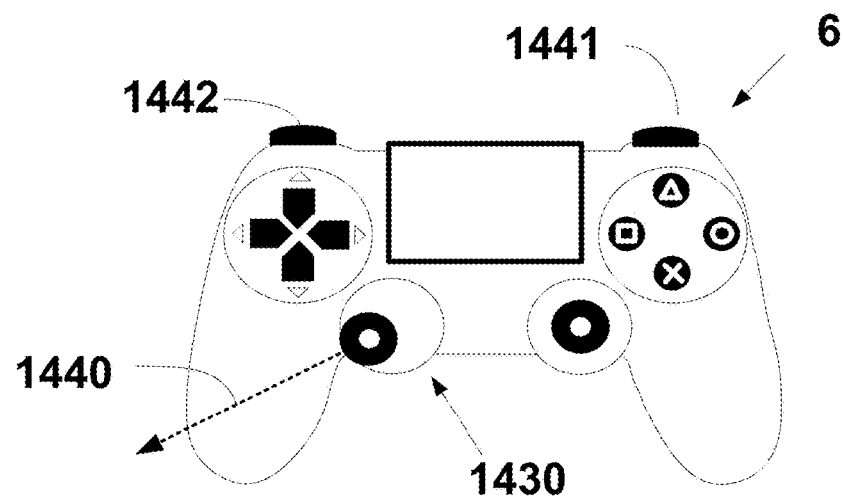
Figure 14E:
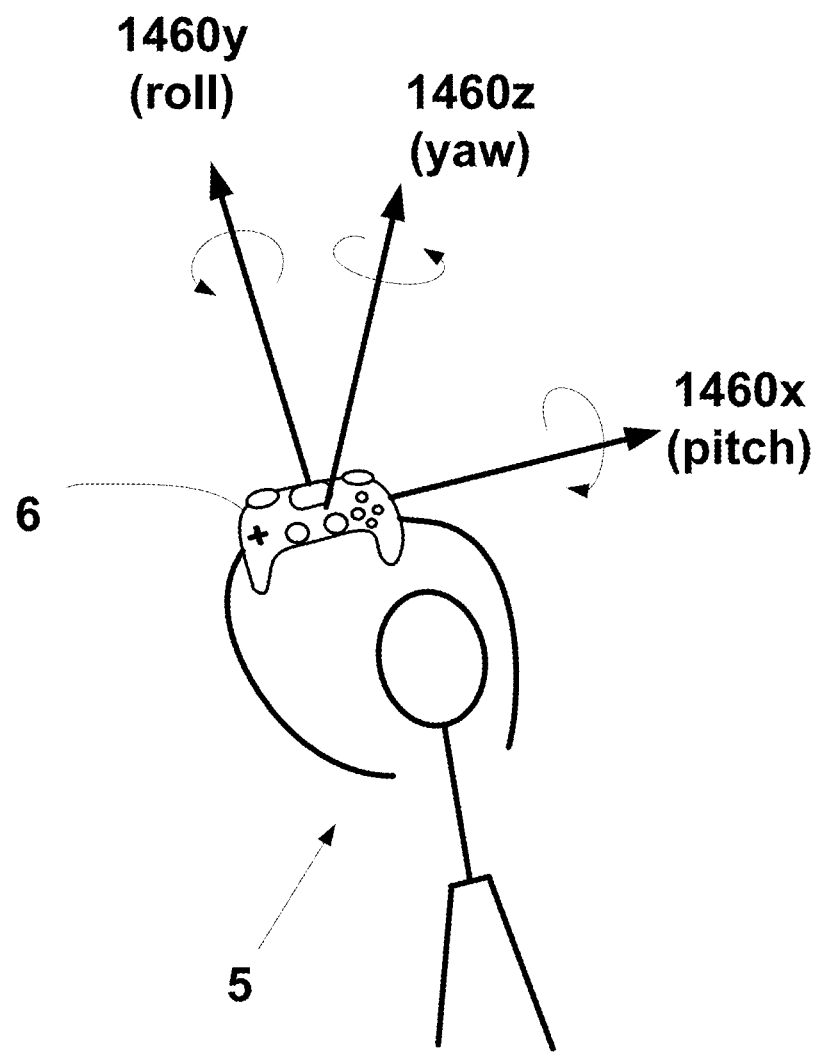
FIG. 14E illustrates inertial sensor input of a controller dynamically counteracting the offset to a center of gravity of a character who is off-balanced, in accordance with one embodiment of the present disclosure.

FIGS. 14C-14E illustrate the application of counter-balancing forces based on controller input as applied to a character 401 who is off-balanced, for example as previously described in FIGS. 14A-14B, in accordance with one embodiment of the present disclosure. In general, poorly distributed loads on a character 401 and other external forces (e.g., gravity, environmental, and other forces) may adversely shift the center of gravity and force the character to fall over (e.g., pitch forwards and to the right), unless counter forces are intermittently and/or continually applied by the player, as long as the center of gravity is offset from the optimal, neutral position.

A player 5 can have a closer connection with character 401 by influencing how the character acts. Specifically, player 5 can provide counter balancing forces to the character 401 to potentially bring the character back to a balanced position from an unbalanced position. The counter balancing forces may take its toll on the character as well as the player (e.g., mental and physical wear) during the game play. For example, how the load is carried, external forces, and the counter balancing forces applied by the character as dictated by the player 5 will determine how much energy is expended by the character during the game play. If the character 401 has to constantly fight a heavy and poorly distributed load, or a slippery or muddy or rocky terrain making it difficult to balance, by applying counter balancing forces, then the character will tire sooner than a character that is optimally loaded (e.g., distribution and weight, etc.). This mimics reality, such that heavy or unwieldy objects are difficult to carry. In addition, the player 5 may mentally and/or physically tire through constant application of the counteracting and/or counter balancing forces.

As shown in FIG. 14C, player 5 is playing an interactive gaming application that is shown on display 12. Player 5 is controlling the actions of character 401, such as moving the character towards a station on the horizon via a first component of an input. The terrain over which the character is moving is varied and not smooth. For example, the terrain may be upward sloping, downward sloping, flat, and/or have varied sloping. Poor placement of the feet may also cause the character 401 to become unbalanced (e.g., stepping on an uneven rock). That is, the terrain is not ideal for walking because of the many rocks strewn about the surface. In particular, the character 401 is shown to be in an unbalanced condition, while crossing across rocky terrain. In particular, in the unbalanced condition the character 401 has a center of gravity that is slightly to the right and forward from an optimal and neutral position, similar to the unbalanced condition of character 401 previously described in screen shot 1400A of FIG. 14A. For example, direction 1450A shows the effect of an apparent force as received by the character due to an offset in the center of gravity (as applied through a weight distribution profile). Direction 1450A is downwards and towards the right, and illustrates the direction the character is forced due to the offset in the center of gravity. In FIG. 14C, without any counter balancing, character 401 will fall forward onto the ground, just the character 401 is falling in FIG. 14B without any correction.

Player 5 is able to provide input for the second component that apply counter balancing forces to character 401 in real-time. As such, when the character 401 is becoming unbalanced and potentially falling, the player 5 can react to bring back the character to a balanced position. For example, player 5 is able to apply the second component through interaction with a controller 6, including interaction with buttons or joysticks, through inertial motion sensors of the controller, etc.

As shown in FIG. 14C, player 5 is reacting to the unbalanced condition of the character 401 while providing input control for counter balancing purposes. Player reaction may be a natural response during game play. In particular, while the player 5 is applying counter balancing forces to prevent character 401 from falling towards the right, the player 5 may instinctively lean in the opposite direction to physically apply counter balancing forces. As someone is falling to the right, the natural tendency is to immediately move or lean to the left to provide counter balancing forces in order to remain upright. As the character 401 is falling forwards and to the right, the natural response of player 5 who is viscerally interacting with the game is to lean to the left, and possibly a bit backwards in an effort to right the character 401. This may provide a closer relationship between player 5 and character 401, as the player 5 is transported into the experiences of character 401.

FIG. 14D illustrates how player 5 provides the second component for the input to apply counter balancing forces to character 401 in real-time through the functions of the controller 6. In one embodiment, the second component may be applied solely through the functions (e.g., buttons, joysticks, paddles, etc.) of controller 6. In that manner, as the character 401 is becoming unbalanced and potentially falling, the player 5 can react to bring back the character to a balanced position. For example, player 5 is using the left hand, and specifically the thumb, to control the joystick 1430. As shown, the joystick 1430 is pulled to the left and downwards with respect to controller 6 in the direction 1440. The left direction of joystick 1430 provides instruction to lean the body of the character 401 leftwards, and the downward direction of joystick 1430 provides instruction to lean the body of the character 401 backwards. This leaning as provided through input control of joystick 1430 provides counter balancing forces (e.g., through muscle energy) that should counteract the gravity forces and any external forces being applied to the body and carried objects. Further an upward counter balancing motion may be provided through some other button or movement of controller 6 (e.g., tilting controller about an axis). As such, the counter balancing force or forces should bring the character 401 at least backwards and to its left. The counter balancing force having a directional magnitude 1450B is generated by player 5. As such, the player 5 can have a closer connection to the character 401 by providing counter balancing forces that mimic forces that would be created by the character 401 in an effort to stay upright as the character is traversing across terrain in a virtual environment.

The functions of the buttons and joysticks of controller 6 can be assigned to provide for any of the counter balancing forces. For example, the second right trigger (R2) 1441 may move the center of gravity/balance to the right. Also, the second left trigger (L2) 1442 may move the center of gravity/balance to the left. Other buttons and joysticks may be assigned to have the same effect, or to apply different counter balancing forces.

As previously described, the second component may be applied through tracking movement of the controller. For example, the second component is applied through inertial sensor input provided by tracking movement of the controller. The inertial sensor input may augment the controller input (e.g., button, joystick, etc.) to provide additional counter balancing. In embodiments, the second component may include one or more of controller input (e.g., button, joystick, etc.) and inertial sensor input. FIG. 14E illustrates inertial sensor input of a controller dynamically counteracting the offset to a center of gravity of a character who is off-balanced, in accordance with one embodiment of the present disclosure. In particular, the player 5 of FIG. 14E may be a representation of the player 5 shown in FIG. 14C, wherein the player 5 is leaning slightly backwards and to the left in reaction to the character 401 falling forwards and to the right (as shown in FIG. 14C). In addition, the second component applying a counter-force to reduce the offset to the center of gravity may be provided through inertial sensor input of the controller 6. For example, one or more inertial sensors (not shown) may be implemented within controller 6. In that manner, orientation and/or movement of the controller 6 may be tracked about a coordinate system that is static in relation to the controller 6, wherein the coordinate system includes x, y, and z axis. In particular, the pitch of controller 6 may be tracked about axis 1460x. In addition, the roll of controller 6 may be tracked about axis 1460y. Also, the yaw of controller 6 may be tracked about axis 1460z. For instance, to provide counter-balancing forces to counter the offset to the center of gravity of character 401, the controller may be pitched or rotated backwards (e.g., clockwise) about axis 1460x, and rolled or rotated to the left (e.g., counter clockwise) about axis 1460y.

In addition, the second component of the input may be provided through body orientation (e.g., tracking of one or more parts of the body or other objects—e.g., controller—in association with the body). Because the player 5 may be leaning slightly backwards and to the left, this provides counter balancing forces (e.g., through muscle energy) that should counteract the gravity forces and any external forces being applied to the body and carried objects. In particular, the movement of the player 5 should bring the character 401 upwards, backwards and to its left As long as the external forces are applied to character 401, counter balancing forces would need to also be applied. That is, character 401 would be exerting energy when applying the counter balancing forces. At some point, the player 5 may determine that the energy expended is too much, and he or she may decide to jettison some of the assets, objects and/or carrying cases that is attached to the body of character 401, or being carried by the character. As previously described, the cargo may be stored in a public box or POD, or just randomly dropped into the virtual environment of the game play, wherein the dropped objects (e.g., assets, cargo, etc.)

In embodiments, the center of gravity is constantly moving in the body of the character. For example, when the character is walking along varied terrain the sum of the external forces on the character dynamically changes. In one embodiment, the character moves using inverse kinetics animation, wherein the movement is performed by first determining where the character is moving to (e.g., placement of the foot), and then moving the body in a realistic fashion. The character movement and the forces applied in conjunction with that movement will affect the center of balance of the character, such that the center of gravity of the character is dynamically changing. As such, the counter balancing forces applied by the player would also have to change to keep the character balanced. In one embodiment, the counter balancing forces applied may not overcome the offset in the center of balance and the character will fall. For example, if the character is crossing a path over a very steep terrain, wherein the path narrows quite quickly such that the character has a difficult time maintaining balance over the terrain, the character in its present condition and position within the virtual environment cannot regain his or her balance no matter what counter balancing forces are applied and will fall.

In another embodiment, a method for providing counter-balancing forces from a player that are applied to a character that is off-balanced during game play of a gaming application is disclosed. The method includes executing a gaming application for a first game play of a first player. The gaming application is executed by the processor, such as the game server 205 and/or the game processor 201, in one embodiment. Also, the gaming application can be executed at a local game console, with information about the game delivered to the back-end game server 205 for connecting one or more game plays through the cross-pollination of data. The method includes applying a simulation of natural or defined laws of physics to the character and one or more objects carried by the character within a gaming environment of the gaming application (e.g., through a physics simulation model). The simulation includes applying external forces to the body and the objects, wherein external forces include gravitational forces, and other environmental forces (e.g., wind, surface friction, terrain contour, etc.). The method includes determining a center of gravity for the character based on a distribution of the objects carried about a body of the character and a body orientation of the character, wherein the body and objects each have a corresponding size and mass that affect the positioning of the center of gravity. The method includes determining that the center of gravity causes the character to be off-balanced. For example, the load on the body may be poorly distributed, such that just with the force of gravity, the center of gravity may be off center. In addition, environmental forces may push the center more off center. The method includes receiving input control from the first player providing counter balancing forces affecting the positon of the center of gravity (e.g., through buttons and/or joystick interaction, tracking controller orientation, tracking body part orientation, etc.). The method includes applying the counter balancing forces on the character to determine a new center of gravity. The method includes determining whether the character is balanced or off-balanced depending on the location of the new center of gravity. If the new center of gravity is in the optimal, neutral position as shown in FIGS. 12A-12B, then the character is balanced. However, if the new center of gravity is off from that optimal, neutral position, then the character is off-balanced, and may be subject to falling over. For example, the method may include determining that the character is off-balanced based on the new center of gravity, and further causing the character to fall over.

In one embodiment, to make the balancing of the character more realistic, the turning radius of the character is reduced. In that manner, the character is less stable and more prone to tipping over.

In one embodiment, when the character falls there is a penalty. For example, the health of the character may suffer (e.g., lose ten percent of stamina, or life, or tiredness, lung capacity, blood level, etc.). After falling, the baby carried by character may also cry, thereby giving an additional penalty to the character.

Path Buildup

Embodiments of the present disclosure provide for cross-pollinating actions of players through one or more one or more game plays of one or more gaming sessions. In particular, actions by a player (e.g., through a corresponding character) on a corresponding virtual environment are cross-pollinated to other virtual environments of other players in respective game plays of one or more gaming sessions. For example, the more times a path is traveled, the more improved that path becomes. That is, the path becomes more defined and more uniform, making it easier to travel over the path.

Figure 15A:
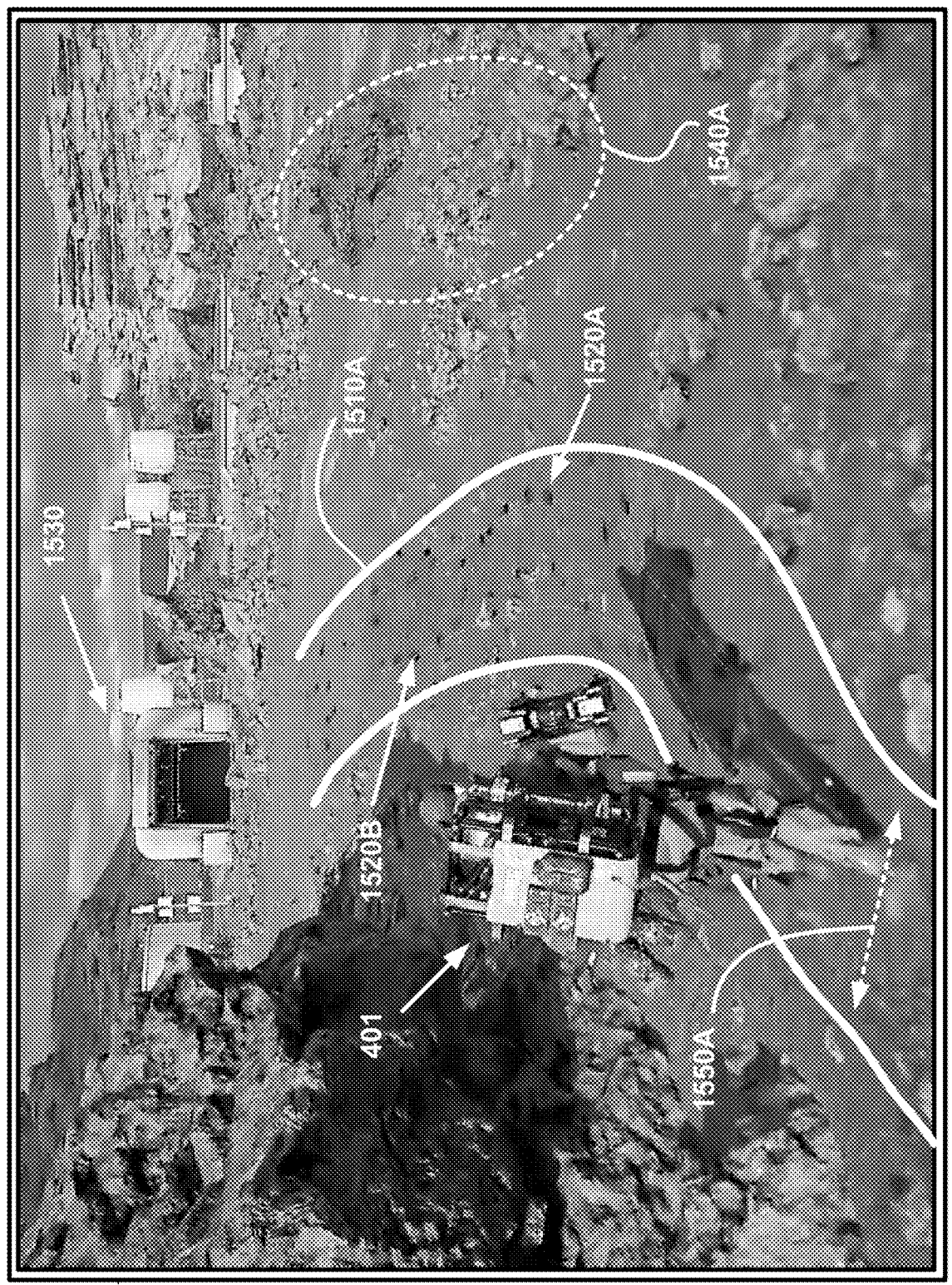
FIG. 15A is a screen shot illustrating the character, introduced in FIG. 4B of the representative gaming application introduced in FIG. 4A, traversing across a path that is newly used in the representative virtual environment, in accordance with one embodiment of the present disclosure.

FIG. 15A is a screen shot 1500A illustrating the character 401 introduced in FIG. 4B of the representative interactive gaming application introduced in FIG. 4A, traversing across a path 1510A that is newly used in the representative virtual environment, in accordance with one embodiment of the present disclosure. As shown, character 401 is traveling to reach station 1530 that includes one or more structures.

The path 1510 is relatively new. At its inception, path 1510A is roadless and pathless, such that there is no evidence that anyone has traversed over the same path. One or more sets of footprints (e.g., 1520A and 1520B) show evidence of other times when the path was traversed. Also, with width 1550A of path 1510A is relatively narrow. For example, as shown in FIG. 15A, the width 1550A is equal to approximately two to three shoulder widths (e.g., shoulder width of character 401), or about four to six feet wide. In addition, the path is relatively rocky, such as in region 1540A having rock outcroppings that extend up from the surface.

In one embodiment, the sets of footprints were made by character 401 only, wherein character 401 is controlled by a first player. That is, the path 1510A is built up solely through the efforts of the first player.

In another embodiment, the sets of footprints were made by one or more players, possibly including the first player. That is, other players in their respective game plays can also traverse across path 1510A. Their actions (e.g., traversal of the path) and the results of their actions (e.g., building of the path 1510A) are cross-pollinated into the virtual environment of the first player. In that manner, a cumulative number of path traversals help to build the path 1510A in the virtual environment of the first player. The other players are playing the corresponding interactive gaming application in one or more game plays of one or more gaming sessions that may or may not be occurring simultaneously, as previously described. As such, the players' efforts are cumulative and help to build the path 1510A in the game play of the first player, and may help to build other paths in the game plays of other players.

Figure 15B:
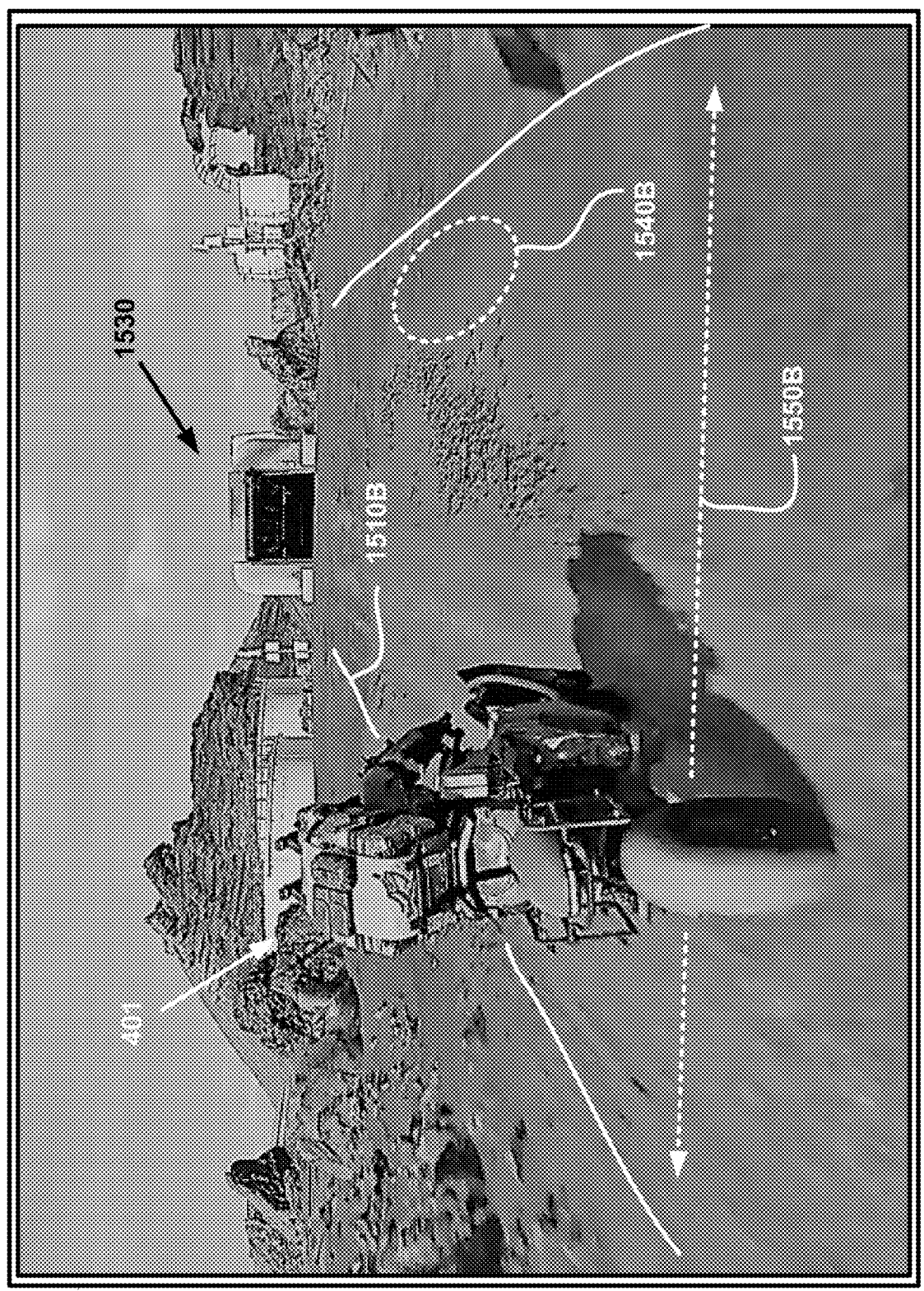
FIG. 15B is a screen shot illustrating the character, introduced in FIG. 4B of the representative interactive gaming application introduced in FIG. 4A, traversing across the same path introduced in FIG. 15A that has been improved over time after successive usage, in accordance with one embodiment of the present disclosure.

FIG. 15B is a screen shot 1500B illustrating the character 401 traversing across the same path introduced in FIG. 15A that has been improved over time after successive usage, in accordance with one embodiment of the present disclosure. As shown, the path 1510B has now been built up as more and more traversals of the path has occurred. For example, the point-of-view of screen shot 1500B is approximately the same as that of screen shot 1500A of FIG. 15A, wherein the character 401 is traveling to station 1530. Path 1510B is much wider that the earlier path 1510A, as shown by the width 1550B that can be several yards across (e.g., 10-20 feet).

Further, path 1510B is now relatively smooth. For example, region 1540B, which corresponds to the region 1540A of FIG. 15A, has a smooth surface. In fact all of the surface of path 1510B is smooth, and can be classified as an improved road capable of handling motor vehicle traffic (e.g., character 401 riding a motorcycle). As such, over time and repeated effort from one or more players (e.g., traversing across the path to and from station 1530), the path leading to station 1530 becomes a wide and smooth improved road suitable for motor vehicle transportation.

Figure 15C:
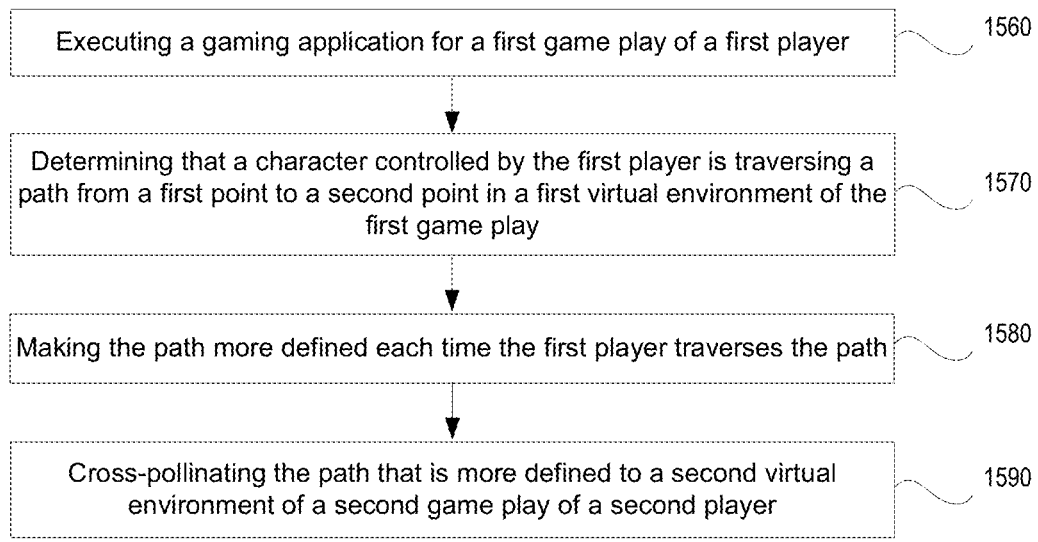
FIG. 15C is a flow diagram illustrating steps in a method for providing the building of a path through the traversal of that path by a character, and the cross-pollinating of that path to another virtual environment of another game play, in accordance with one embodiment of the present disclosure.

With the detailed description of the various modules of the gaming server and client device communicating over a network, a method for gaming is now described in relation to flow diagram 1500C of FIG. 15C, in accordance with one embodiment of the present disclosure. Flow diagram 1500C illustrates the process and data flow of operations for purposes of providing the building of a path through the traversal of that path by a character, and the cross-pollinating of that path to another virtual environment of another game play, in accordance with one embodiment of the present disclosure. Flow diagram 1500C can be implemented within the client device 100 and/or game server 205, such as through one or more of client interactive gaming application 126, server side interactive gaming application 190 and/or the cross-pollinating manager 195 to facilitate the cross-pollination of data across one or more virtual environments of one or more game plays of one or more players, wherein players may be playing asynchronous game plays each in single-player mode, or the players may be playing simultaneously in multi-player mode. In particular, flow diagram 1500C can be implemented within the path buildup manager 194 in cooperation with the cross-pollinating manager 195.

At 1560, the method includes executing an interactive gaming application for a first game play of a first player. For example, the interactive gaming application is executed by a local client device, with information about the game play delivered to the back-end game server 205 for connecting one or more game plays through the cross-pollination of data.

At 1570, the method includes determining that a character controlled by the first player is traversing a path from a first point to a second point in a first virtual environment of the first game play. The path could originate with a first traversal by the first player. The path could have originated with a first traversal by another player (e.g., a second player, a third player, etc.), wherein the path becomes cross-pollinated to at least the first virtual environment of the first game play of the first player. The path may also be cross-pollinated to the game plays of other players, such as players within a group or block of users (e.g., social network friends). In one implementation, the number of paths that are cross-pollinated to one or more game plays is limited within a geographic region. In that manner, the virtual environments of those one or more game plays are not cluttered with too many paths.

At 1580, the method includes making the path more defined each time the first player traverses the path. For example, the path may become smoother by removing any rock outcroppings in the general vicinity of the traversal. With more traversals, the path becomes wider. Over time, the path becomes wider and smoother, and may become more graded or less sloped in places. At 1590, the method includes cross-pollinating the path that is more defined to a second virtual environment of a second game play of a second player. In that manner, each traversal of the path by the first player (e.g., through a corresponding character) further defines the path, and the more defined path gets cross-pollinated to the second virtual environment of the second game play of the second player.

In addition, the path becomes more defined each time another player also traverses the path, when the path has been cross-pollinated. For example, paths may appear to the first player in his or her virtual environment, when the first player achieves the mission for the region (e.g., convincing the survivors in that region and their locally controlled regional network to join the universal, Cryonet network). As such, each traversal of the path by the another player (e.g., the second player through a corresponding character) further defines the path, and that more defined path is cross-pollinated to the first virtual environment of the first game play of the first player. Similarly, the path that is further defined by the first player's traversal is cross-pollinated to the second virtual environment after the second player joins a regional network to a universal network in the region containing the path.

In one embodiment, two or more paths that cover approximately the same terrain is merged into one. That is, efforts made to build either path are combined. For example, the method may include merging a first path and a second path that approximately cover the same terrain by assigning a higher priority to the first path over the second path, or by averaging the placement of the paths. In that manner, traversals across the first path or the second path build up the first path.

In addition, traversals or portions of traversals that deviate from an average path (e.g., deviate more than a standard deviation) may be disregarded. In that manner, the deviated traversal does not get cross-pollinated across multiple virtual environments, in an effort to keep the game plays uncluttered.

As previously described, the path that is communicated and/or cross-pollinated across one or more virtual environments may be limited to those players who belong to a group or block of players. For example, the players may be part of a social network, such as friends of a social gaming network. As previously described, the players in the group may each be playing a single-player gaming session, each of which is independent of the others. And the gaming sessions may not be occurring simultaneously, though the path is still cross-pollinated. In another embodiment, the players in the group may be playing in a single multi-player gaming session. In still another embodiment, the players in the group may be part of one or more multi-player gaming sessions. The different multi-player gaming sessions may not be occurring simultaneously. In still another embodiment, the first game play of the first player is part of a single-player gaming session, while at least one other game play of the other players in the group may be part of a multi-player gaming session. The single-player and the multi-player gaming sessions need not be occurring simultaneously.

Terrain Radar

Figure 16A:
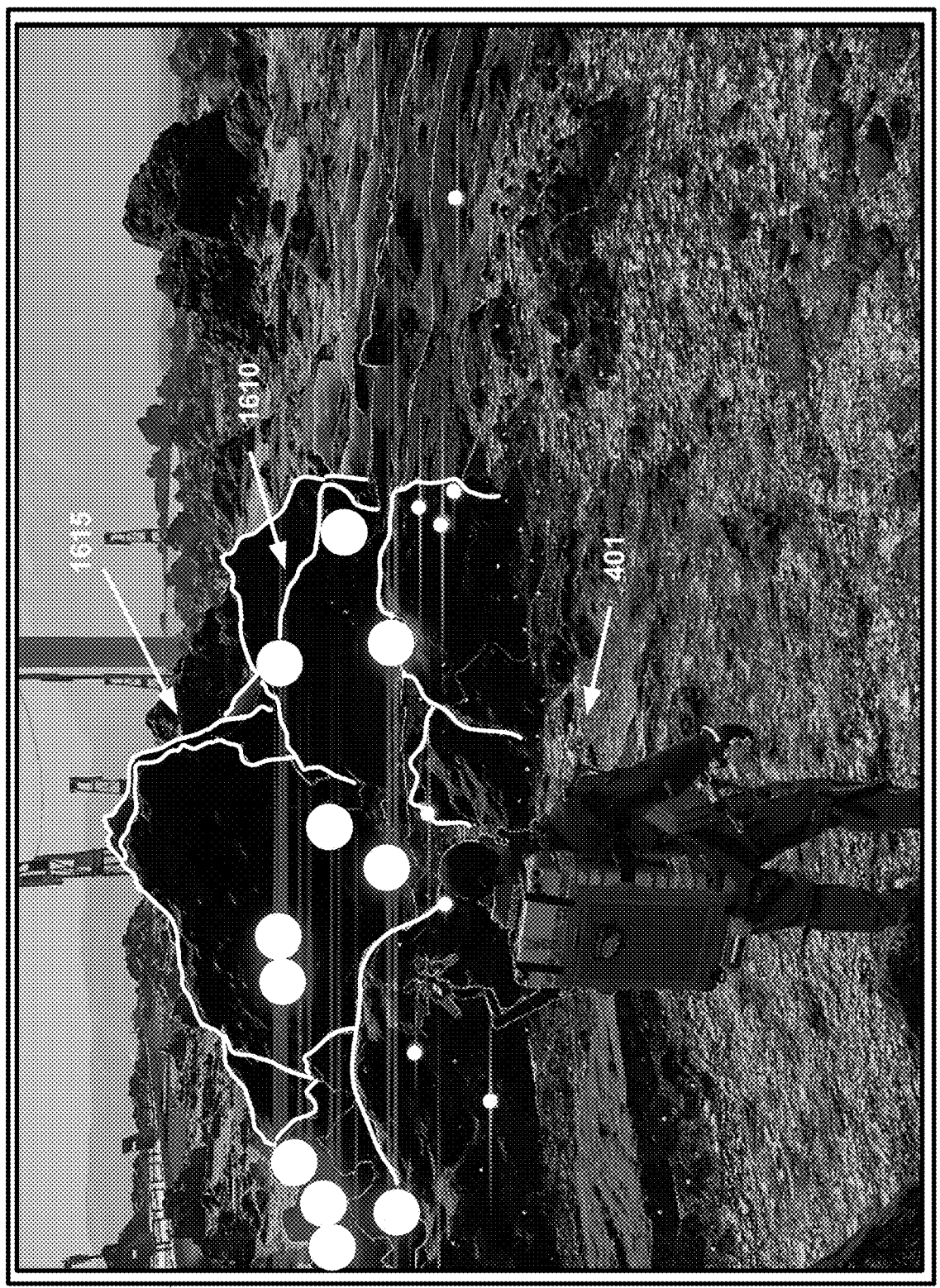
FIG. 16A is a screen shot illustrating the character, introduced in FIG. 4B of the representative interactive gaming application introduced in FIG. 4A, and the implementation of a terrain radar configured for mapping the surrounding virtual environment, in accordance with one embodiment of the present disclosure.

FIG. 16A is a screen shot 1600A illustrating terrain mapping in a virtual environment of a first game play of a first player, in accordance with one embodiment of the present disclosure. As shown, the character 401 introduced in FIG. 4B is located in a virtual environment introduced in FIG. 4A. The character 401 is able to implement a terrain scanning feature. For example, the scanning feature is implemented through the terrain radar engine 192 of FIG. 1A.

The scanning feature is configured to scan a surrounding geography and give an assessment as to its environmental conditions (e.g., rocky, smooth, wet, slippery, etc.). In particular, character 401 is traversing over terrain that has large outcroppings of rocks in parts, and smaller rocks in other parts. The terrain scanning feature is able to pick out the features of the terrain (e.g., large rocks, medium rocks, small rocks, relatively good path for walking etc.). For example, the scanning radar is exemplified through horizontal lines. White dots are shown along the horizontal lines and indicate where an object is located that rises above the floor of the terrain. Larger white dots indicate large objects, such as larger rocks (bigger than human size). Smaller white dots indicate smaller objects, such as medium sized rocks that are still large enough to impede travel through that area.

As the terrain is scanned, objects may be outlined. For example, the large outcropping 1610 is outlined (outline 1615) so that the first player through character 401 is able to quickly discern terrain that is difficult to navigate. This feature may be useful especially when the view is obstructed (e.g., foggy conditions, etc.). In addition, other objects may be shown through the scanning In particular, dropped assets of other players may be picked up through scanning, and highlighted to the character.

Also, the terrain mapping may map liquid features. For example, the terrain mapping may identify areas that are wet, with degrees of wetness. The terrain mapping may identity areas that are bodies of water, such as a river. Further, the terrain mapping may measure the deepness of water, such as the depth of the river at a particular location. In that manner, the first player through character 401 is able to discern which crossing of a river is best.

Figure 16B:
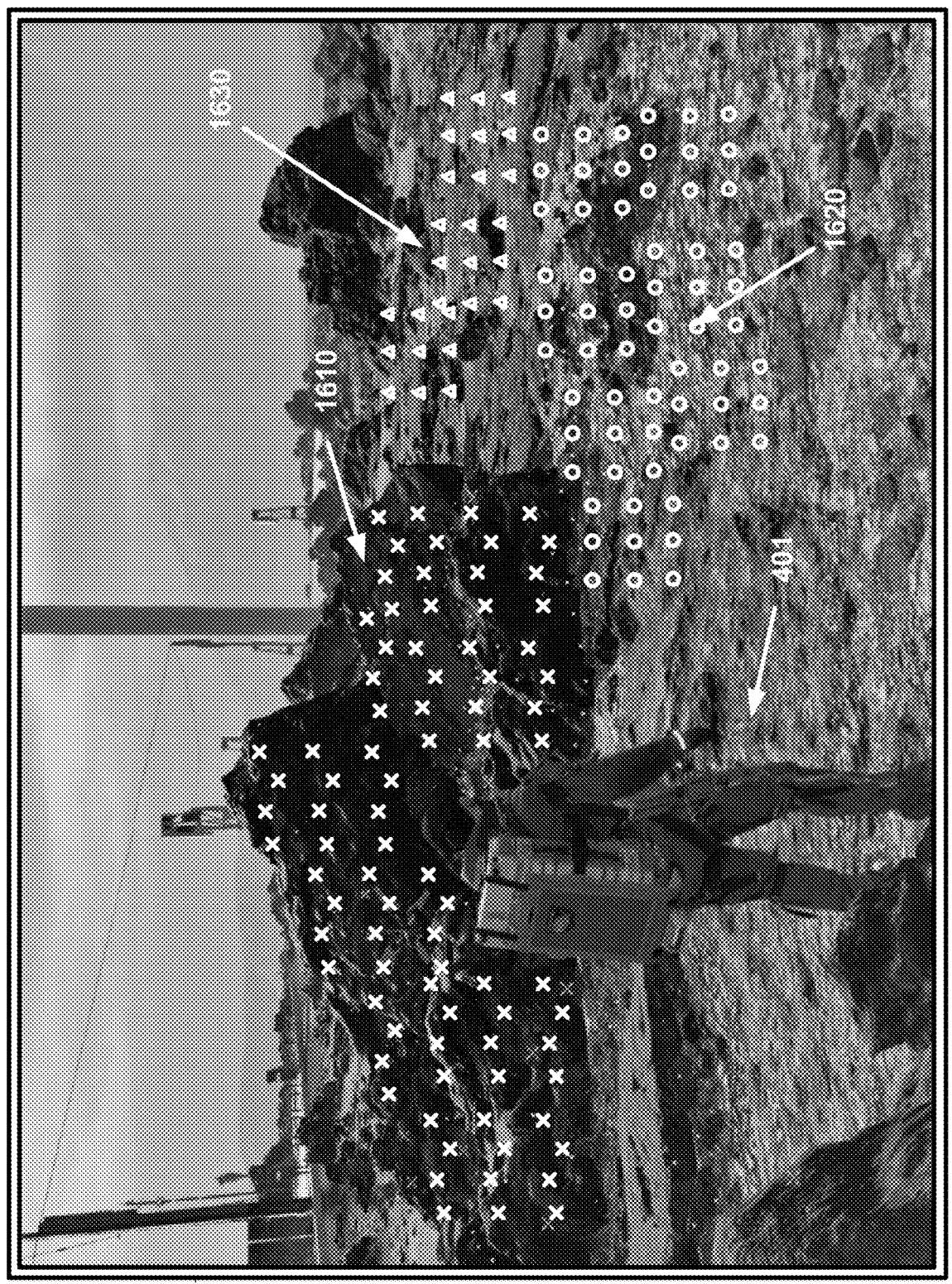
FIG. 16B is a screen shot illustrating terrain topography that is mapped through a scanning feature shown in FIG. 16A, in accordance with one embodiment of the present disclosure.

FIG. 16B is a screen shot 1600B illustrating the terrain topography that is mapped through a scanning feature shown in FIG. 16A, in accordance with one embodiment of the present disclosure. In particular, the results of the scanning feature may be displayed to the first player. Purely for illustration, the scanning of the terrain may appear like that shown in FIG. 16B while the character 401 is viewing the surrounding terrain In addition, the scanning feature is able to rate the difficulty (easy, medium, hard, etc.) in traversing through a region. That is, the terrain topography is outlined to help the character decide which is the best path route to take to navigate through this area. For example, areas that are very difficult to navigate across are marked with an "x". As an illustration, the rock outcropping 1610 is identified as being hard to navigate across. In addition, areas that are moderately difficult to cross due to various environmental conditions (e.g., muddy, slippery, wet, slightly rocky, etc.) are marked with an "o". As an illustration, the area 1620 is identified as being moderately difficult to cross possibly because of variated rocky terrain that does not provide even footing. Further, areas that are good for walking are marked with a triangle. As an illustration, the area 1630 is identified as being amenable for walking. In that manner, the easiest path through an area may be highlighted for the character to follow when navigating through a region.

Figure 16C:
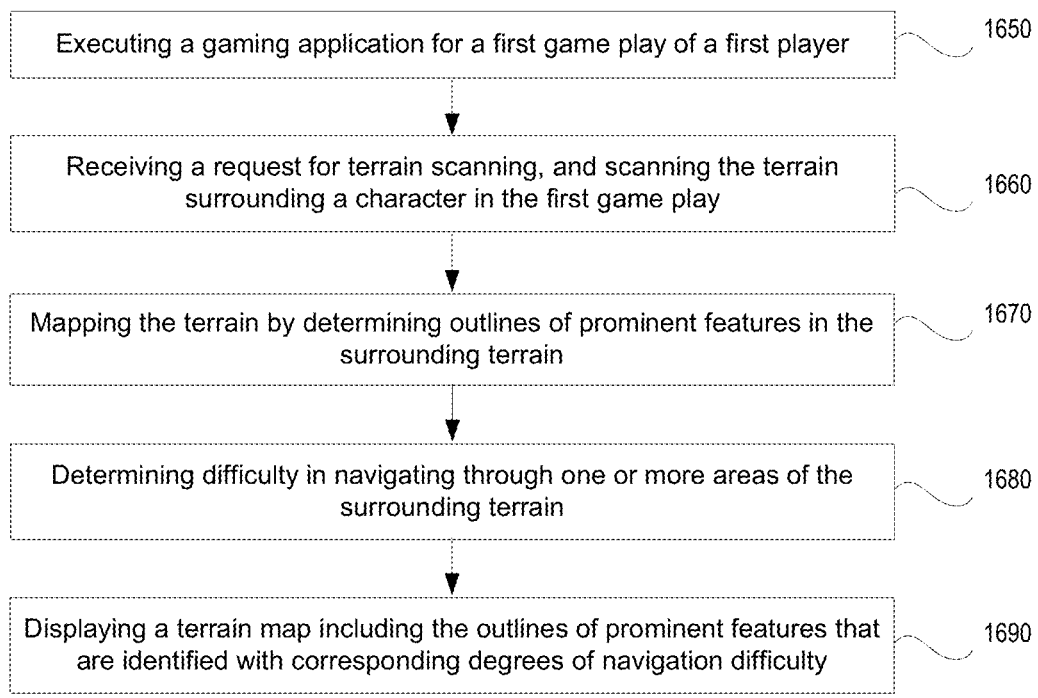
FIG. 16C is a flow diagram illustrating steps in a method for providing terrain mapping that is able to rate difficulty in navigating through an area of a virtual environment of a first game play of a first player, in accordance with one embodiment of the present disclosure.

With the detailed description of the various modules of the gaming server and client device communicating over a network, a method for gaming is now described in relation to flow diagram 1600C of FIG. 16C, in accordance with one embodiment of the present disclosure. Flow diagram 1600C illustrates the process and data flow of operations for purposes of providing terrain mapping that is able to rate difficulty in navigating through an area of a virtual environment of a first game play of a first player, in accordance with one embodiment of the present disclosure. Flow diagram 1600C can be implemented within the client device 100 and/or game server 205, such as through one or more of client interactive gaming application 126, server side interactive gaming application 190 and/or the cross-pollinating manager 195 to facilitate the cross-pollination of data across one or more virtual environments of one or more game plays of one or more players, wherein players may be playing asynchronous game plays each in single-player mode, or the players may be playing simultaneously in multi-player mode. In particular, flow diagram 1600C can be implemented within the terrain radar engine 192 that is configured for providing terrain scanning and feature identification.

At 1650, the method includes executing an interactive gaming application for a first game play of a first player. For example, the interactive gaming application is executed by a local client device, with information about the game play delivered to the back-end game server 205 for connecting one or more game plays through the cross-pollination of data.

At 1660, the method includes receiving a request for terrain scanning and scanning terrain surrounding a character in the first game play. That is, the character may be in an area that is difficult to find a path for navigating through the area. The terrain scanning can identify the best path for navigation.

At 1670, the method includes mapping the terrain by determining outlines of prominent features in the surrounding terrain. The terrain scanning is able to determining outlines of one or more features. For example, the terrain scanning can identity varying sizes of both natural features (e.g., rock outcroppings, boulders, cliffs, walls, mountains, ravines, rivers, bodies of water, etc.) and manufactured features (e.g., buildings, vehicles, etc.). At 1680, the method includes determining difficulty in navigating through one or more areas of the surrounding terrain.

At 1680, the method includes determining difficulty in navigating through one or more areas of the surrounding terrain. For example, if the area is rocky or has large features, then it may be difficult to navigate. If the area is even and less rocky, then the area may be good for navigating. In addition, the terrain mapping can determine a condition that is present on the surface of an area of the surrounding terrain. The condition may influence how difficult it is to navigate through the area. For example, the surface may be wet or slick with mud indicating that the area might be slippery, thereby making navigation difficult.

Terrain mapping can also identify bodies of water, such as rivers, lakes, ponds, puddles. The terrain mapping can also determine the depth of a body of water. In that manner, the player through the character can determine how difficult it is to cross that body of water (e.g., determine size of the body of water for swimming) In addition, the terrain mapping can determine the depth of the body of water. For example, the terrain mapping can determine depths of a river at various points. In that manner, the player through a respective character can determine the best spot to cross the river.

Further, the terrain mapping can identify dropped objects. The dropped objects may have originated from a second game play of a second player.

As previously described, the objects and/or assets that are cross-pollinated across one or more virtual environments may be limited to those players who belong to a group or block of players. For example, the players may be part of a social network, such as friends of a social gaming network. As previously described, the players in the group may each be playing a single-player gaming session, each of which is independent of the others. And the gaming sessions may not be occurring simultaneously, though the dropped assets are still cross-pollinated. In another embodiment, the players in the group may be playing in a single multi-player gaming session. In still another embodiment, the players in the group may be part of one or more multi-player gaming sessions. The different multi-player gaming sessions may not be occurring simultaneously. In still another embodiment, the first game play of the first player is part of a single-player gaming session, while at least one other game play of the other players in the group may be part of a multi-player gaming session. The single-player and the multi-player gaming sessions need not be occurring simultaneously, i.e., asynchronously.

At 1690, the method includes displaying a terrain map including the outlines of prominent features that are identified with corresponding degrees of navigation difficulty. The terrain map provides information summaries that help identify areas and how difficult it would be to navigate through those corresponding areas. In addition, the easiest path through an area can be identified, such as an area that is smooth and even for good footholds when walking, and that has no rocks. The player can just follow that path when navigating through that area, such as when navigating to a dropped object that is also identified on the terrain map.

Figure 17:
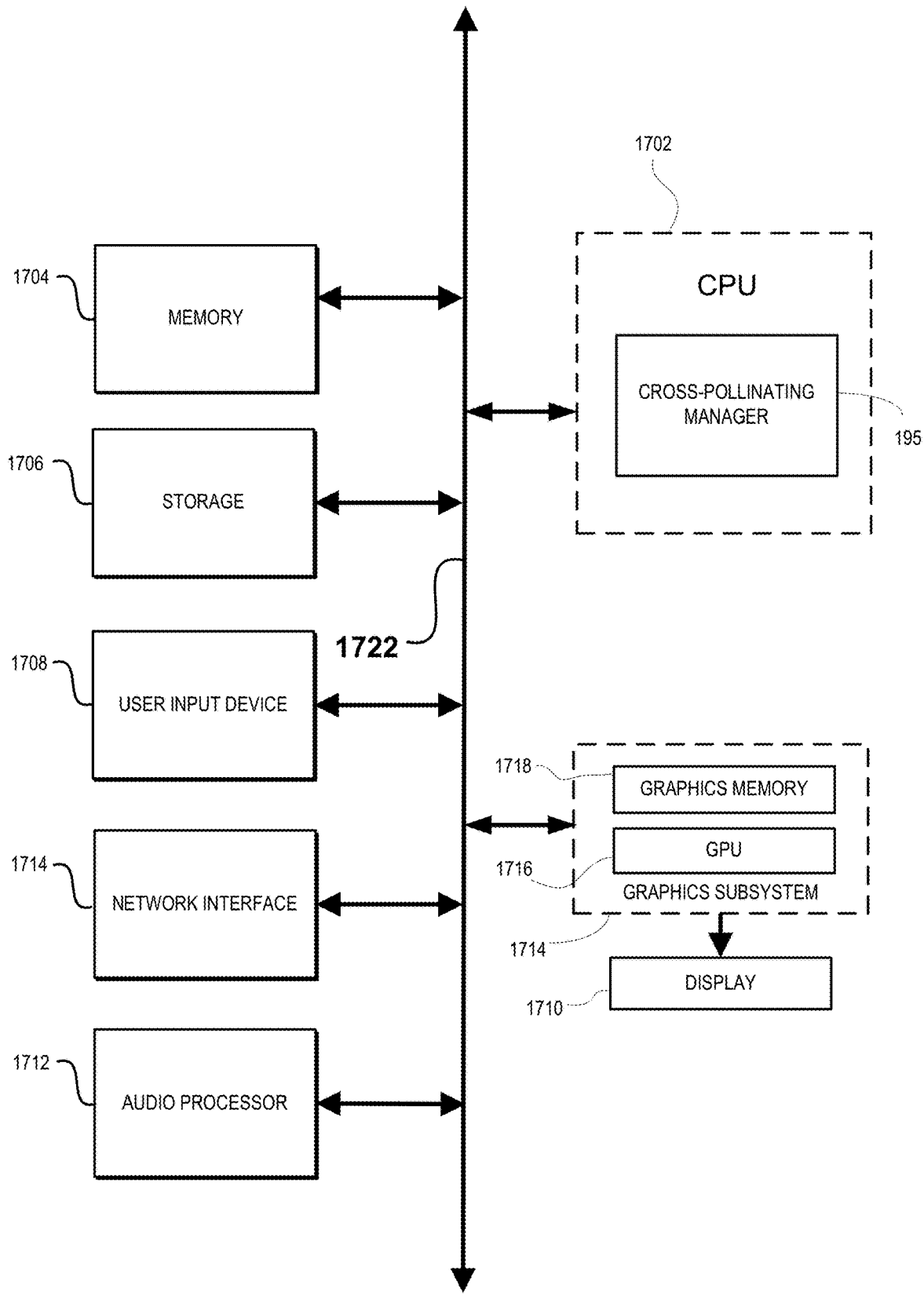
FIG. 17 illustrates components of an example device that can be used to perform aspects of the various embodiments of the present disclosure.

FIG. 17 illustrates components of an example device 1700 that can be used to perform aspects of the various embodiments of the present disclosure. For example, FIG. 17 illustrates an exemplary hardware system suitable for implementing a device that provides for executing a game play of an interactive gaming application, and cross-pollinating actions and/or objects from that game play into other game plays of other players, as previously described, in accordance with one embodiment of the present disclosure. This block diagram illustrates a device 1700 that can incorporate or can be a personal computer, video game console, personal digital assistant, or other digital device, suitable for practicing an embodiment of the disclosure. Device 1700 includes a central processing unit (CPU) 1702 for running software applications and optionally an operating system. CPU 1702 may be comprised of one or more homogeneous or heterogeneous processing cores. For example, CPU 1702 is one or more general-purpose microprocessors having one or more processing cores. Further embodiments can be implemented using one or more CPUs with microprocessor architectures specifically adapted for highly parallel and computationally intensive applications, such as media and interactive entertainment applications, or applications configured for providing cross-pollination of data between one or more game plays, as previously described. The CPU 1702 may include a cross-pollinating manager 195 configured to manage data (e.g., information, assets, objects, communication, etc. that etc.) that is cross-pollinated across one or more virtual environments of one or more game plays of one or more players. Device 1700 may be a localized to a player (e.g., game console), or remote from the player (e.g., back-end server processor).

Memory 1704 stores applications and data for use by the CPU 1702. Storage 1706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1708 communicate user inputs from one or more users to device 1700, examples of which may include keyboards, mice, joysticks, touch pads, touch screens, still or video recorders/cameras, tracking devices for recognizing gestures, and/or microphones. Network interface 1714 allows device 1700 to communicate with other computer systems via an electronic communications network, and may include wired or wireless communication over local area networks and wide area networks such as the internet. An audio processor 1712 is adapted to generate analog or digital audio output from instructions and/or data provided by the CPU 1702, memory 1704, and/or storage 1706. The components of device 1700, including CPU 1702, memory 1704, data storage 1706, user input devices 1708, network interface 1710, and audio processor 1712 are connected via one or more data buses 1722

A graphics subsystem 1714 is further connected with data bus 1722 and the components of the device 1700. The graphics subsystem 1714 includes a graphics processing unit (GPU) 1716 and graphics memory 1718. Graphics memory 1718 includes a display memory (e.g., a frame buffer) used for storing pixel data for each pixel of an output image. Graphics memory 1718 can be integrated in the same device as GPU 1716, connected as a separate device with GPU 1716, and/or implemented within memory 1704. Pixel data can be provided to graphics memory 1718 directly from the CPU 1702. Alternatively, CPU 1702 provides the GPU 1716 with data and/or instructions defining the desired output images, from which the GPU 1716 generates the pixel data of one or more output images. The data and/or instructions defining the desired output images can be stored in memory 1704 and/or graphics memory 1718. In an embodiment, the GPU 1716 includes 3D rendering capabilities for generating pixel data for output images from instructions and data defining the geometry, lighting, shading, texturing, motion, and/or camera parameters for a scene. The GPU 1716 can further include one or more programmable execution units capable of executing shader programs.

The graphics subsystem 1714 periodically outputs pixel data for an image from graphics memory 1718 to be displayed on display device 1710, or to be projected by projection system 1740. Display device 1710 can be any device capable of displaying visual information in response to a signal from the device 1700, including CRT, LCD, plasma, and OLED displays. Device 1700 can provide the display device 1710 with an analog or digital signal, for example.

While specific embodiments have been provided to demonstrate the providing of real-time assistance during game play of a player playing an interactive gaming application through live help sessions (e.g., connecting player to an expert through a communication session), or through recorded help sessions (e.g., connecting player to a recorded help session transmitted over a communication session), these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multi-player video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multi-player games. Massively multi-player online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or interactive gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input.

Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers, head mounted display (HMD) or projection system, and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for influencing a gaming world of a video game, comprising:

cross-pollinating a first path using an inter-game communication medium across a plurality of virtual environments of a plurality of asynchronous game plays of a plurality of players playing the video game, wherein a plurality of instances of the video game are executing at one or more of game servers of a cloud gaming system and localized client devices of the plurality of players to generate the plurality of asynchronous game plays, wherein each of the plurality of instances of the video game is in communication with a cross-pollinating manager executing on a game server of the cloud gaming system;

determining at the cross-pollinating manager that the first path has been traversed one or more times by one or more characters of the plurality of players in the plurality of asynchronous game plays;
improving at the cross-pollinating manager the first path based on a number of times the first path has been traversed by the one or more characters; and
cross-pollinating at the cross-pollinating manager the first path that has been improved across the plurality of virtual environments,
wherein the first path that has been improved changes each of the plurality of virtual environments used during execution of the plurality of instances of the video game for generating the plurality of asynchronous game plays of the plurality of players.

2. The method of claim 1, further comprising:
increasing a width of the first path after reaching a first threshold of times the first path has been traversed by the one or more characters of the plurality of players;
improving a surface of the first path after reaching a second threshold of times the first path has been traversed by the one or more characters of the plurality of players; and
increasing a grade of the first path after reaching a third threshold of times the first path has been traversed by the one or more characters of the plurality of players.

3. The method of claim 1, further comprising:
cross-pollinating a second path into a virtual environment using the inter-game communication medium, wherein the second path is generated in a second game play of a second player;
determining that the first path and the second path cover approximately a same terrain; and
merging the first path and the second path into a combined path.

4. The method of claim 1, further comprising:
scanning a terrain encountered by a first character when traversing the first path upon a request by a first player, wherein the first character is controlled by the first player playing the video game in a first game play;
determining outlines of prominent features in the terrain;
generating a mapping of the prominent features in a point-of-view (POV) of the first character into a first virtual environment of the first game play; and
overlaying the mapping in the POV,
wherein the mapping includes one or more horizontal lines rising above a ground in the POV,
wherein one or more dots are located on the one or more horizontal lines,
wherein each dot indicates a corresponding surface of a corresponding object,
wherein a size of each dot presented on a horizontal line indicates a size of the corresponding object.

5. The method of claim 4, further comprising:
determining difficulty in navigating through one or more areas of the terrain; and
generating a terrain topography from the mapping, wherein the terrain topography rates the difficulty in navigating through the terrain presented in the POV of the first character,
wherein a first symbol overlaid a first area in the POV indicates the first area is very difficult to navigate,
wherein a second symbol overlaid a second area in the POV indicates the second area is moderately difficult to navigate,
wherein a third symbol overlaid a third area in the POV indicates the third area is easy to navigate.

6. A method for influencing a gaming world of video game, comprising:
determining at a cross-pollinating manager executing on a game server of a cloud gaming system that a first character traverses a first path from a first point to a second point in a first virtual environment of the video game, wherein the first character is controlled by a first player playing the video game in a first game play, wherein a plurality of instances of the video game are executing at one or more of game servers of the cloud gaming system and localized client devices of a plurality of players to generate a plurality of asynchronous game plays, wherein each of the plurality of instances is in communication with the cross-pollinating manager;
improving at the cross-pollinating manger the first path in the first virtual environment based on a number of times the first character has traversed the first path, wherein the first path is incrementally improved with each traversal of the first path; and
cross-pollinating the first path that has been improved using an inter-game communication medium across a plurality virtual environments of the plurality of asynchronous game plays of the plurality of players,
wherein the inter-game communication medium provides for cross-pollination of data including the first path across the plurality of virtual environments of the plurality of asynchronous game plays,
wherein the first path that has been improved changes each of the plurality of virtual environments used during execution of the plurality of instances of the video game for generating the plurality of asynchronous game plays of the plurality of players.

7. The method of claim 6, further comprising:
determining that the first path has been traversed one or more times by one or more characters of the plurality of players in the plurality of asynchronous game plays;
improving the first path based on a second number of times the first path has been traversed by the first character and the one or more characters of the plurality of players; and
cross-pollinating the first path that has been improved by traversals by the first character and the one or more characters using the inter-game communication medium across the plurality of virtual environments.

8. The method of claim 7, further comprising:
increasing a width of the first path after reaching a first threshold of times the first path has been traversed by the first character and the one or more characters of the plurality of players;
improving a surface of the first path after reaching a second threshold of times the first path has been traversed by the first character and the one or more characters of the plurality of players; and
increasing a grade of the first path after reaching a third threshold of times the first path has been traversed by the first character and the one or more characters of the plurality of players.

9. The method of claim 6, further comprising:
cross-pollinating a second path into the first virtual environment using the inter-game communication medium, wherein the second path is generated in a second game play of a second player.

10. The method of claim 9, further comprising:
determining that the first path and the second path cover approximately a same terrain; and merging the first path and the second path into a combined path.

11. The method of claim 6, further comprising:
scanning a terrain encountered by the first character when traversing the first path upon a request by the first player;
determining outlines of prominent features in the terrain;
generating a mapping of the prominent features in a point-of-view (POV) of the first character into the first virtual environment; and
overlaying the mapping in the POV,
wherein the mapping includes one or more horizontal lines rising above a ground in the POV,
wherein one or more dots are located on the one or more horizontal lines,
wherein each dot indicates a corresponding surface of a corresponding object,
wherein a size of each dot presented on a horizontal line indicates a size of the corresponding object.

12. The method of claim 11, further comprising:
determining difficulty in navigating through one or more areas of the terrain; and
generating a terrain topography from the mapping, wherein the terrain topography rates the difficulty in navigating through the terrain presented in the POV of the first character,
wherein a first symbol overlaid a first area in the POV indicates the first area is very difficult to navigate,
wherein a second symbol overlaid a second area in the POV indicates the second area is moderately difficult to navigate,
wherein a third symbol overlaid a third area in the POV indicates the third area is easy to navigate.

13. The method of claim 11, further comprising:
scanning the terrain to identify a body of water; and
scanning the body of water to determine a depth of water in the body of water.

14. The method of claim 11, further comprising:
scanning the terrain to identify an asset that is dropped into the first virtual environment by the first character or by a second character of the plurality of players and cross-pollinated into the first virtual environment.

15. The method of claim 6,
wherein the data that is cross-pollinated is generated in one of the plurality of asynchronous game plays,
wherein the data includes at least one of information, or a sign, or a like, or an event, or a cataclysmic event, or an action, or an object, or an asset.

16. A computer system comprising: a processor; and
memory coupled to the processor and having stored therein instructions that, if executed by the computer system, cause the computer system to execute a method for influencing a gaming world of a video game comprising:
determining at a cross-pollinating manager executing on a game server of a cloud gaming system that a first character traverses a first path from a first point to a second point in a first virtual environment of the video game, wherein the first character is controlled by a first player playing, the video game in a first game play, wherein a plurality of instances of the video game are executing at one or more of game servers of the cloud gaming system and localized client devices of a plurality of players to generate a plurality of asynchronous game plays wherein each of the plurality of instances is in communication with the cross-pollinating manager;
improving at the cross-pollinating manager the first path in the first virtual environment based on a number of times the first character has traversed the first path, wherein the first path is incrementally improved with each traversal of the first path; and
cross-pollinating the first path that has been improved using an inter-game communication medium across a plurality of virtual environments of the plurality of asynchronous game plays of the plurality of players,
wherein the inter-game communication medium provides for cross-pollination of data including the first path across the plurality of virtual environments of the plurality of asynchronous game plays,
wherein the first path that has been improved changes each of the plurality of virtual environments used during execution of the plurality of instances of the video game for generating the plurality of asynchronous game plays of the plurality of players.

17. The computer system of claim 16, the method further comprising:
determining that the first path has been traversed one or more times by one or more characters of the plurality of players in the plurality of asynchronous game plays;
improving the first path based on a second number of times the first path has been traversed by the first character and the one or more characters of the plurality of players;
cross-pollinating the first path that has been improved by traversals by the first character and the one or more characters using the inter-game communication medium across the plurality of virtual environments.

18. The computer system of claim 17, the method further comprising:
increasing a width of the first path after reaching a first threshold of times the first path has been traversed by the first character and the one or more characters of the plurality of players;
improving a surface of the first path after reaching a second threshold of times the first path has been traversed by the first character and the one or more characters of the plurality of players; and
increasing a grade of the first path after reaching a third threshold of times the first path has been traversed by the first character and the one or more characters of the plurality of players.

19. The computer system of claim 16, the method further comprising:
cross-pollinating a second path into the first virtual environment using the inter-game communication medium, wherein the second path is generated in a second game play of a second player.

20. The computer system of claim 16, the method further comprising:
scanning a terrain encountered by the first character when traversing the first path upon a request by the first player;
determining outlines of prominent features in the terrain;
generating a mapping of the prominent features in a point-of-view (POV) of the first character into the first virtual environment; and
overlaying the mapping in the POV,
wherein the mapping includes one or more horizontal lines rising above a ground in the POV,
wherein one or more dots are located on the one or more horizontal lines,
wherein each dot indicates a corresponding surface of a corresponding object, wherein a size of each dot presented on a horizontal line indicates a size of the corresponding object.

\* \* \* \* \*